United States Patent
Ohto et al.

[11] Patent Number: 5,864,673
[45] Date of Patent: Jan. 26, 1999

[54] TERMINAL DEVICE IN DOCUMENT INFORMATION COMMUNICATION SYSTEM

[75] Inventors: Hidetaka Ohto, Takarazuka; Kazuo Okamura, Hirakata; Masaki Mukai, Izumisano; Junichi Hirai, Suita; Toshihiro Hishida, Koube, all of Japan

[73] Assignee: Matsushita Electric Industrial Co., Ltd., Osaka, Japan

[21] Appl. No.: 736,955

[22] Filed: Oct. 25, 1996

[30] Foreign Application Priority Data

Oct. 27, 1995 [JP] Japan .................................... 7-280353
Oct. 15, 1996 [JP] Japan .................................... 8-272505

[51] Int. Cl.⁶ .................................................. G06F 13/42
[52] U.S. Cl. ............... 395/200.49; 395/500; 395/200.66; 364/228.4
[58] Field of Search ............... 395/200.49, 500, 395/200.62, 200.79, 340, 341; 364/228.4

[56] References Cited

U.S. PATENT DOCUMENTS

| | | | |
|---|---|---|---|
| 5,165,030 | 11/1992 | Barker | 395/500 |
| 5,276,866 | 1/1994 | Paolini | 395/200.49 |
| 5,442,749 | 8/1995 | Northcutt et al. | 395/200.49 |
| 5,487,170 | 1/1996 | Bass et al. | 395/732 |
| 5,517,652 | 5/1996 | Miyamoto et al. | 395/200.49 |
| 5,647,057 | 7/1997 | Roden et al. | 395/376 |

FOREIGN PATENT DOCUMENTS

| | | |
|---|---|---|
| 61-214837 | 9/1986 | Japan . |
| 2145052 | 6/1990 | Japan . |
| 4255155 | 9/1992 | Japan . |
| 662142 | 3/1994 | Japan . |

*Primary Examiner*—Krisna Lim
*Assistant Examiner*—David M. Ovedovitz
*Attorney, Agent, or Firm*—Price Gess & Ubell

[57] ABSTRACT

A terminal device to be used in a system where sets of transmission document information are transferred via a network between terminal devices which are grouped together in a plurality of different groups, the terminal device comprising a document information storage unit which stores document information which is made up of a plurality of document elements which are to be transmitted, a terminal device arrangement information storage unit for storing terminal device arrangement information made up of each group name, a type of each terminal device provided at each group and an address of each terminal device, a terminal device capability information control unit for controlling terminal device capability information which shows what kinds of document information can be outputted by each type of terminal device, a transmission document information creation unit for selecting terminal devices based on the group name of a group to be transmitted to and the terminal device arrangement information and for creating sets of the transmission document information from the document information to be transmitted in accordance with the terminal device capability information and a transmission unit for transmitting the created sets of transmission document information to the selected terminal devices.

21 Claims, 51 Drawing Sheets

Fig. 3  PRIOR ART

| media attribute 33 | size 32 | element data 31 |
|---|---|---|
| character | 19 | Notice of a Meeting |
| character | 16 | Start : 3 : 30 p.m. |
| character | 14 | End : 5 : 00 p.m. |
| character | 25 | Place : 甲 Building 乙 Room |
| character | 25 | Please make sure to come. |
| monochrome still picture | 1000 | ×××××××××××××××××× | document information control table 30

Fig. 4 PRIOR ART

```
        Notice of a Meeting
Start : 3 : 30 p.m.
End : 5 : 00 p.m.
Place : 甲 Building 乙 Room Please make sure to come.
```

Fig. 7

| A | | | |
|---|---|---|---|
| character | 19 | Notice of a Meeting | |
| character | 16 | Start： 3：30 p.m. | |
| character | 14 | End： 5：00 p.m. | |
| character | 25 | Place：甲 Building 乙 Room | |
| character | 100 | Please make sure to come. ･････ | |
| monochrome still picture | 1000 | ××××××××××××××××× | |

- document information control table 701
- flag column 706
- element data 702
- size 703
- group name colunb 705
- media attribute 704
- first row 707
- sixth row 708

Fig. 8 terminal device arrangement information 801
group name column 802
address column 803
type column 804
flag column 805

| A | A@abc.def.jp | character e-mail terminal | |
| | 06-123-4567 | FAX | |
| B | B@abc.def.jp | character e-mail terminal | |
| | . . . | . . . . | |
| ⋮ | ⋮ | ⋮ | |

Fig. 9 outputable media attribute information 901
type column 902
media attribute column 903

| FAX | monochrome still picture |
|---|---|
| telephone | audio |
| character e-mail terminal | character |
| . . . . | . . |
| . . . . | . . |

Fig. 10 transmission document control table 1001 transmission destination terminal column 1002

| character e-mail terminal | | A@abc.def.jp |
|---|---|---|
| character | 19 | Notice of a Meeting |
| character | 16 | Start : 3 : 30 p.m. |
| character | 14 | End : 5 : 00 p.m. |
| character | 25 | Place : 甲 Building 乙 Room |
| character | 100 | Please make sure to come. · · | character attribute 1003 data size 1005 element data column 1004

Fig. 11 transmission destination terminal column 1104 transmission document control table 1101

| FAX | | 06-123-4567 |
|---|---|---|
| monochrome still picture | 1000 | ×××××××××××××× | size column 1103  element data column 1102

Fig. 17

| | group name column 705 | | | | |
|---|---|---|---|---|---|
| C | | | | | |
| character | Notice of a Meeting | | 19 | | ← element data 1702 |
| character | Start: 3:30 p.m. | | 16 | | ← element data 1703 |
| character | End: 5:00 p.m. | | 14 | | ← element data 1704 |
| character | Place: 甲 Building Z Room | | 25 | | ← element data 1705 |
| character | Please make sure to come. . . . . . . | | 100 | | |
| monochrome still picture | ××××××××××××××××× | | 1000 | | ← element data 1706 | document information control table 1701 first row 707
sixth row 708
media attribute column 704
size column 703
element data column 702
flag column 706

Fig. 18 terminal device arrangement information 1801 group name column 802    address column 803    type column 804    flag column 805

| | | | |
|---|---|---|---|
| A | A@abc.def.jp | character e-mail terminal | |
| | 06−123−4567 | FAX | |
| B | B@abc.def.jp | character e-mail terminal | |
| | . . . | . . . . | |
| C | 03-9876-5432 | telephone | |
| | 03-9876-5678 | FAX | |
| ⋮ | ⋮ | ⋮ | |

1802

Fig. 19 transmission document control table 1901

| | |
|---|---|
| FAX | 03-9876-5678 |
| monochrome still picture  1000 | ×××××××××××××× |

Fig. 20 media attribute conversion information 2001

| media attribute | convertible media attribute |
|---|---|
| character | audio, monochrome still picture |
| audio | character |
| . . . . | . . |

2002, 2003

Fig. 21 transmission document control table 2101

| telephone | 03-9876-5432 | |
|---|---|---|
| audio | 70 | Notice of a Meeting | element data 2102
| audio | 100 | Start: 3:30 p.m. | element data 2103
| audio | 100 | End: 5:00 p.m. | element data 2104
| audio | 100 | Place: 甲 Building 乙 Room | element data 2105
| audio | 1000 | Please make sure to come... | element data 2106

Fig. 24 terminal device arrangement information 2401
group name column 2402
flag column 2403

| A | graphic portable terminal | 06-123-4567 | |
|---|---|---|---|
|   | graphic e-mail terminal | A@abc.def.jp | |
| B | telephone | 06-987-6543 | |
|   | . . . | . . | |

Fig. 25 receivable capacity information 2501

| graphic portable terminal | 100 |
|---|---|
| graphic e-mail terminal | 5000 |
| telephone | 100 |
| . . . . | . . |
| . . . . | . . |

Fig. 26 transmission document control table 2601
transmission destination terminal device column 2602

| graphic portable terminal | 06-123-4567 |
|---|---|
| character | 19 | Notice of a Meeting |
| character | 16 | Start : 3 : 30 p.m. |
| character | 14 | End : 5 : 00 p.m. |
| character | 25 | Place : 甲 Building 乙 Room | media attribute column 2603  size column 2604  element data column 2605

Fig. 31 terminal device arrangement information 3101
group name column 3102
flag column 3103

| A | character portable terminal | 06-123-4567 | |
|---|---|---|---|
| | FAX | 06-987-6543 | |
| B | graphic e-mail terminal | A@bcd.efg.jp | |
| | . . . | . . | |

Fig. 32 terminal device capacity information 3201
terminal device type column 3202
capacity column 3204
media attribute column 3203

| character portable terminal | character | 60 |
|---|---|---|
| FAX | monochrome still picture | 1000 |
| telephone | audio | 100 |
| . . . . . | | . . |
| . . . . . | | . . |

Fig. 33 media attribute-classified compression information 3301
media attribute column 3302
group compression information storage unit 3303
compression algorithm column 3304

| character | any | 1. commas and spaces deleted |
| | | 2. discarded from the end one by one |
|---|---|---|
| monochrome still picture | 0.1 ~ | image compression method |
| audio | 0.3 ~ | audio compression method |
| . . . . | | . . | transmission document control table 3501

| FAX | 06-987-6543 |
|---|---|
| monochrome still picture | 1000 | ×××××××××××××× |

Fig. 38 content column 3802　　document information control table 3801

| A | | | |
|---|---|---|---|
| character | title | 19 | Notice of a Meeting |
| character | time | 16 | Start : 3 : 30 p.m. |
| character | time | 14 | End : 5 : 00 p.m. |
| character | place | 25 | Place : 甲 Building 乙 Room |
| character | remarks | 100 | Please make sure to come. ･･･････ |
| monochrome still picture | map | 1000 | ××××××××××××××××× |

Fig. 39 element content-classified compression information 3901
media attribute column 3902
document element content column 3903
compression rate column 3904
compression algorithm column 3905

| character | time | any rate | convert time display method and discard from the end |
|---|---|---|---|
| character | place | any rate | discard from the end except for proper nouns |
| ･･･ | ･･･ | ･･･ | ･･･ |

Fig. 40

| word |
|------|
| 甲 |
| 乙 |
| ... |

Fig. 41 transmission document control table 4101

| character portable terminal | | 06-123-4567 |
|---|---|---|
| character | 19 | Notice of a Meeting |
| character | 16 | Start： 3：30 p.m. |
| character | 14 | End： 5：00 p.m. |
| character | 11 | Place：甲 B 乙 |

Fig. 42 new transmission document control table 3501

| FAX | | 06-987-6543 |
|---|---|---|
| monochrome still picture | 1000 | ××××××××××××× |

Fig. 44

| group name column 4409 | | document information control table 4401 | |
|---|---|---|---|
| B | | | |
| | character | Notice of a Meeting | 1 |
| | character | Start: 3:30 p.m. | 1 |
| | character | End: 5:00 p.m. | 2 |
| | character | Place: 甲 Building 乙 Room | 1 |
| | character | Please make sure to come. ...... | 3 |
| | monochrome still picture | ××××××××××××××× | 4 |

- document element 4402
- document element 4403 — 19
- document element 4404 — 16
- document element 4405 — 14
- document element 4406 — 25
- document element 4407 — 100 / 1000 priority column 4408
flag column 4410

Fig. 47 transmission control table 4701

| character display pager | 06-321-7654 | |
|---|---|---|
| character | 19 | Notice of a Meeting |
| character | 16 | Start : 3 : 30 p.m. |
| character | 25 | Place : 甲 Building 乙 Room |

Fig. 50 terminal device arrangement information 5001

| group name column 5002 | address column 5003 | terminal device type column 5004 | terminal device priority column 5005 | flag column 5006 |
|---|---|---|---|---|
| A | A@abc.def.jp | character e-mail terminal | 1 | |
| | 06-123-4567 | FAX | 2 | |
| B | 06-321-7654 | character display pager | 1 | |
| ... | . . . | . . . . | . . | | terminal device arrangement information 5301 outputable media attribute information 5401

Fig. 57 terminal device arrangement information 5701

| group name column 5702 | address column 5704 | type column 5703 | priority column 5706 | | | | flag column 5705 |
|---|---|---|---|---|---|---|---|
| group name | address | terminal device | present at desk | back home | out | meeting | flag |
| A | A@abc.def.jp | character e-mail terminal | 1 | 2 | 2 | 1 | . |
| | 06-123-4567 | FAX | 2 | 0 | 0 | 2 | . |
| | 06-321-7654 | character display pager | 0 | 1 | 1 | 1 | . |
| B | B@abc.def.jp | character e-mail terminal | 1 | 1 | 1 | 0 | . |
| ... | ... | ... | ... | ... | ... | ... | . |

Fig. 60 document element transmission destination device information 6001

| media attribute 6002 | size 6003 | element data 6004 | address 6005 | type 6006 |
|---|---|---|---|---|
| character | 19 | Notice of a Meeting | A@abc.def.jp | character e-mail terminal |
| character | 16 | Start: 3:30 p.m. | A@abc.def.jp | character e-mail terminal |
| character | 14 | End: 5:00 p.m. | A@abc.def.jp | character e-mail terminal |
| character | 25 | Place: 甲 Building Z Room | A@abc.def.jp | character e-mail terminal |
| character | 100 | Please make sure to come. ........ | A@abc.def.jp | character e-mail terminal |
| monochrome still picture | 1000 | ×××××××××××× ×××××××××× | 06-123-4567 | FAX | information 6007 information 6008

Fig. 61 transmission document control table 6101

| character e-mail terminal | | A@abc.def.jp |
|---|---|---|
| character | 19 | Notice of a Meeting |
| character | 16 | Start : 3 : 30 p.m. |
| character | 14 | End : 5 : 00 p.m. |
| character | 25 | Place : 甲 Building 乙 Room |
| character | 100 | Please make sure to come. ・・・ |
| character | 50 | part of the document was transmitted to 06-123-4567 |

Fig. 62 transmission document control table 6201

| FAX | | 06-123-4567 |
|---|---|---|
| monochrome still picture | 1000 | X X X X X X X X X X X X X X X X X X X X |
| monochrome still picture | 100 | Y Y Y Y Y Y Y Y Y Y Y Y Y Y Y Y Y Y Y Y |

TERMINAL DEVICE IN DOCUMENT INFORMATION COMMUNICATION SYSTEM

BACKGROUND OF THE INVENTION

1. Field of the Invention

The present invention relates to terminal devices, such as e-mail terminals and portable information terminals, connected via a network in a document information communication system.

2. Description of the Related Art

In recent years, there has been a rapid increase in the use of a variety of communication devices such as telephones, facsimiles, digital mobile telephones, PHS (personal handy phone system), portable communication terminals, pagers capable of receiving a message and workstations connected to LAN (Local Area Network) and WAN (Wide Area Network). This situation provides users with many opportunities to handle different types of communication terminal devices.

Therefore, there is increasing demand for improved capability of transmitting and receiving a multimedia document which includes data of different media attributes, such as audio data, character data, still image data, motion picture data and hand-written data. However, such communication terminal devices are not readily available to users due to their high cost and bulky size.

A protocol called MIME (Multipurpose Internet Mail Extension) has been established for transmitting such multimedia document in data communication. According to MIME, a plurality of document elements constitute a document, each having a single media attribute and meaning. Each document element has data showing its media attribute and display method.

MIME is described in detail in "Network Working Group Request for Comments 1341".

Generally, a communication terminal device for transmitting a document including different media attributes has a document described in MIME and transmits it to a receiver terminal device. The receiver terminal device decodes the document elements included in the document based on their media attribute data. When the document includes data of a media attribute which cannot be decoded and displayed (outputted), this data is ignored by the receiver terminal device.

FIG. 1 shows the construction of the terminal device in the conventional document information communication system. Transmitter terminal device 11 and receiver terminal device 12 are connected via network 13. Transmitter terminal device 11 comprises document information storage unit 14 and transmission unit 15. Receiver terminal device 12 comprises reception unit 16 and document output unit 17.

Document 20 in FIG. 2 is transmitted from terminal device 11 to terminal device 12 as follows. Document 20 comprises document elements 21, 22, 23, 24 and 25 having "character" as their media attributes and document element 26 having "monochrome still picture" as its media attribute.

Document information storage unit 14 stores document 20 in the form of document information control table 30 shown in FIG. 3. Document information control table 30 comprises element data 31, element data size 32 and media attribute 33. For example, in the case of document element 21 "Notice of a Meeting", its media attribute is "character" and data size is "19". In the case of document element 26, its media attribute is "monochrome still picture" and data size is "1000".

Transmission unit 15 receives a user's indication of a transmission destination terminal (which can be any of the terminals) and document information, reads document information control table 30 stored in document information storage unit 14 and transmits it to reception unit 16 of terminal device 12 via network 13.

Reception unit 16 of terminal device 12 receives document information control table 30 transmitted from terminal device 11. Document output unit 17 decodes information control table 30 and outputs it to the display screen. If terminal device 12 has the same function (output capability) as terminal device 11, document output unit 17 outputs the same document as document 20 shown in FIG. 2 to the display screen. However, if terminal device 12 is a character e-mail terminal which is capable of decoding only element data having "character" as its media attribute, the terminal device outputs only element data of document elements 21, 22, . . . , 25 to the display screen, as is shown in FIG. 4.

As the character e-mail terminal is not capable of decoding and displaying (outputting) the element data of document element 26, the reception of this document 26 is futile.

As mentioned above, it was often likely that such futile communication is often performed by the conventional document information communication system, as transmitter terminal device 11 transmits all of the information in document information control table 30 stored in document information storage unit 14 regardless of the output capability of receiver terminal device 12.

In addition to this problem, it has also not been possible to transmit all of document 20 to receiver terminal device 12.

It can be the case that the intended receiver of the data is in possession of another communication device, aside from receiver terminal 12, which is capable of outputting a different part of the document data. However, in this case, it is still impossible to avoid the futile transmission of data which cannot be outputted to both devices.

Receiver terminal device 12 is indicated by the user in transmission terminal device 11. If the user of receiver terminal device 12 possesses another terminal device, it may be more convenient to transmit the element data to that terminal device.

SUMMARY OF THE INVENTION

In view of the stated problems, it is a primary object of the present invention to provide a terminal device for use in a document information communication system where documents can be transmitted between terminal devices without futile communication.

A second object of the present invention is to provide a terminal device which can communicate document information in accordance with a operational state of a user's terminal device.

A third object of the present invention is to provide a relay device which can prevent the occurrence of futile communication and which enables the construction of each terminal to be simplified.

The aforementioned primary object can be achieved by a terminal device to be used in a system where sets of transmission document information are transferred via a network between terminal devices which are grouped together in a plurality of different groups, the terminal device comprising: a document information storage unit for storing document information which is made up of a plurality of document elements which are to be transmitted; a terminal device arrangement information storage unit for storing terminal device arrangement information made up of each group name, a types of each terminal device provided at each group and an address of each terminal device; a terminal device capability information control unit for controlling terminal device capability information which shows what kinds of document information can be outputted by each type of terminal device; a transmission document information creation unit for selecting terminal devices based on the group name of a group to be transmitted to and the terminal device arrangement information and for creating sets of the transmission document information from the document information to be transmitted in accordance with the terminal device capability information; and a transmission unit for transmitting the created sets of transmission document information to the selected terminal devices.

By means of the stated construction, since each set of transmission document information transmitted by the transmission unit is created by the transmission document information creation unit in accordance with the type of transmission destination terminal device, which is to say the transmission document information creation unit only creates outputable sets of transmission document information, the transmission destination terminal device is able to output all of the received information with no futile reception of non-outputable data.

Here, the transmission document information creation unit may include a transmission destination terminal device selection unit for selecting a terminal device whose group name in the terminal device arrangement information coincides with the group name to be transmitted to as a transmission destination terminal device, wherein the transmission destination group name may be included in the document information as a transmission address.

Here, the document information storage unit may include a media attribute storage unit for storing, for each document element, a media attribute of a set of element data which is a content of a document element, the terminal device capability information control unit may include an outputable media attribute storage unit for storing each media attribute which can be outputted by each type of terminal device, and the transmission document information creation unit may further include an element data write unit for writing element data which has a media attribute which matches an outputable media attribute for the transmission destination terminal device selected by the transmission destination terminal device selection unit into the present set of transmission document information.

Here, the transmission document information creation unit may create a set of transmission document information for each transmission destination terminal device.

By means of the stated construction, even when document information which is made up of a plurality of document elements is expressed using different media elements, the transmission document creation unit creates each set of transmission document information from only the document information which is expressed using a media attribute which can be outputted by a terminal in question, so that the destination terminal device will definitely be able to output the entire set of transmission document information.

Here, the document information storage unit may include a media attribute storage unit for storing, for each document element, a media attribute of a set of element data which is a content of a document element, the terminal device capability information control unit may include an outputable media attribute obtaining unit for obtaining an outputable media attribute for a transmission destination terminal device selected by the transmission destination terminal device selection unit from the transmission destination terminal device, and the transmission document information creation unit may further include an element data write unit for writing element data which has a media attribute which matches an outputable media attribute for a terminal device which is obtained from the outputable media attribute storage unit into the present set of transmission document information.

Here, the outputable media attribute obtaining unit includes: a media attribute inquiry unit for sending an inquiry to the transmission destination terminal device asking for an outputable media attribute; a media attribute reception unit for receiving a response containing a media attribute from the transmission destination terminal device; an own media attribute storage unit for storing a media attribute of element data which is outputable for a present terminal device; and a media attribute response unit for transmitting, on receiving an inquiry for an outputable media attribute from a terminal device, the media attribute stored by the own media attribute storage unit to the terminal device which sent the inquiry.

By means of the stated construction, even if the transmission source terminal device is unaware of what media attributes of document information can be outputted by a transmission destination terminal device, it can still obtain such media attributes by making an inquiry to the transmission destination terminal device, so that in the same way as above, the destination terminal device will definitely be able to output the entire set of transmission document information.

Here, the terminal device may further comprise a media attribute conversion information storage unit for storing media attribute conversion information which shows how element data is convertible between different media attributes, the transmission document information creation unit may further include a conversion determination unit for determining whether there is any element data which cannot be written into a present set of transmission document information by the element data write unit and a conversion indication unit for indicating, when the conversion determination unit has determined that element data which cannot be written is present, a conversion of a media attribute of the unwritable element data to a media attribute which matches the media attribute of the selected transmission destination terminal device, in accordance with the media attribute conversion information, and the terminal device may further comprise a media attribute conversion unit for converting element data of a media attribute into element data of another media attribute in accordance with an indication received from the conversion indication unit, wherein the element data write unit may write the converted element data into the present set of transmission document information.

By means of the stated construction, if document elements which are expressed by a media attribute which cannot be outputted by the transmission destination terminal device are included in a set of document information, the media attribute of these document elements can be converted to a media attribute which can be outputted by the transmission destination terminal device.

Here, the document information storage unit may include an element data size storage unit for storing a size of each set of element data in each document element, the terminal device capability information control unit may include a terminal device receivable amount storage unit for storing an amount of element data which can be received by each type of terminal device, and the transmission document information creation unit may include an element data write unit for writing element data which is within the amount of element data which can be received by the transmission destination terminal device selected by the transmission destination terminal device selection unit into the transmission document information.

By means of the stated construction, only an amount of element data which is within the receivable amount of data for the transmission destination terminal device is written into each set of transmission document information so that futile communication is not performed.

Here, the document information storage unit may include an element data size storage unit for storing a size of each set of element data in each document element, the terminal device capability information control unit may include a terminal device receivable amount obtaining unit for obtaining a receivable amount of element data for a transmission destination terminal device selected by the transmission destination terminal device selection unit from the corresponding transmission destination terminal device, and the transmission document information creation unit may further include an element data write unit for writing an amount of element data which is within the receivable amount of the transmission destination terminal device which is received from the terminal device receivable amount obtaining unit into the present set of transmission document information.

Here, the terminal device receivable amount obtaining unit may include: an amount inquiry unit for sending an inquiry to the transmission destination terminal device asking for an receivable amount of element data; a reception amount reception unit for receiving a response containing the reception amount from the transmission destination terminal device; an own capacity storage unit for storing a receivable capacity of element data for a present terminal device; and a reception amount response unit for transmitting, on receiving an inquiry for a receivable amount from a terminal device, the receivable amount which is calculated by subtracting a reception amount of currently in use from the receivable capacity stored by the own capacity storage unit to the terminal device which sent the inquiry.

By means of the stated construction, the transmitter terminal device can inquire as to the receivable data amount of the transmission destination terminal device and so learn of the receivable data amount which dynamically corresponds to the state of the transmission destination terminal device. Accordingly, futile communication can be avoided.

Here, the document information storage unit may include: a media attribute storage unit for storing, for each document element, a media attribute of a set of element data which is a content of a document element; and an element data size storage unit for storing, for each document element, a size of the set of element data which is the content of the document element, the terminal device capability information control unit may include an outputable media attribute storage unit for storing each media attribute which can be outputted by each type of terminal device; and a terminal device capacity storage unit for storing a receivable capacity of element data for each type of terminal device, and the transmission document information creation unit may further include an element data determination unit for determining, if element data of a media attribute which corresponds to a media attribute which is outputable for the transmission destination terminal device determined by the transmission destination terminal device selection unit were written in a present set of transmission document information, whether a size of a present set of transmission document information would be within the receivable capacity of the corresponding terminal device; and an element data write unit for writing, when the element data determination unit has determined that the size is within the receivable capacity, the set of element data into the present set of transmission document information.

By means of the stated construction, the transmission document information creation unit creates transmission document information in accordance with the media attributes which are outputable for the transmission destination terminal device and the receivable data amount for the transmission destination terminal device.

Here, the transmission document information creation unit may further include: an element data size calculation unit for calculating a writable amount of element data when the element data determination unit has determined that the size of the transmission document information is not within the receivable capacity, wherein the writable amount of element data is calculated as the receivable capacity of the corresponding terminal device which is written in the terminal device capacity storage unit minus a total amount of element data which has already been written in the set of transmission document information, and each terminal device may further comprise: a compression information storage unit for storing compression information which is made up of a compression method for element data and a compression rate for compressing the element data; a compression possible determination unit for determining whether element data which has been compressed in accordance with the compression rate in the compression information would be within the writable amount calculated by the element data size calculation unit; an element data compression unit for compressing, when the compression possible determination unit has determined that the element data would be within the rewritable amount, the element data to a size equal to the writable amount calculated by the element data size calculation unit using the compression method in the compression information; and a compressed element data write unit for writing the element data compressed by the element data compression unit into the present set of transmission document information.

By means of the stated construction, the transmission document information can be compressed when its size exceeds the receivable amount of the transmission destination terminal device.

Here, the compression information storage unit may include a media attribute-classified compression information storage unit for storing a compression method and a compression rate for each media attribute in element data, and the element data compression unit may include a media attribute compression unit for compressing element data in accordance with the compression method stored in the media attribute-classified compression information storage unit which corresponds to the media attribute.

By means of the stated construction, compression is performed in accordance with the media attribute of element data.

Here, the document information storage unit may further include an element data content storage unit for storing a title for each document element which expresses a content of a corresponding document element, wherein the compression information storage unit may include a content-classified compression information storage unit for storing compression information made up of a compression method and a compression rate for each title in element data, and the element data compression unit may include a content compression unit for compressing element data using a compression method which corresponds to a title of the element data stored in the content-classified compression information storage unit.

By means of the stated construction, compression is performed in accordance with the content element data.

Here, the terminal device may further comprise: a first document information reception unit for receiving, when a second set of transmission document information is transmitted to another transmission terminal at a same group as a present transmission destination terminal device, a first set of transmission document information which is appended with an address of the other terminal device; a first document information storage unit for storing the first set of transmission document information received by the first document information reception unit; a transmission request unit for sending a request to a transmission terminal whose address is appended to the first set of transmission document information asking for transmission of the received second set of transmission document information; a second transmission document information reception unit for receiving the second set of transmission document information which is sent from the other terminal device in accordance with the request from the transmission request unit; and a document information unification unit for unifying the first set of transmission document information and the second set of transmission document information into one set of transmission document information.

Here, the terminal device may further comprise: a request reception unit for receiving the request for the transmission of the second set of transmission document information from the transmission request unit; and a second transmission document information transmission unit for transmitting the received second set of transmission document information in accordance with the received request to the terminal device which issued the request.

By means of the stated construction, the sets of transmission document information are combined within a same group to give the original document, so that the user can receive the document information in its entirety.

Here, the document information storage unit may include: an element data size storage unit for storing a size of each set of element data in each document element; and a document element priority level storage unit for storing a priority level for each document element showing a transmission priority of each document element, the terminal device capability information control unit may include a terminal device capacity storage unit for storing a receivable capacity of element data which can be received by each type of terminal device, and the transmission document information creation unit may include: an element data determination unit for determining, if element data of a high priority document element were written in a present set of transmission document information, whether a data amount of the present set of transmission document information would be within the receivable capacity of element data for the transmission destination terminal device; and an element data write unit for writing the element data into the transmission document information when the element data determination unit has determined that the data amount is within the receivable capacity of element data.

By means of the stated construction, when a proposed set of transmission document element data would exceed the reception capacity of the transmission destination terminal device, element data with a high priority level is given priority when deciding the element data to be included in the set of transmission document information.

The document information storage unit may include a media attribute storage unit for storing, for each document element, a media attribute of a set of element data which is a content of a document element, wherein the terminal device arrangement information storage unit may include a terminal device priority level storage unit for storing a priority level for each terminal device which shows a priority level with which each terminal device receives document elements, wherein the terminal device capability information control unit includes an outputable media attribute storage unit for storing each media attribute which can be outputted by each type of terminal device, wherein the transmission document information transmission unit includes: a prioritized terminal device specifying unit for specifying a terminal device with a high priority level out of the terminal devices selected by the transmission destination terminal device selection unit; a first element data write unit for writing element data which has a media attribute which matches a media attribute which is outputable for the terminal device selected by the prioritized terminal device specifying unit into a present set transmission document information; a prioritized terminal device respecifying unit for specifying a terminal device with a lower priority level than the terminal device specified by the prioritized terminal device specifying unit when the first element data write unit has been unable to write all of the element data into the present set of transmission document information; and a second element data write unit for writing element data with a media attribute which matches a media attribute which is outputable for the terminal device specified by the prioritized terminal device respecifying unit into a different set of transmission document information.

By means of the stated construction, transmission document information is sent transmitted with priority being given to a terminal device with high priority out of the prospective transmission destination terminal devices.

Here, the terminal device of claim 2 may further comprise: a communication state obtaining unit for obtaining a communication state of the terminal device selected by the transmission destination terminal device selection unit, wherein the document information storage unit includes a media attribute storage unit for storing, for each document element, a media attribute of a set of element data which is a content of a document element, wherein the terminal device capability information control unit includes outputable media attribute storage unit for storing each media attribute which can be outputted by each type of terminal device, and wherein the transmission document information creation unit further includes an element data write unit for writing element data which has a media attribute which matches an outputable media attribute for a terminal device whose communication state obtained by the communication state obtaining unit is that communication is possible.

Here, the communication state obtaining unit may include: an communication state inquiry unit for sending an inquiry to the terminal device selected by the transmission destination terminal device selection unit asking whether communication is possible; a communication state inquiry reception unit for receiving a response from another terminal device sent in accordance with the inquiry from the communication state inquiry unit; a communication state inquiry response unit for sending a response showing that communication is possible after receiving an inquiry about communication state from another terminal device; a communication state determination unit for determining that a communication state of a terminal device is that communication is possible after the communication state inquiry reception unit has receiving a response from the terminal device and for determining that a communication state of a terminal device is that communication is not possible when there has been no response to the inquiry sent by communication state inquiry unit within a predetermined period.

By means of the stated construction, another terminal device can be transmitted to when a presently-selected transmission destination terminal device is unable to perform communication.

Here, the terminal device may further comprise: a document element transmission address information storage unit for storing document element transmission address information made up of each document element in sets of transmission document information created by the transmission document information creation unit and a list of addresses of terminal devices which are transmission addresses for each document element; and a transmission destination terminal device address extraction unit for extracting an address of a terminal device which is a transmission address of a document element which is included in document element transmission address information but not included in a present set of transmission document information, wherein the transmission document information creation unit may include an appending unit for appending the present set of transmission document information with the address extracted by the transmission destination terminal device address extraction unit.

Here, the appending unit may convert the extracted address to a same media attribute as written in the present set of transmission document information by the element data write unit before appending.

By means of the stated construction, when the document information is divided and transmitted to a plurality of terminal devices, the locations of the other transmission document terminal devices are clearly stated, so that the user can receive all of the sets of transmission document information without losing track of any.

Here, the terminal device of claim 1, further comprising group state inquiry address information storage unit for storing an address of one terminal device in each group which receives an inquiry about whether to transmit a set of transmission document information to any prioritized terminal device provided in a group, wherein the transmission document information creation unit further includes a group state inquiry unit for sending an inquiry to a terminal device having an address which is in a group name to be transmitted to and which is stored by the group state inquiry address information storage unit, wherein the group name is included in document information as a transmission address, wherein the terminal device further comprises first group state inquiry reception unit for receiving a group state from a terminal device to which an inquiry was sent, in reply to the inquiry from the group state inquiry unit, wherein the terminal device arrangement information storage unit includes a group state corresponding priority level storage unit for storing a priority level of each terminal device in accordance with a group state, wherein the document information storage unit includes a media attribute storage unit for storing, for each document element, a media attribute of a set of element data which is a content of a document element, wherein the terminal device capability information control unit may include an outputable media attribute storage unit for storing each media attribute which can be outputted by each type of terminal device, and the transmission document information creation unit may further include an element data write unit for writing element data which has a media attribute which matches a media attribute for a terminal device whose priority level is high in accordance with the group state received by the first group state inquiry reception unit into the present set of transmission document information.

Here, the terminal device specified by the address stored by the group state inquiry address information storage unit may further comprise: a second group state inquiry reception unit for receiving an inquiry about group state from another terminal device; and a group state inquiry response unit for sending a response to the other terminal device about a group state set in accordance with the inquiry received by the group state inquiry response unit.

By means of the stated construction, sets of transmission document information which specify a transmission destination terminal device in accordance with priority levels which correspond to the group state are transmitted, so that these can correspond to the operational state of a user's terminal devices.

The third object of the present invention can be achieved by a relaying device provided in a system where sets of transmission document information are transferred via a network between terminal devices provided in a plurality of different groups, the relaying device comprising: a reception unit for receiving a transmission of document information made up of a plurality of document elements from any of the terminal devices, wherein the document information includes a group name as a transmission address; a document information storage unit for storing document information which is received by the reception unit; a terminal device arrangement information storage unit for storing terminal information arrangement information made up of each group name, a type of each terminal device provided at each group and an address of each terminal device; a terminal device capability information control unit for controlling terminal device capability information which shows what kinds of document information can be outputted by each type of terminal device; a transmission document information creation unit for selecting terminal devices provided in a group whose group name in the terminal device arrangement information matches the group name in the document information as transmission destination terminal devices and for creating sets of the transmission document information from document information to be transmitted in accordance with the terminal device capability information; and a transmission unit for transmitting the created sets of transmission document information to the selected terminal devices.

By means of the stated construction, the construction of each terminal device can be simplified.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 3 shows the document data for the document shown in FIG. 2 which is stored in the document information storage unit of the conventional transmitter terminal device;

FIG. 4 shows the document outputted by a conventional receiver terminal device;

FIG. 7 shows an example of a document information control table for the document shown in FIG. 7;

FIG. 8 shows the terminal device arrangement information stored in the terminal device arrangement information storage unit of the terminal device;

FIG. 9 shows the outputable media attribute information stored in the outputable media attribute information storage unit of the terminal device;

FIG. 10 shows a transmission document control table stored by the transmission document information temporary storage unit of the terminal device;

FIG. 11 also shows a transmission document control table stored by the transmission document information temporary storage unit of the terminal device;

FIG. 17 shows the document information control table stored by the document information storage unit of the terminal device;

FIG. 18 shows the terminal device arrangement information stored in the terminal device arrangement information storage unit of the terminal device;

FIG. 19 shows a transmission document control table stored by the transmission document information temporary storage unit of the terminal device;

FIG. 20 shows the media attribute conversion information stored in media attribute conversion information storage unit;

FIG. 21 shows the transmission document control table stored by the transmission document information temporary storage unit;

FIG. 24 shows the terminal device arrangement information stored by the terminal device arrangement information storage unit of the terminal device;

FIG. 25 shows the receivable capacity information stored in the receivable capacity information storage unit of the terminal device;

FIG. 26 shows a transmission document control table stored by the transmission document information temporary storage unit of the terminal device;

FIG. 31 shows the terminal device arrangement information stored by the terminal device arrangement information storage unit of the terminal device;

FIG. 32 shows the terminal device capability information stored by the terminal device capability information of the terminal device;

FIG. 33 shows the media attribute group compression information stored by the media attribute group compression information storage unit of the terminal device;

FIG. 38 shows a transmission document control table stored by the document information storage unit of the terminal device;

FIG. 39 shows the element content group compression information stored by the element content group compression information storage unit of the terminal device;

FIG. 40 shows an example of the proper noun dictionary stored by the element content group compression information storage unit of the terminal device;

FIG. 41 shows a transmission document control table stored by the transmission document information temporary storage unit of the terminal device;

FIG. 42 also shows a transmission document control table stored by the transmission document information temporary storage unit of the terminal device;

FIG. 44 shows a transmission document control table stored by the document information storage unit of the terminal device;

FIG. 47 shows a transmission document control table stored by the transmission document information temporary storage unit of the terminal device;

FIG. 50 shows the terminal device arrangement information stored by the terminal device arrangement information storage unit of the terminal device;

FIG. 57 shows the terminal device arrangement information stored by the terminal device arrangement information storage unit of the terminal device;

FIG. 60 shows the document element transmission destination information stored in the document element transmission destination information of the terminal device;

FIG. 61 is a transmission document control table stored by the transmission document information temporary storage unit of the terminal device;

FIG. 62 is a transmission document control table stored by the transmission document information temporary storage unit of the terminal device;

DESCRIPTION OF THE PREFERRED EMBODIMENTS

Figure 1:
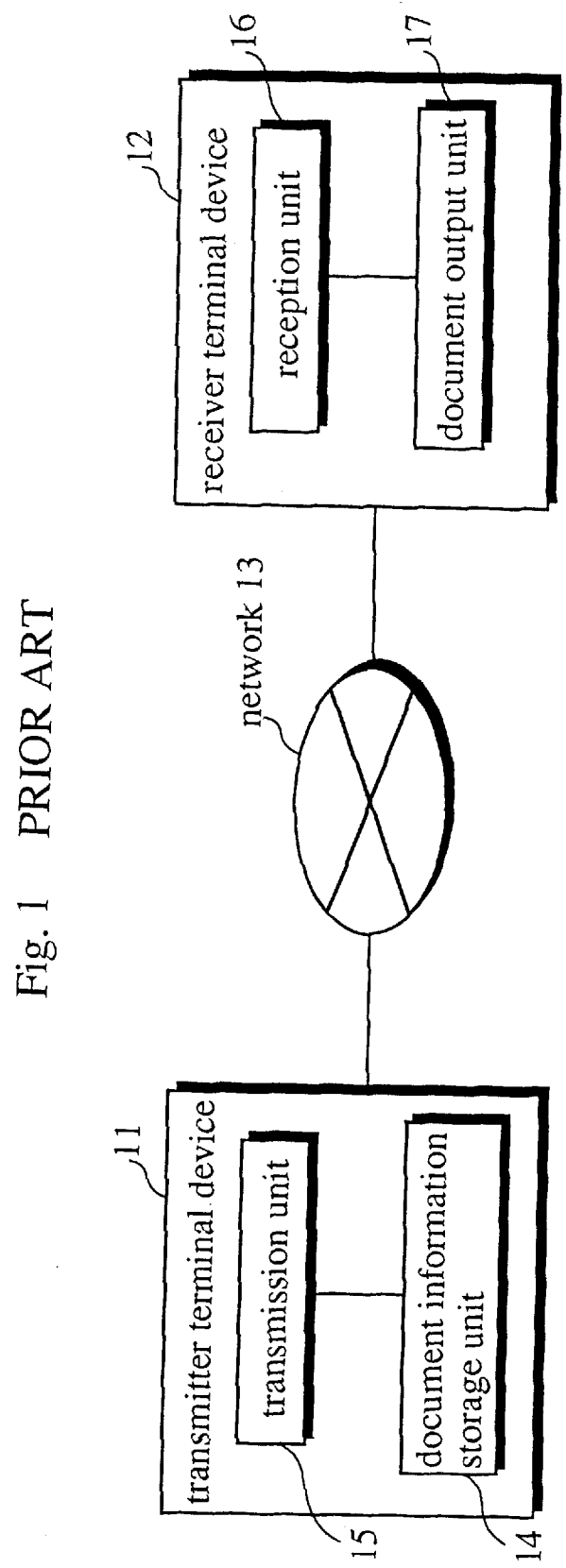
FIG. 1 shows the construction of terminal devices in a conventional document information communication system.
Figure 2:
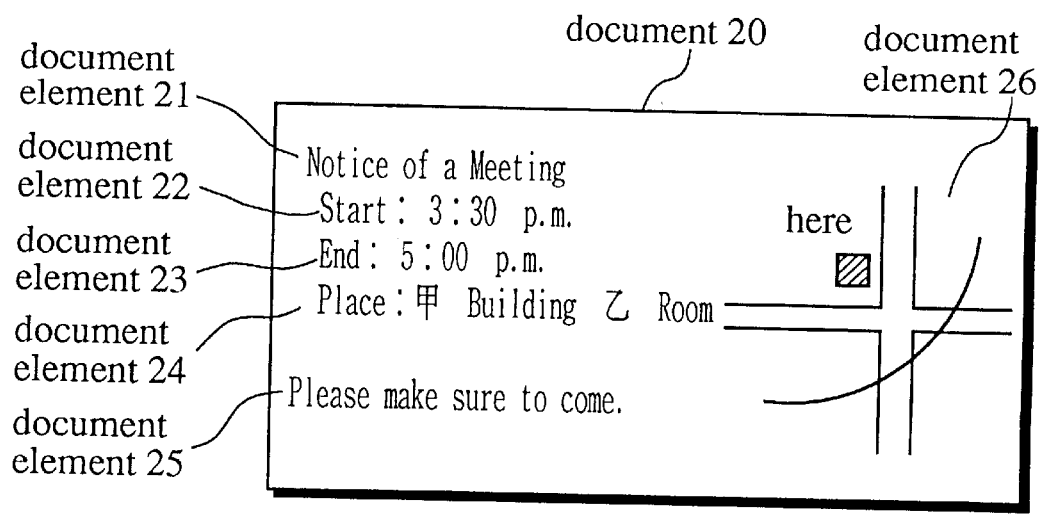
FIG. 2 shows an example of a document to be transmitted by a conventional terminal device.
Figure 5:
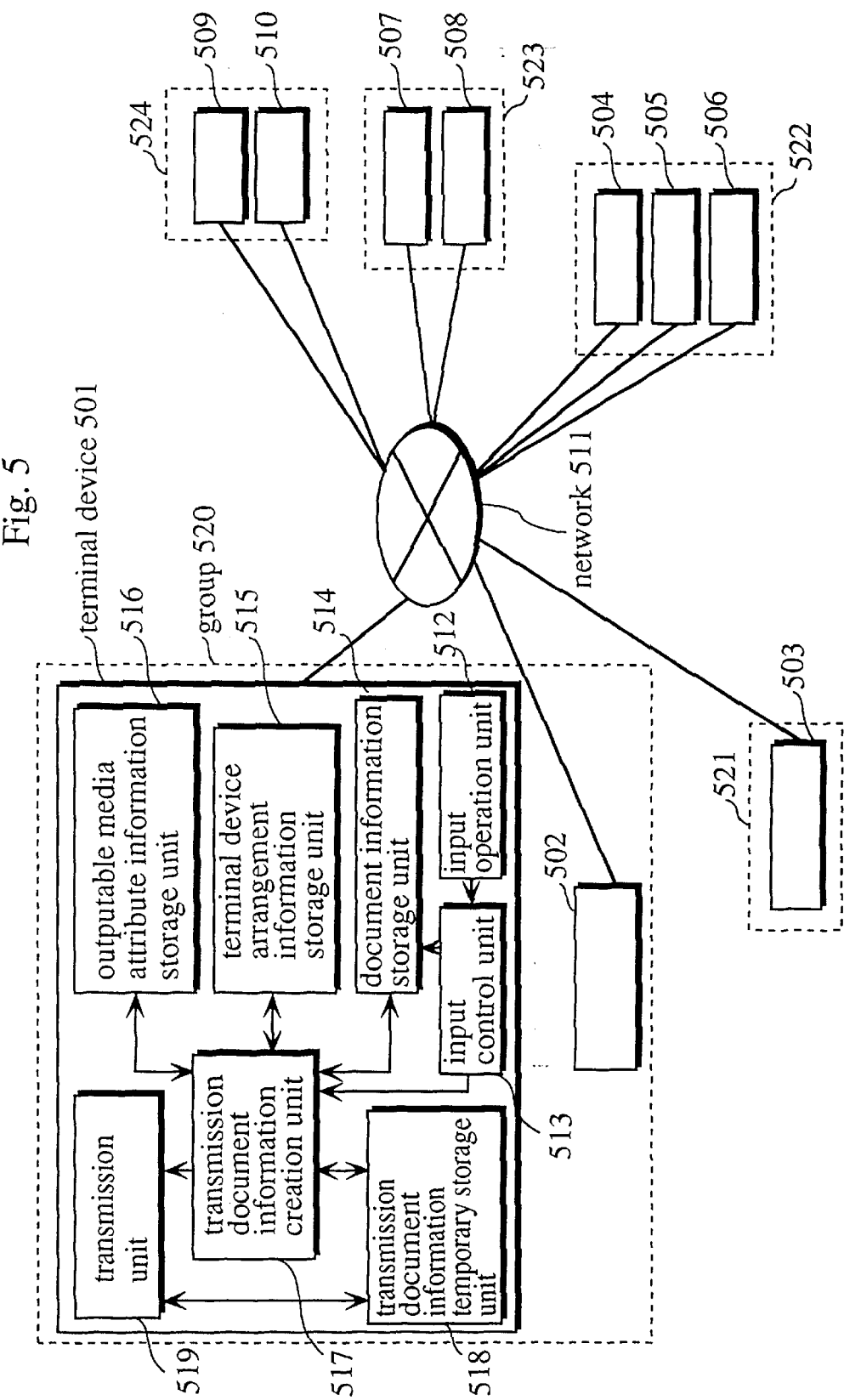
FIG. 5 shows the construction of the terminal device in a document information communication information system to which the first embodiment of the present invention relates.

FIG. 5 shows the construction of the terminal device in the document information communication system of the first embodiment of the present invention.

The document information communication system comprises a plurality of terminal devices 501, 502, 503 . . . 510 and network 511 which connects each of the terminal devices.

Each terminal device comprises input operation unit 512, input control unit 513, document information storage unit 514, terminal device arrangement information storage unit 515, outputable media attribute information storage unit 516, transmission document information creation unit 517, transmission document information temporary storage unit 518 and transmission unit 519.

Terminal devices 501 and 502 belong to group 520. Terminal device 503 belongs to group 521. Terminal devices 504, 505 and 506 belong to group 522. Terminals devices 507 and 508 belong to group 523. Terminal devices 509 and 510 belong to group 524.

Each group is made up of terminal devices which are used by a same user.

Figure 6:
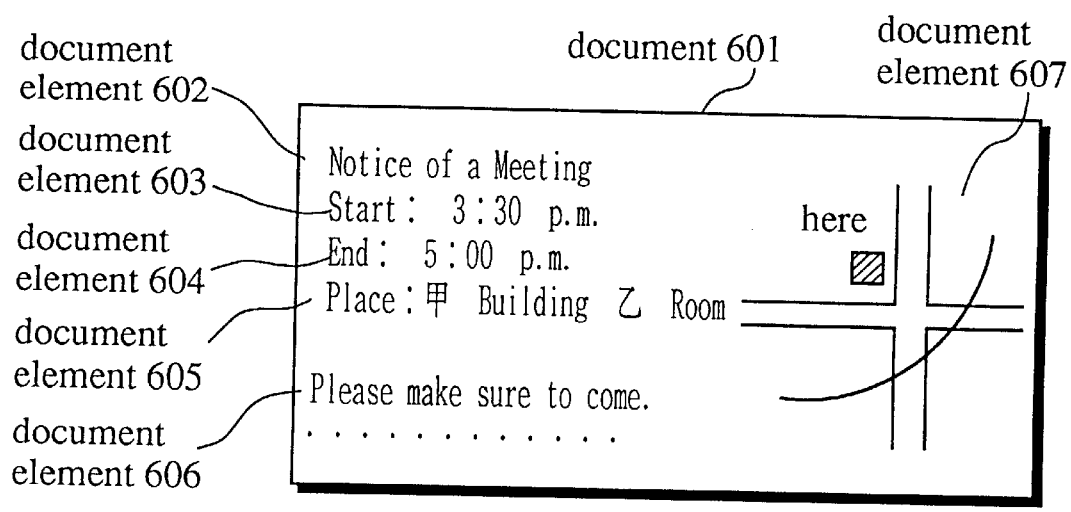
FIG. 6 shows an example of a document sent by a transmitter terminal device.

Input operation unit 512 consists of a keyboard, a mouse, a scanner and the like. Input unit 512 receives input of document 601 to be transmitted as shown in FIG. 6. Document 601 comprises document elements 602, 603, 604, 605 and 606 which have "characters" as their media attributes and document element 607 which has "monochrome still picture" as its media attribute. Input operation unit 512 receives input of document 601 and transfers the content of document 601 to input control unit 513. Input operation unit 512 receives the user's indication of a name of a group including a transmission destination terminal and transfers the group name to input control unit 513.

On receiving the content of document 601 from input operation unit 512, input control unit 513 stores document 601 in document information storage unit 514 as document information control table 701 in FIG. 7. Document information control table 701 comprises a list of element data 702 showing the content of the document elements, element data size 703 and media attribute 704.

Here, input control unit 513 decides the media attributes as follows. As examples, when the user's input operations in input operation unit 512 are keyboard operations, the media attribute is "character"; when they are scanner operations, the media attribute is "monochrome still picture", when they are hand-writing operations using a tablet, the media attribute is "ink". Input operation unit 513 calculates the capacity of the element data to obtain element data size when the user designates one document element by pressing Enter.

Input control unit 513 receives the name of the transmission destination group, writes it in group name column 705 in document information control table 701 and activates transmission document information creation unit 517.

Document information storage unit 514 consists of erasable memory and stores document information control table 701 in FIG. 7. When document information control table 701 is stored by input control unit 513, no flags are set in flag column 706 beside element data 702. Flags are set when transmission document data is created from each element data 702 by transmission document information creation unit 517.

For example, "A" is written in group name column 705 in document information control table 701, "A" being the group name indicated by the user in input operation unit 512. In the first row 707, element data "Notice of a Meeting", an element data size "19" and a media attribute "character" of document element 602 of document 601 are stored.

Terminal device arrangement information storage unit 515 consists of erasable memory and stores terminal device arrangement information 801 in FIG. 8 beforehand.

Terminal device arrangement information 801 comprises group name column 802, address column 803 of the terminal device belonging to the group in group name column 802, type column 804 showing the type of the terminal device and flag column 805. Flags are set in flag column 805 by transmission document information creation unit 517 which will be explained later.

In FIG. 8, group 524 in FIG. 5 is shown as "A". The address of terminal device 509 is "A@.abc.def.jp" and it is a "character e-mail terminal". The address of terminal device 510 is "06-123-4567" and it is "FAX".

The content of terminal device arrangement information 801 can be updated when one or more of the terminal devices in the document information communication system changes.

Outputable media attribute information storage unit 516 has stored outputable media attribute information 901 in FIG. 9 beforehand as terminal device capability information. Outputable media attribute information 901 comprises type column 902 showing the type of the terminal device and media attribute column 903 showing the media attribute to be outputted by the terminal device.

Outputable media attribute information 901 in FIG. 9 shows that when the terminal device is a facsimile, element data having "monochrome still picture" as its media attribute can be outputted; when it is a telephone, element data having "audio" as its media attribute can be outputted; and when it is a character e-mail terminal, element data having "character data" as its media attribute can be outputted.

Transmission document information creation unit 517 is activated by input control unit 513 and does the following: reads the group name stored in group name column 705 in document information control table 701 stored in document information storage unit 514; finds the same group name in group name column 802 in terminal arrangement information 801 stored in terminal arrangement information storage unit 515; reads the type of a terminal device and its address; sets a flag for the terminal device in flag column 805; creates a transmission document control table having that terminal device as transmission destination terminal device in transmission document information temporary storage unit 518, as shown in FIGS. 10 and 11; and writes the type of the terminal device and its address in transmission destination terminal column 1002 in transmission document control table 1001. For example, in the case of document information control table 701 in FIG. 7, "A" is the group name of the transmission destination group, so that "character e-mail" of the terminal device belonging to "A" in terminal device arrangement information 801 and its address "A@abc.def.jp" are written in transmission destination terminal column 1002.

Next, transmission document information creation unit 517 reads the outputable media attribute of the type of the transmission destination terminal device of outputable media attribute information 901 stored in outputable media attribute information storage unit 516 and writes it in media attribute column 1003 in transmission document control table 1001. In the above example, the media attribute is "character". Transmission document information creation unit 517 reads the element data and size of the media attribute of "character" in document information control table 701 stored in document information storage unit 514, writes them in element data column 1004 and element data size column 1005 in transmission document control table 1001 for each document element and sets a flag for each of them in flag column 706. When there is no element data which corresponds to the media attribute in document information control table 701, document information creation unit 517 completes the creation of transmission document control table 1001.

Next, document information creation unit 517 reads the type and address of the terminal device which has not been flagged in flag column 805, the terminal device corresponding to the name of the transmission destination group in terminal device arrangement information 801 in terminal device arrangement information storage unit 515, and creates a new transmission document control table as shown in FIG. 11. Terminal device arrangement information storage unit 515 sets a flag in flag column 805 for the terminal device and creates transmission document control table 1101. In this transmission document control unit 1101, the type of the transmission destination terminal device is "FAX" and its outputable media attribute is "monochrome still picture". They correspond to the media attribute of the element data 708 on the sixth row in document information control table 701. Therefore, transmission document information creation unit 517 writes the element data and its size in element data column 1102 and size column 1103 in transmission document control table 1101. In transmission destination terminal column 1104, "FAX" and "06-123-4567" are stored.

Transmission document information creation unit 517 checks whether each entry of the flag column of the element data in document information control table 701 is flagged. If so, this means that there are some remaining element data to be transmitted. Therefore, transmission document information creation unit 517 searches for a transmission destination terminal device which is not flagged in terminal device arrangement information 801. When flags are set for all of the available types of terminal device or for all of the element data in document information control table 701, transmission document information creation unit 517 activates transmission unit 519 as the creation of the transmission document has already been completed.

Transmission document information temporary storage unit 518 consists of a buffer and is made to store transmission document control tables 1001 and 1101 in FIGS. 10 and 11, respectively, by transmission document information creation unit 517.

Transmission destination terminal device columns 1102 and 1104 in transmission document control tables 1001 and 1101, respectively, store the type of the transmission destination terminal device and its address. The element data to be transmitted has media attribute which can be outputted by the designated terminal device.

On being activated by transmission document information creation unit 517, transmission unit 519 reads the transmission document control table stored in transmission document information temporary storage unit 518 for each transmission destination terminal device and transmits the element data to the transmission destination terminal.

For example, according to transmission document control table 1001 shown in FIG. 10, transmission unit 519 transmits the element data having "character" as its media attribute stored in element data column 1004 in transmission document control table 1001 to terminal device 509 which is a character e-mail terminal in group 524 having the group name "A". After that, transmission unit 519 transmits the element data having "monochrome still picture" as its media attribute stored in element data column 1102 in FIG. 11 to terminal device 510 which is "FAX" in group 524 via network 511.

Here, if the transmission destination terminal device is registered in the transmission document control table, no transmission will occur if element data is not present in the table.

Figure 12:
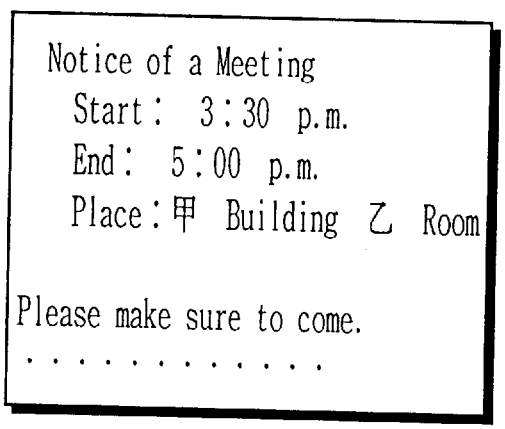
FIG. 12 shows the document which is display outputted by the terminal device which received the element data in the transmission document control table shown in FIG. 10.
Figure 13:
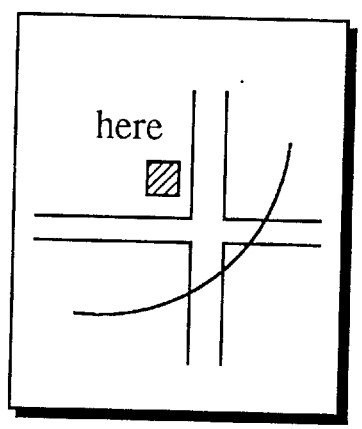
FIG. 13 shows the document which is display outputted the terminal device which received the element data in the transmission document control table shown in FIG. 11.

A reception unit (not illustrated) of terminal device 509 receives element data transmitted from terminal device 501 of group 502 and its output unit (not illustrated) decodes all the element data received by the reception unit as shown in FIG. 12 and outputs it for display. Likewise, an output unit (not illustrated) of terminal device 510 outputs all the element data received by its reception unit (not illustrated) for display.

The operations of the present embodiment can be explained as follows by means of the flowchart in FIG. 14.

The user inputs a document into input operation unit 512, and indicates the transmission destination terminal (Step 1402).

Transmission document information creation unit 517 finds the same group as the transmission destination group in document information control table 701 from terminal device arrangement information 801 and determines if all terminal devices in the group are flagged (Step 1404). If so, transmission document information creation unit 517 advances to Step 1414. If not, transmission document information creation unit 517 reads one terminal device which is not flagged and sets its flag (Step 1406). According to the type of the terminal device, transmission document information creation unit 517 obtains the media attribute which can be outputted by the terminal device, referring to outputable media attribute information 901 (Step 1408).

Transmission document information creation unit 517 creates transmission document control table 1001 having the terminal as the transmission destination terminal, writes all element data of the document element having the media attribute which can be outputted by the terminal device from document element in document information control table 701 and sets flags for the transcribed element data in flag column 706 in document information control table 701 (Step 1410). Transmission document information creation unit 517 determines if all element data is flagged in document information control table 701 (Step 1412), returning to Step 1404 if this is the case, or otherwise instructing transmission unit 519 to transmit the element data (Step 1414).

Transmission unit 519 receives the instruction of transmission, successively reads transmission document control tables 1001 and 1101 stored in transmission document information temporary storage unit 518, and transmits the element data to each transmission destination terminal device (Step 1416).

When each terminal device receives transmission of the element data, they decode all the element data, output them for display and completes the processing.

(Second Embodiment)

Figure 15:
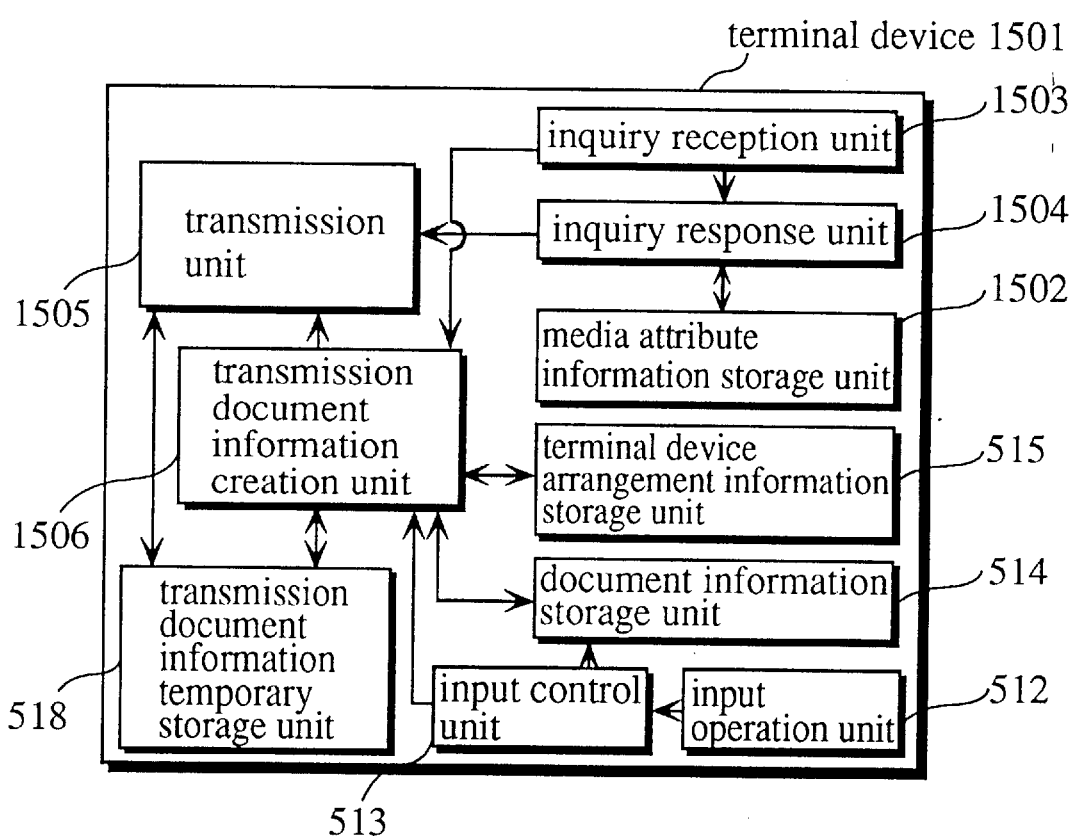
FIG. 15 shows the construction of the terminal device in a document information communication information system to which the second embodiment of the present invention relates.

FIG. 15 shows the construction of the terminal device in the document information communication system of the second embodiment of the present invention.

Terminal device 1501 comprises input operation unit 512, input control unit 513, document information storage unit 514, terminal device arrangement information storage unit 515, media attribute information storage unit 1502, inquiry reception unit 1503, inquiry response unit 1504, transmission unit 1505, transmission document information creation unit 1506 and transmission document information temporary storage unit 518. Terminal device 1501 differs from terminal device 501 of the first embodiment in that it comprises media attribute information storage unit 1502, inquiry reception unit 1502 and inquiry response unit 1504 instead of outputable media attribute information storage unit 516. Therefore, the functions of the transmission unit 1505 and transmission document information creation unit 1506 are a little different. The other elements are the same and have been given the same reference numbers. Accordingly, the following explanation will focus on only the differences with the first embodiment.

Media attribute information storage unit 1502 stores media attributes which can be decoded and outputted when terminal device 1501 receives the element data. For example, media attribute information storage unit 1502 stores that "character" and "monochrome still picture" can be outputted at the same time.

Inquiry reception unit 1503 receives an inquiry from one of the other terminal devices, the inquiry asking what element data can be outputted by terminal device 1501 via network 511, and transfers the address of that terminal device to response unit 1504.

Inquiry reception unit 1503 receives the address and media attribute of the terminal device and transfers them to transmission document creation unit 1506.

On receiving the address and media attribute of the terminal device from the inquiry reception unit 1503, inquiry response unit 1504 reads "character" and "monochrome still picture" stored in media attribute information storage unit 1502, and transfers them to transmission unit 1505.

Transmission unit 1505 transmits its own address and media attribute to the terminal device via network 511, the terminal device having the address transferred from inquiry response unit 1504.

On receiving a notification from transmission document information creation unit 1506 that it wants to acquire the address and media attribute, transmission unit 1505 transmits its own address in response, and also transmits an inquiry asking for the outputable media attribute of the appropriate terminal device.

In creating the transmission document control table in transmission document information temporary storage unit 518, transmission document information creation unit 1506 first writes the type of terminal device and its address in the transmission destination terminal device column, and then, in order to know element data of what media attribute can be outputted from the terminal device of that address, informs the transmit unit 1505 of the address and media attribute it wishes to know, unlike in the first embodiment where the outputable media attribute information was read. In the present embodiment, transmission document information creation unit 1506 transfers its desired address and media attribute to transmission unit 1505. Transmission document information creation unit 1506 receives address and media attribute of one of the other terminal devices and writes them in media attribute column in the transmission document control table., Other functions are the same as transmission document information creation unit 517 of the first embodiment.

The operations of the present embodiment are almost the same as the first embodiment. The following explanation will focus on only the different points.

Figure 14:
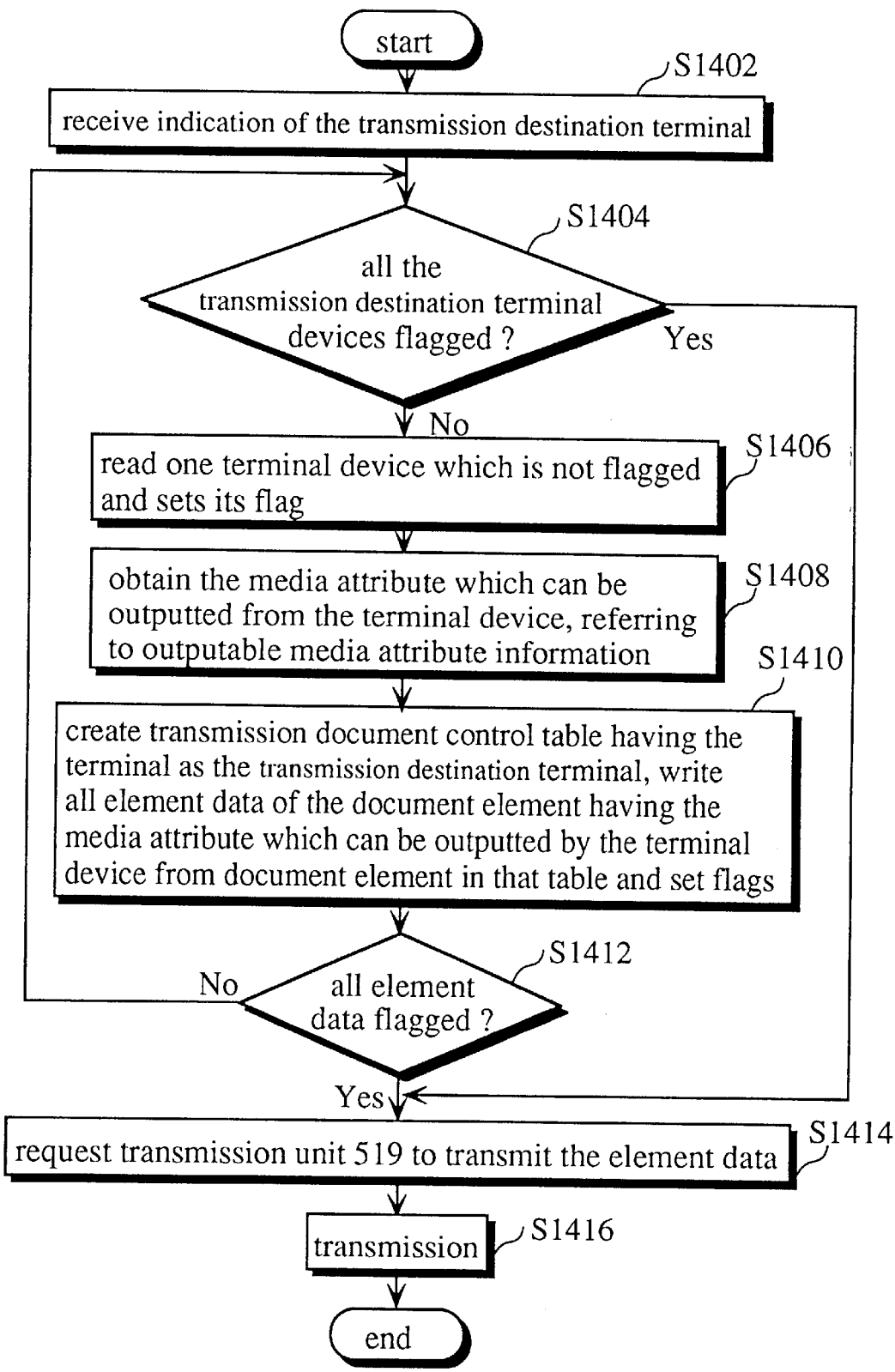
FIG. 14 is a flowchart showing the operation of the first embodiment.

Instead of Step 1408 in FIG. 14, transmission document information creation unit 1506 notifies transmission unit 1505 that it wants to acquire the address and outputable media attribute of the appropriate terminal device. Terminal unit 1505 transmits that notification to the terminal device via network 511. The inquiry reception unit of the terminal device receives that notification and transmits it to the inquiry response unit. The inquiry response unit reads the media attribute from the media attribute information storage unit of the terminal device and its transmission unit transmits the media attribute to inquiry reception unit 1503 of terminal device 1501. Transmission document information creation unit 1506 obtains the outputable media attribute of the transmitter terminal device received by inquiry reception unit 1503.

As mentioned above, each terminal device of the present embodiment transmits the media attribute of the element data which it can output in response to an inquiry from one of the other terminal devices. Therefore, it is not necessary for each terminal device to store the outputable media attribute of other terminal devices (outputable media attribute information) in the document information communication system. This is to say, if one or more of the terminal devices and its outputable media attribute are changed in each group, it is not necessary to change the outputable media attribute information in all terminal devices in the document information communication system.

According to the first and the second embodiments, it is possible to device a document consisting of a variety of media attributes and transmit them to terminal devices which are capable of outputting each media attribute. Therefore, futile communication and wasteful use of memory do not occur. As mentioned above, even though one receiver terminal device is not capable of outputting all the media attributes included in the document, it is possible to divide and transmit the document to a plurality of terminal devices which belong to the same group. Therefore, all contents of the document can be transmitted to the user.

In the above embodiment, an example where the document was divided into two and transmitted to two terminal devices in a receiver group was given. The number of the receiver terminal devices can be only one, or it can be three or more. In the above embodiment, the media attribute was only "character" and "monochrome still picture". But other media attributes, such as "audio", "color still picture", "motion picture", "ink" and "script" can also be included. In the present embodiment, transmission document information creation unit 517 instructs transmission unit 519 to transmit the content of transmission document control table 1001 after creating a plurality of transmission document control tables 1001. However, transmission document information creation unit 517 may instruct transmission unit 519 to transmit it every time it creates one transmission document control table 1001. In the above embodiment, all the media attributes of the document elements of the document can be outputted by any of the terminal devices belonging to the same group. It may be possible that media attributes which cannot be outputted by any of the transmission destination terminal devices are included. In such a case, transmission of the futile element data does not occur.

(Third Embodiment)

Figure 16:
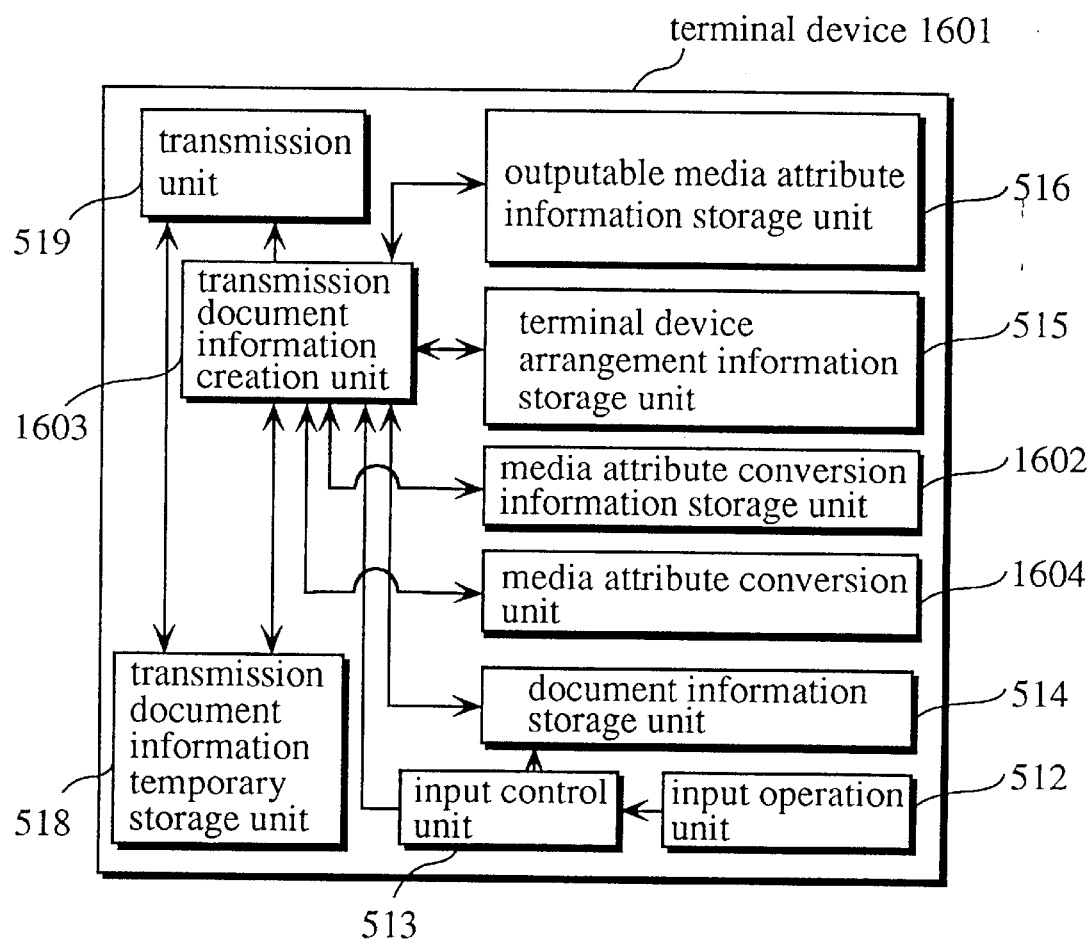
FIG. 16 shows the construction of the terminal device in a document information communication information system to which the third embodiment of the present invention relates.

FIG. 16 shows construction of the third embodiment of each terminal device in the document information communication system of the present invention. Terminal device 1601 comprises input operation unit 512, input control unit 513, document information storage unit 514, terminal device arrangement information storage unit 515, outputable media attribute information storage unit 516, media attribute conversion information storage unit 1602, transmission document information creation unit 1603, media attribute conversion unit 1604, transmission document information temporary storage unit 518 and transmission unit 519.

Terminal device 1601 differs from terminal device 501 of the first embodiment in that it comprises media attribute conversion information storage unit 1602 and media attribute conversion unit 1604. The other elements have been given the same reference numbers and the following explanation will focus on only the differences.

FIG. 17 shows document information control table 1701 stored in document information storage unit 514. The difference with the first embodiment is document information control table 701 and "C" in group name column 705. Group "C" can, for example, be group 523 having terminal device 507 and 508. According to "C" 1802 in terminal device arrangement information 1801 in FIG. 18, terminal device 507 is "telephone" whose address is "03-9876-5432" and terminal device 508 is "FAX" whose address is "03-9876-5678". Outputable media attribute information 901 shows that terminal 507 has "audio" as its outputable media attribute and terminal device 508 has "monochrome still picture" as its outputable media attribute. By the same processing as the first embodiment, transmission document control table 1901 in FIG. 19 is created.

Media attribute conversion information storage unit 1602 has stored media attribute conversion information 2001 as shown in FIG. 20 beforehand. Media attribute conversion information 2001 shows relations between outputable media attributes. For example, it shows that media attribute "character" stored in media attribute column 2002 can be converted to "audio" or "monochrome still picture" stored in convertible media attribute column 2003 without changing the content of the element data in element data column 702 in document information control table 1701. At the same time, media attribute conversion information 2001 shows that "audio" can be converted to "character".

Transmission document information creation unit 1603 comprises the following functions in addition to transmission document information creation unit 517 of the first embodiment.

When flags are not set for all of the document elements in document information control table 1701 and all transmission destination terminal devices are flagged in terminal device arrangement information 1801, in other words, when some of the element data in document information control table 1701 have not been transcribed into the transmission document control table, transmission document information creation unit 1603 resets all the flags in flag column 805 in terminal device arrangement information 1801, reads one terminal device belonging to the transmission destination group in terminal device arrangement information 801, and sets its flag in flag column 805. Transmission document information creation unit 1603 refers to outputable media attribute information 901 and obtains the outputable media attribute.

In document information control table 1701 shown in FIG. 17, element data 1702–1706 having "character" as their media attribute are not flagged. The outputable media attribute of terminal 507 in transmission destination group 523 "C" is "audio". It is possible to convert element data having "character" as its attribute to element data having "audio" as its media attribute, which is shown by media attribute conversion information 2001. Transmission document information creation unit 1603 successively reads out element data 1702 "Notice of a Meeting" to element data 1706 "Please make sure to come." and instructs media attribute conversion unit 1604 to convert the media attribute from "character" to "audio".

Document information control table 1701 receives the indication of the converted element data from media attribute conversion unit 1604, sets flags in flag column 706 in document information control table 1701 stored in document information storage unit 514, transcribes the transferred element data, its media attribute and the transmission document control table 2101 in transmission document information temporary storage unit 518, as shown in FIG. 21.

Media attribute conversion unit 1604 receives the media attribute and element data which should be converted from transmission document information creation unit 1603, converts the element data to the transferred media attribute and transfers the converted element data to transmission document creation unit 1603.

Media attribute conversion unit 1604 stores an algorithm and the like for converting "character" to "audio". Such algorithms are well-known. Converting the media attribute from "character" to "audio" is mentioned in "Bit" (Kyoritsu Shuppan, pages 11–20, March Issue, 1995). On the other hand, "character" to "monochrome still picture" is carried out by creating bit map data by developing fonts corresponding to character codes. Converting "audio" to "character" is disclosed in "Nikkei Byte" (Nikkei BP Co. pages 212–219, June Issue, 1992).

Transmission document information temporary storage unit 518 temporarily stores table 2101 whose transmission destination terminal device, terminal device 507 ("telephone"), has had its media attribute converted along with transmission document control table 1901 having terminal device 508 as transmission destination terminal device.

As element data 2102 to 2106 in transmission document control table 2101 have "audio" as their media attributes, their data sizes are different from those in document information control table 1701.

Figure 22:
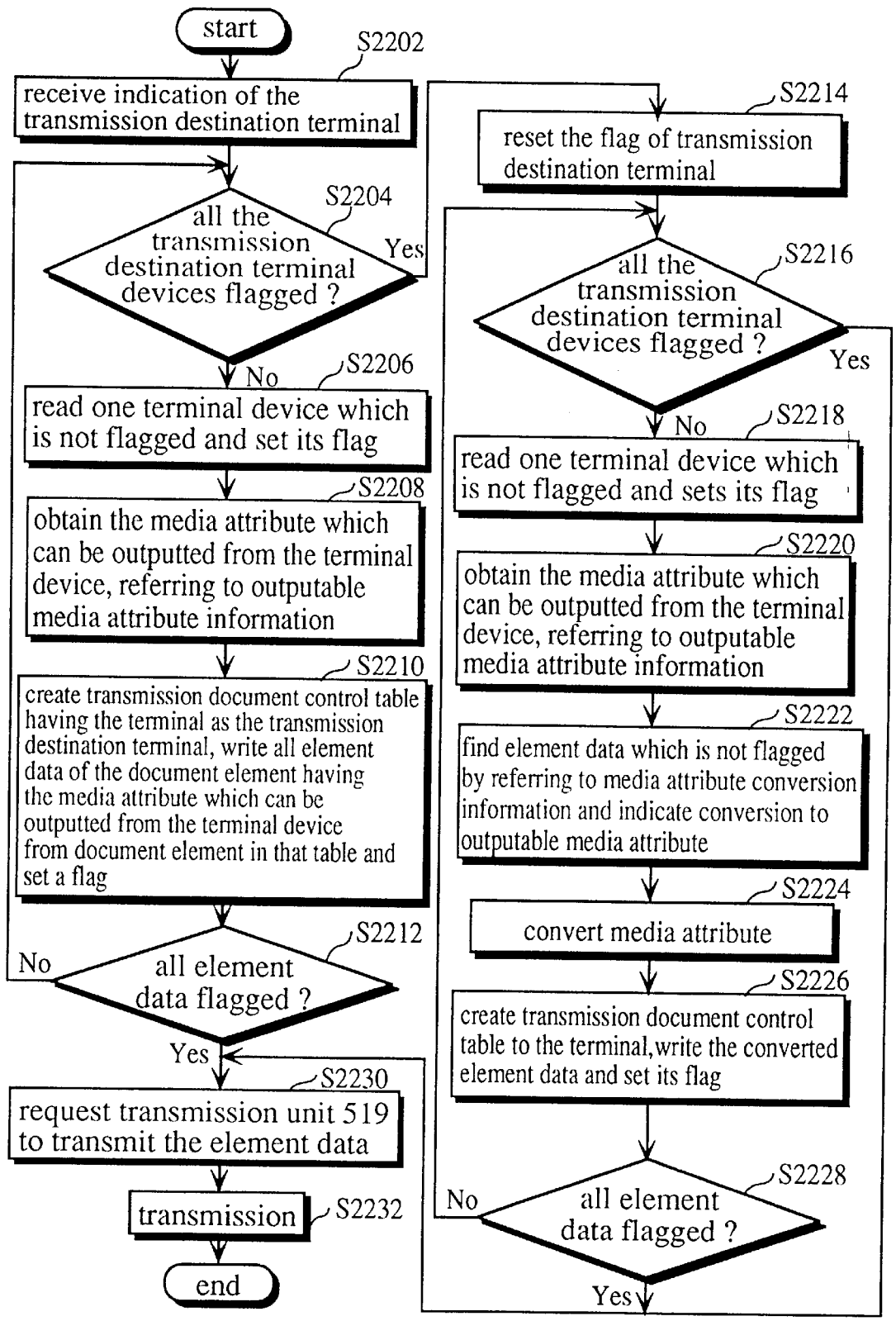
FIG. 22 is a flowchart showing the operation of the third embodiment.

The operations of the present embodiment can be explained as follows by means of the flowchart in FIG. 22. No explanation of Steps 2202 to 2212 is given here because the operations are the same as Steps 1402 to 1412 of the first embodiment. The following explanation will only focus on the differences.

If flags are set for all receiver terminal devices in Step 2204, transmission document information creation unit 1603 resets the flags in flag column 805 in terminal device arrangement information 1801 (Step 2214), determines if flags, are set for all receiver terminal devices (Step 2216), advance, to Step 2230 when this is the case. If not, it reads one terminal device which is not flagged and sets its flag (Step 2218), refers to the outputable media attribute information for the type of the terminal device, and obtains the media attribute of that terminal device (Step 2220).

By referring to media attribute conversion information 2001, transmission test information creation unit 1603 finds element data which has not been flagged in document information control table 1701 and which can be converted to the media attribute obtained in Step 2220, instructs media attribute conversion unit 1604 to convert the media attribute of the element data, and transfers the converted element data to transmission document information creation unit 1603 (Step 2224).

Transmission document information creation unit 1603 transcribes the transferred element data in the transmission document control table and sets a flag in the document information control table for the corresponding element data (Step 2226), determines whether flags are set for all element data (Step 2228), advancing to Step 2230 and instructing transmission unit 518 to transmit the element data (Step 2230) when this is the case, or otherwise returning to Step 2216.

Transmission unit 518 transmits the element data to the terminal device having the address in transmission document information control tables 1901 and 2101 stored in transmission document information temporary storage unit 518 (Step 2232).

According to the present embodiment, if the document to be transmitted includes elements having media attributes which cannot be outputted by any of the receiver terminal devices, the document elements may be converted to document elements having media attributes which can be outputted by one of the terminal devices. In this way, the entire document can be transmitted.

According to the present embodiment, the outputable media attribute storage unit has stored the outputable media attribute of each type of terminal device beforehand. However, the outputable media attribute storage unit may ask a transmission destination terminal device for its outputable media attribute, as disclosed in the second embodiment. Also, in the present embodiment, the case where the media attribute of "character" was converted to "audio" was explained, although other conversions are possible.

(Fourth Embodiment)

Figure 23:
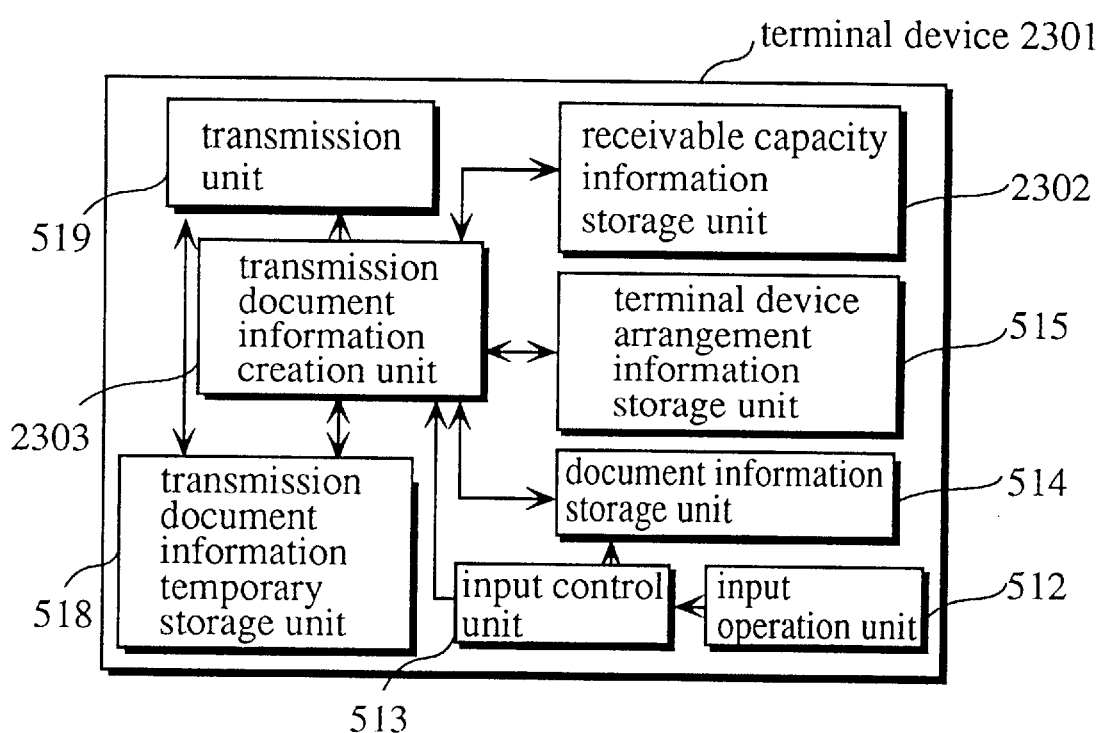
FIG. 23 shows the construction of the terminal device in a document information communication information system to which the fourth embodiment of the present invention relates.

FIG. 23 shows the construction of the terminal device in the document information communication system of the fourth embodiment of the present invention.

Terminal device comprises input operation unit 512, input control unit 513, document information storage unit 514, terminal device arrangement information storage unit 515, receivable capacity information storage unit 2303, transmission document information creation unit 2303, transmission document information temporary storage unit 518 and transmission unit 519. Terminal device 2301 is the same as terminal device 520 of the first embodiment except that terminal device 2301 comprises receivable capacity information storage unit 2302 instead of outputable media attribute information storage unit 516. Therefore, the functions of transmission document information creation unit 2303 are a little different from transmission document information creation unit 517 of the first embodiment. The following explanation will focus on only the differences.

In the case of transmitting document 601 in FIG. 6 to group 524 having group name "A", document information storage unit 514 stores the document information control table 701 in FIG. 7.

Terminal device arrangement information storage unit 515 stores terminal device arrangement information 2401 in FIG. 24. "Graphic portable terminal" whose address is "06-123-4567" and "graphic e-mail terminal" whose address is "A@abc.def.jp" belong to "A" group.

Receivable capacity information storage unit 2303 consists of memory and has stored receivable capacity information beforehand. Receivable capacity information 2501 includes the capacity (size) of receivable element data for each type of terminal device. For example, the graphic portable terminal can receive element data size up to "100". When it exceeds "100", the graphic portable terminal cannot output all of the element data it received. In other words, "100" shows memory capacity of the reception unit (not illustrated) of the terminal device. The graphic e-mail terminal can receive data size up to "5000".

Figure 27:
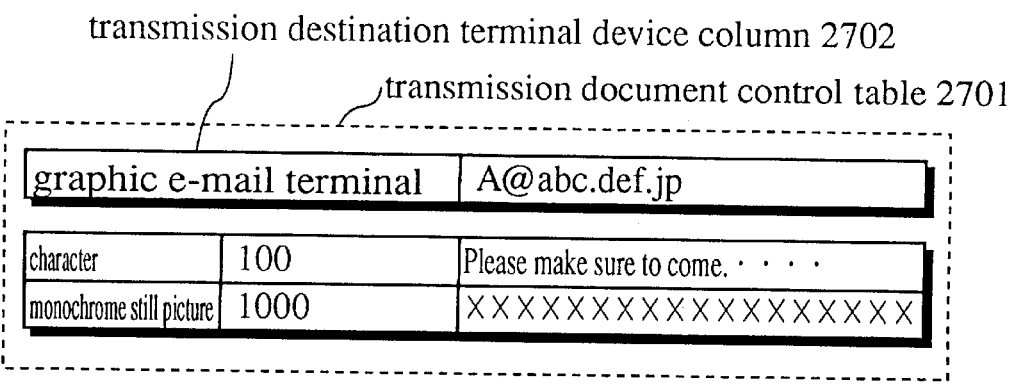
FIG. 27 also shows a transmission document control table stored by the transmission document information temporary storage unit of the terminal device.

On being activated by input control unit 513, transmission document information creation unit 2303 reads the group name stored in group name column 705 in document information control table 701 stored in document information unit 514, finds the same group name in group name column 2404 in terminal arrangement information 2401 stored in terminal arrangement information storage unit 515, reads the type and address of one terminal device belonging to the group, sets its flag in flag column 2403, creates the transmission document control table having that terminal device as the transmission destination terminal device in transmission document information temporary storage unit 518, as shown in FIGS. 26 and 27, and writes the type and address of the terminal device in transmission destination terminal device column 2602. For example, in the case of document information control table 701 in FIG. 7, as the transmission destination group name is "A", transmission document information creation unit 517 writes "graphic portable terminal" and its address "06-123-4567" in transmission destination terminal device column 2602.

Next, transmission document information creation unit 517 reads the capacity (size) of the receivable element data of each transmission destination terminal device in receivable capacity information 2501 stored in receivable capacity information storage unit 2303 and sets the capacity (size) as $C_0$. In the above example, the data size of the graphic portable terminal is "100". Transmission document information creation unit 517 reads the media attribute, element data and size of the document element which is not flagged in document information control table 701 stored in document information storage unit 514 and determines if total of their sizes and the size of the element data already written in transmission document control table 2601 is equal to or below $C_0$.

If this is the case, transmission document information creation unit 517 writes them in media attribute column 2603, size column 2604 and element data column 2605, respectively in transmission document control table 2601, sets its flag in flag column 706. When the total of the size of the element data which is not flagged in document information control table 701 and size of the element data which is already written in transmission document control table 2601 is equal to or below $C_0$, this processing is repeated. When there is not any element data which is not flagged or the value exceeds $C_0$, creation of transmission document control table 2601 is completed. Specifically, when the size of the element data of the fifth row in document information control table 701 is added, the value exceeds $C_0$.

When the value exceeds $C_0$, the transmission document information creation unit 517 reads the type and address of the terminal device which is not flagged in flag column 805, the terminal device corresponding to the name of the transmission, destination group in terminal device arrangement information 2401 in terminal device arrangement information storage unit 515. The transmission document information creation unit 517 creates a new transmission document control table as shown in FIG. 27. At this time, transmission document information creation unit 517 sets a flag in flag column 805 for the terminal device. In this way, transmission document control table 2701 is created. In transmission destination terminal device column 2702 in transmission document control table 2701, "graphic e-mail terminal" and "A@abc.def.jp" are written. Transmission document information creation unit 517 reads size $C_0$ of the "graphic e-mail terminal" in receivable capacity information 2501 stored in receivable capacity information storage unit 2303. The element data is not written in transmission document control table 2701. Therefore, the size is "0". As the element data size "100" of the fifth row in document information control table 701 is equal to or below size $C_0$, transmission document information creation unit 517 writes this element data in transmission document control table 2701 and sets its flag in flag column 705 in document information control table 701. When the element data size "1000" of the sixth row in document information control table 701 is added, the value becomes "1100". As it is equal to or below "5000" of size $C_0$, transmission document information creation unit 517 sets a flag in flag column 705 for this terminal device. In this way, transmission document control table 2701 is created.

Transmission document information creation unit 517 checks if flags are set for all of the element data in document information control table 701. If this is not the case, there are some remaining element data to be transmitted. Therefore, transmission document information creation unit 517 searches for the transmission destination terminal devices which are not flagged. When flags are set for all of the element data in document information control table 701, creation of the transmission document control table is completed. Accordingly, transmission document information creation unit 517 activates transmission unit 519.

Figure 28:
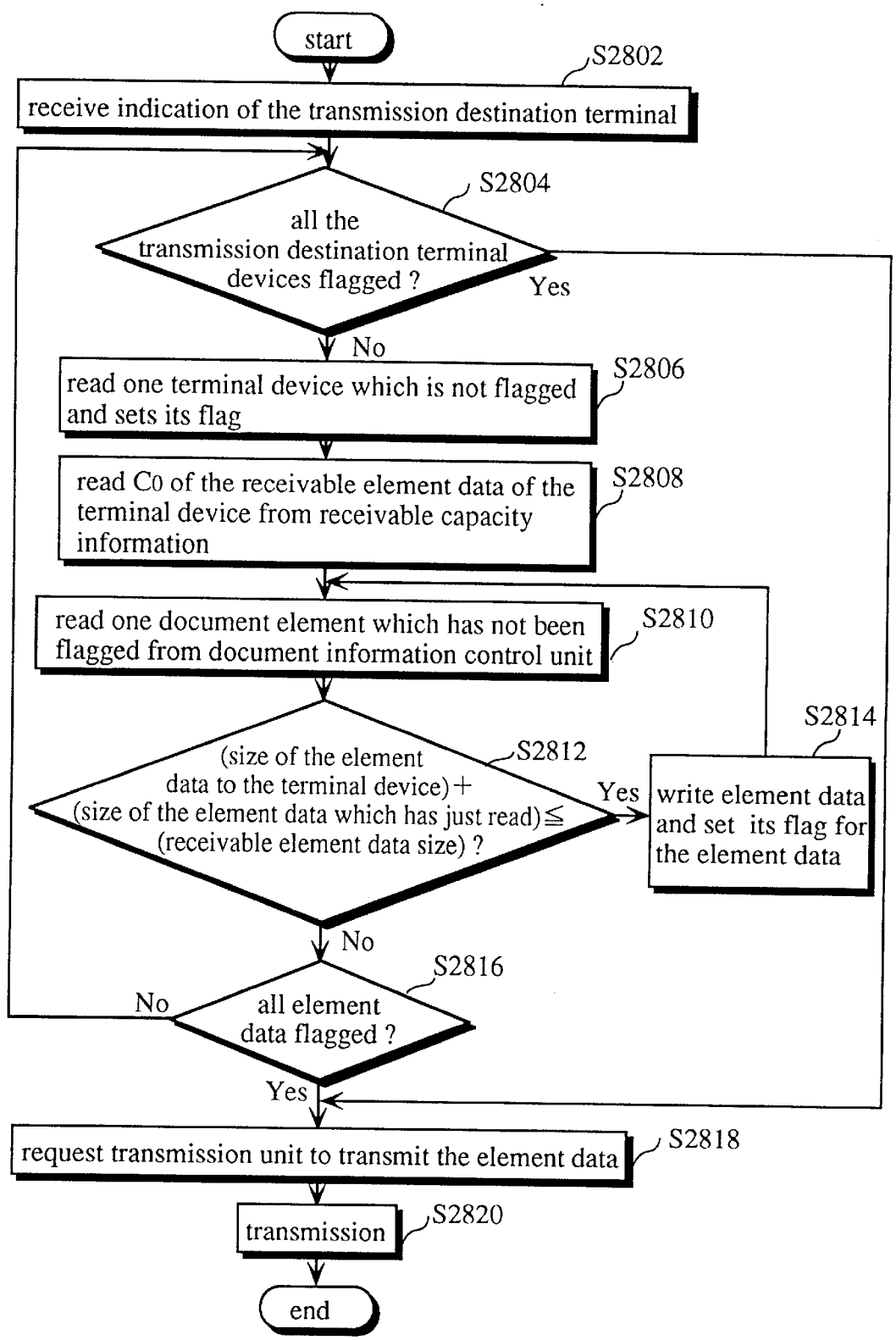
FIG. 28 is a flowchart showing the operation of the fourth embodiment.

The operations of the present embodiment can be explained as follows by means of the flowchart in FIG. 28. As Steps 2802–2806 and Steps 2816–2820 are the same as Steps 1402–1406 and 1412–1416 of the first embodiment, explanation is not given here. The following explanation will focus on only the differences.

Transmission document information creation unit 2303 reads $C_0$ of the receivable element data of the terminal device of Step 2806 in receivable capacity information 2501 (Step 2808) and reads one document element which has not been flagged from document information control unit 701 stored in document information storage unit 514 (Step 2810). Transmission document information creation unit 2303 determines if the total of the size of the element data and size of the element data already written in the transmission document control table is equal to or below $C_0$ (Step 2812). If this is the case, transmission document information creation unit 2303 writes the element data, sets its flag (Step 2814) and returns to Step 2810. If this is not the case, transmission document information creation unit 2303 advances to Step 2816.

As mentioned above, the present embodiment makes to possible to divide the transmission document which includes a plurality of media attributes into some documents, each having the size that can be received by the receiver terminal devices in the transmission destination group. Therefore, if one receiver terminal device cannot receive the original document due to the lack of its memory capacity, the document may be transmitted to another terminal devices. Eventually, the entire document can be received by the user.

(Fifth Embodiment)

Figure 29:
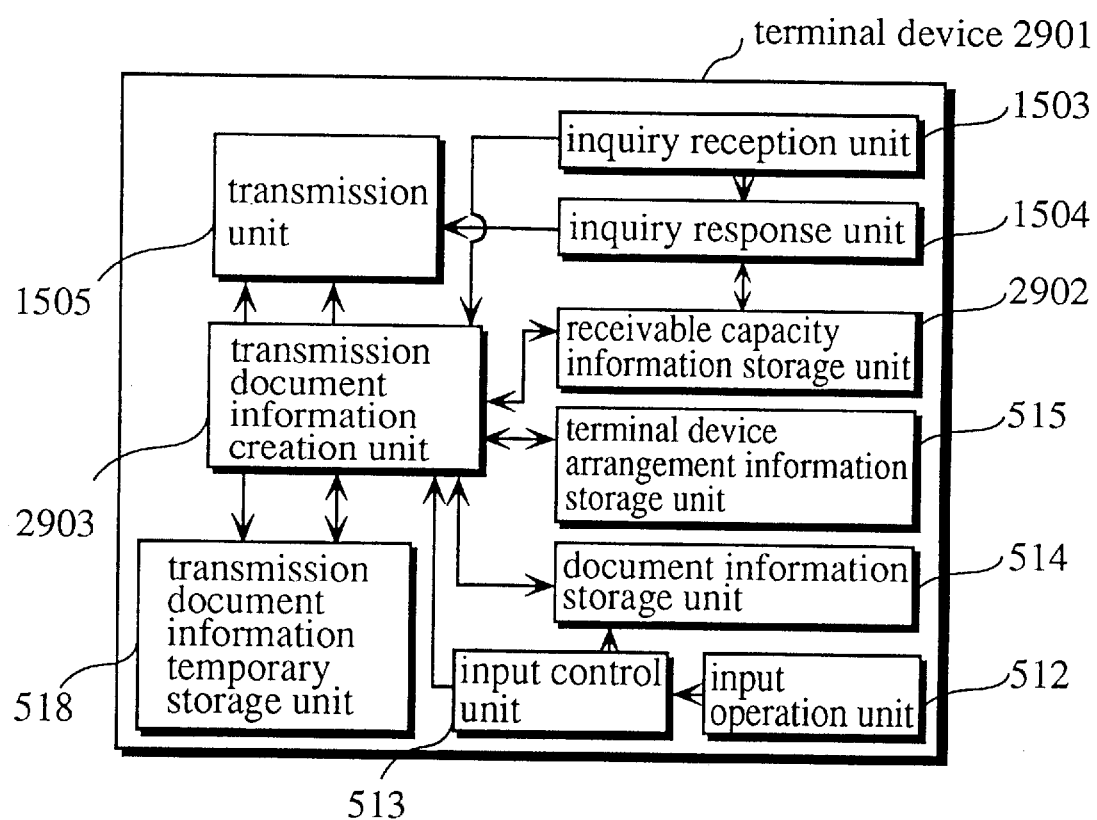
FIG. 29 shows the construction of the terminal device in a document information communication information system to which the fifth embodiment of the present invention relates.

FIG. 29 shows the construction of the terminal device in the document information communication system of the fifth embodiment of the present invention. Terminal device 2901 comprises receivable capacity information storage unit 2902 which stores capacity for receiving its own element data instead of receivable capacity information storage unit 2303 of terminal device 2301 of the fourth embodiment, inquiry reception unit 1503, inquiry response unit 1504, transmission unit 1505 and transmission document information creation unit 2903. Transmission unit 1505 and transmission document information creation unit 2903 are subject to inquiry reception unit 1503 and inquiry response unit 1504. Inquiry reception unit 1503, inquiry response unit 1504 and transmission unit 1505 are the same as the second embodiment. Other construction elements are the same as the first or the fourth embodiment. The following explanation will focus on only the differences.

Receivable capacity information storage unit 2902 has already stored the capacity (size) of the element data transmitted from another terminal device, that is to say, memory capacity for storing data it received.

Inquiry response unit 1504 reads the receivable capacity stored in receivable capacity information storage unit 2902 when inquiry reception unit 1503 receives an inquiry for the receivable capacity of terminal device 2301 from another terminal, sets $C_0$ by subtracting the currently-used memory capacity from the entire receivable capacity and instructs transmission unit 1505 to respond to the terminal device which made the inquiry. Transmission unit 1505 transmits the receivable capacity information to the terminal device via network 511.

Transmission document information creation unit 2901 instructs transmission unit 1505 to ask the receivable capacity information of the transmission destination terminal device by transferring its address when the creation of the transmission document control table is started by designating the transmission destination terminal device in the terminal device arrangement information stored in terminal device arrangement information storage unit 515.

Transmission document information creation unit 2901 receives the receivable capacity information on one of the transmission destination terminal devices from inquiry reception unit 1503 and determines whether the total of the size of the element data in the document information control table stored in document information storage unit 514 and size of the element data already written in the transmission document control table is equal to or below the transferred receivable capacity information ($C_0$). If this is the case, transmission document information creation unit 2901 writes the element data in the transmission document control table. If that is not the case, transmission document information creation unit 2901 reads a new transmission destination terminal device in the terminal arrangement information and creates a new transmission document control table.

The operations of the present embodiment are almost the same as the fourth embodiment except for Step 2808, where size $C_0$ is obtained for receivable element data based on the inquiry to the transmission destination terminal device.

As mentioned above, the present embodiment makes it possible to transmit the document by dividing it into small sizes which can be received by each receiver terminal device based on the inquiry of the size of receivable element data of each receiver terminal device in one transmission destination group. It is also possible to dynamically change the transmission size depending on the conditions of the transmission destination group. In other words, it is possible to change the size if the receivable capacity changes due to the change of the amount of data stored in the terminal device. This flexibility cannot be obtained if the receivable capacity of all the terminal devices are stored beforehand.

(Sixth Embodiment)

Figure 30:
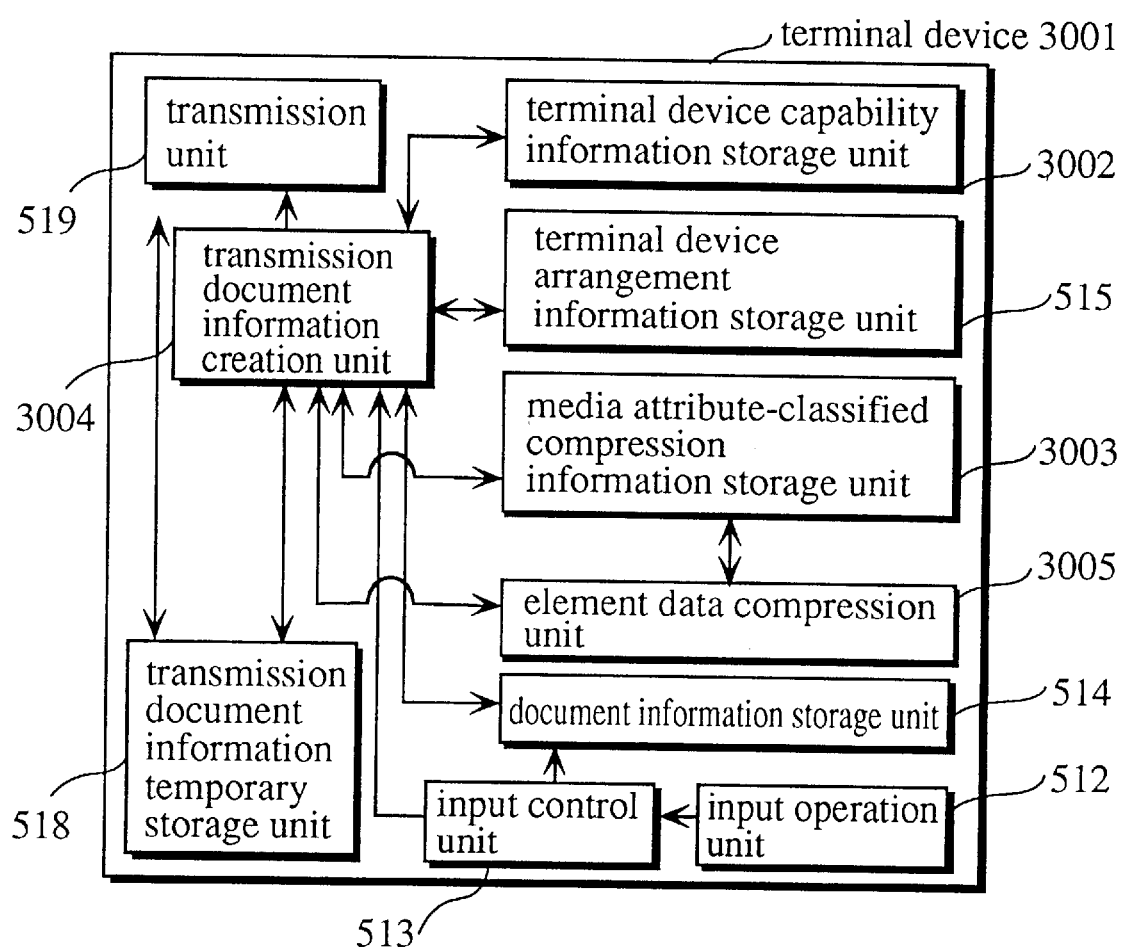
FIG. 30 shows the construction of the terminal device in a document information communication information system to which the sixth embodiment of the present invention relates.

FIG. 30 shows the construction of terminal device 3001 in the document information communication system of the sixth embodiment of the present embodiment. Terminal device 3001 comprises input operation unit 512, input control unit 513, document information storage unit 514, terminal device arrangement information storage unit 515, terminal device capability information storage unit 3002, media attribute-classified compression information storage unit 3003, transmission document information creation unit 3004, element data compression unit 3005, transmission document information temporary storage unit 518 and transmission unit 519. The same construction elements as the first embodiment have been given the same reference numbers. The following explanation will focus on only the differences.

Input operation unit 512 receives the user's input of document 601 in FIG. 6. Document information storage unit 514 is made to stored document information control table 701 in FIG. 7 by input control unit 513.

Terminal device arrangement information storage unit 515 has stored terminal device arrangement information 3101 in FIG. 31 beforehand. According to terminal device arrangement information 3101, group "A" comprises "character portable terminal" whose address is "06-123-4567" and "FAX" whose address is "06-987-6543".

Terminal device capacity information storage unit 3002 has stored terminal device capacity information 3201 in FIG. 32 beforehand. Terminal device capacity information 3201 includes terminal device type column 3202, media attribute column 3203 which shows outputable media attribute of the type of the terminal device, and capacity (size) column 3204 which shows size of the outputable element data of the type of the terminal device. According to terminal device capacity information storage unit 3002, the "character portable terminal" can receive element data of media attribute "character" up to size Media attribute-classified compression information storage unit 3003 has stored media attribute-classified compression information 3301 in FIG. 33 beforehand. Media attribute-classified compression information 3301 comprises media attribute column 3302 of the element data, compression rate column 3303 for the element data of that media attribute and compression algorithm column 3304. According to media attribute-classified compression information 3301, when the media attribute of the element data is "character", commas and spaces are deleted first, and characters in a message is discarded one by one from the end, realizing a desired compression rate. When the media attribute of the element data. is "monochrome still picture", the compression rate can be set at 0.1 at most by a well-known picture compression method ("Picture Information Compression" by Hiroshi Harashima. Oumsha. 1991, "International Digital Facsimile Coding Standards Proc IEEE" Vol. 68, No. 7, page 854–867, R. Hunter, A. H. Robinson 1980). When the media attribute of the element data is "audio", the compression rage can be set at 0.3 at most by a well-known audio compression method ("International Standard of Multimedia Coding" by Hiroshi Yasuda. Maruzen. 1991, "High Efficiency Coding of Acoustic Signals").

Figures 34, 35:
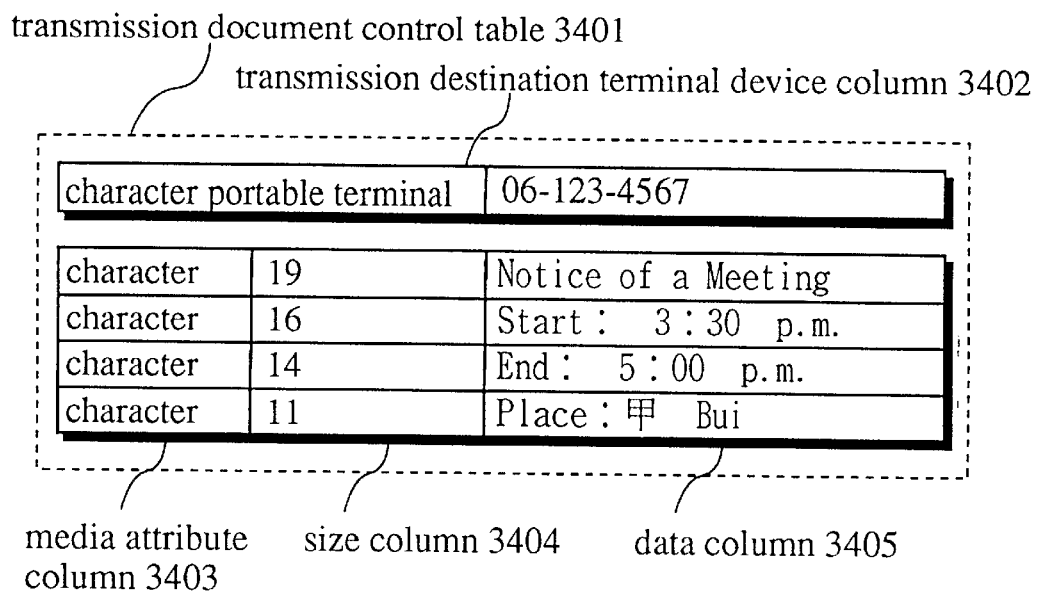
FIG. 34 shows a transmission document control table stored by the transmission document temporary storage unit of the terminal device.
FIG. 35 shows a transmission document control table stored by the transmission document temporary storage unit of the terminal device.

On being activated by input control unit 513, transmission document information creation unit 3004 reads the group name stored in group name column 705 in document information control table 701 stored in document information storage unit 514, finds the same group name in group name column 3102 in terminal arrangement information 3101 stored in terminal arrangement information storage unit 515, reads the type and address of one terminal device belonging to that group, sets its flag in flag column 3101, creates the transmission document control table having that terminal device as transmission destination terminal device—examples are shown in FIGS. 34 and 35. Transmission document information creation unit 3004 writes the type and address of the terminal device in transmission destination terminal device column 3402 in transmission document control table 3401. In the case of document information control table 701 in FIG. 7, as the transmission destination group is "A", transmission document information creation unit 3004 writes "character portable terminal" and its address "06-123-4567" in transmission destination terminal device column 3402.

Next, transmission document information creation unit 3004 reads the size of the outputable media attribute of the type of the transmission destination terminal device and the receivable element data in terminal device capacity information 3202 stored in terminal device capacity information storage unit 3002. In the above example, the media attribute is "character" and the size is "60". Transmission document information creation unit reads one of the element data and size of the media attribute "character" of the document elements which are not flagged in document information control table 701 stored in document information storage unit 514.

Next, transmission document information creation unit 3004 determines whether the total of the above size and the size of the element data written in transmission document control table 3401 is equal to or below the size of the receivable element data read in terminal device capacity information 3201. If this is the case, transmission document information creation unit 3004 writes the media attribute in media attribute column 3403, the size in size column 3404 and the element data in element data column 3405, arrangement flag in flag column 706 for this document element in document information control table 701. If this is not the case, transmission document information creation unit 3004 refers to compression rate column 3303, compression rate column 3303 being in media attribute-classified compression information 3301 stored in media attribute-classified compression information storage unit 3003, and obtains the compressible size of the element data.

For example, when the media attribute is "character", as the compression rate can be set freely, the compressible size is "1", which is the minimum size. If the media attribute is "monochrome still picture" and element data size is "1000", the compressible size is "100".

If the compressible size is equal to or below the value obtained by subtracting the total of the size of the element data already written in transmission document control table 3401 from size of the receivable element data, transmission document information creation unit 3004 transfers the media attribute to element data compression unit 3005, compresses the size of the element data to the size which is equal to the subtracted value.

When the compressible size exceeds the value mentioned above, the element data cannot be compressed. Therefore, it is impossible to transmit the element data to the transmission destination terminal device.

When the creation of one transmission document control table 3401 is completed, transmission document information creation unit 3004 reads the type and address of the terminal device which is not flagged in flag column 3103, the terminal device corresponding to the name of the transmission destination group in terminal device arrangement information 3101 in terminal device arrangement information storage unit 515, and creates new transmission document control table 3501 shown in FIG. 35. At this time, transmission document information creation unit 3004 sets a flag in flag column 3103 for the terminal device. In this way, transmission document control table 3501 is created.

Transmission document information creation unit 3004 receives the compressed element data from element data compression unit 3005, writes the media attribute in media attribute column 3403, the size in size column 3404 and element data in element data column 3405 in transmission document control table 3401 and sets a flag in flag column 706 for that element data in document information control table 701.

Transmission document information creation unit 3004 determines whether all flags are set in flag column in document information control table 701. If that is not the case, it means there are still element data to be transmitted. Therefore transmission document information creation unit 3004 searches for the transmission destination terminal device which is not flagged. If flags are set for all of the available types of terminal device or for all of the element data in document information control table 701, creation of the transmission document control table is completed. Therefore, transmission document information creation unit 3004 activates transmission unit 519.

Element data compression unit 3005 receives media attribute of the element data, compressed size and the element data from transmission document information creation unit 3004 compresses the element data according to compression algorithm column 3304 in media attribute-classified compression information 3301 stored in media attribute-classified compression information storage unit 3003, and transfers the compressed element data to transmission document information creation unit 3004.

In the case of the fourth row of document information control table 701 in FIG. 7, the element data size already written in transmission document control table 3401 is "19+16+14"="49". If size "25" of element data "Place: ⊞ Building Z Room" is added, "49" changes to "74", exceeding "60" which is the receivable element data size of the "character portable terminal". Therefore, by compressing the element data size to "11", the element data can be transmitted.

On receiving size "11" and the element data from transmission document information creation unit 3004, element data compression unit 3005 reads the compression algorithm of media attribute "character" in media attribute-classified compression information 3301, deletes spaces of the element data, discards letters in the message one by one from the end, and compresses the element data into "Place: ⊞ Bui".

The operations of the present embodiment can be explained as follows by means of the flowchart in FIG. 36. Explanation for Steps 3602–3606 is not given here as these steps are the same as Steps 1402–1406 of the first embodiment.

In Step 3608, transmission document information creation unit 3004 refers to terminal device capability information 3201 and obtains the outputable media attribute of the terminal device in Step 3606 and its receivable element data size. Transmission document information creation unit 3004 reads one element data which corresponds to the outputable media attribute of the terminal device of the element data which is not flagged in flag column 706 in document information control table 701 (Step 3610). Transmission document information creation unit 3004 determines if the total of the above size of that element data and size of the element data already written in the transmission document control table is equal to or below the size of the receivable element data in Step 3608 (Step 3612). If this is the case, transmission document information creation unit 3004 writes the element data, its media attribute and size in the transmission document control table and sets a flag in document information control table (Step 3614) and returns to Step 3610. If this is not the case, transmission document information creation unit 3004 refers to media attribute-classified compression information 3301 and calculates the compressible size of the element data (Step 3616). Transmission document information creation unit 3004 determines if the calculated size is equal to or below the value obtained by subtracting the size of the element data written in the transmission document control table from the size of the entire receivable element data in Step 3608 (Step 3618), returning to Step 3622 if this is the case, or otherwise transferring the value, the element data and its media attribute obtained in Step 3618 to element data compression unit 3005 (Step 3619).

Element data compression unit 3005 reads the compression algorithm of the media attribute transferred by transmission information creation unit 3004 in media attribute-classified compression information 3301, compresses the element data into the transferred size and transfers the compressed element data size to transmission document information creation unit 3004 (Step 3620).

Transmission document information creation unit 3004 carries out such processing as writing the transferred element data in the transmission document control table (Step 3614).

According to the compression algorithm of the present embodiment, commas and spaces are deleted first, and characters in a message are discarded one by one from the end. It is also possible to just discard the characters in a message one by one from the last.

As mentioned above, according to the present invention, if there are some element data having size which cannot be received by the receiver terminal device, it is possible to transmit the element data by compressing it according to its media attribute.

(Seventh Embodiment)

Figure 37:
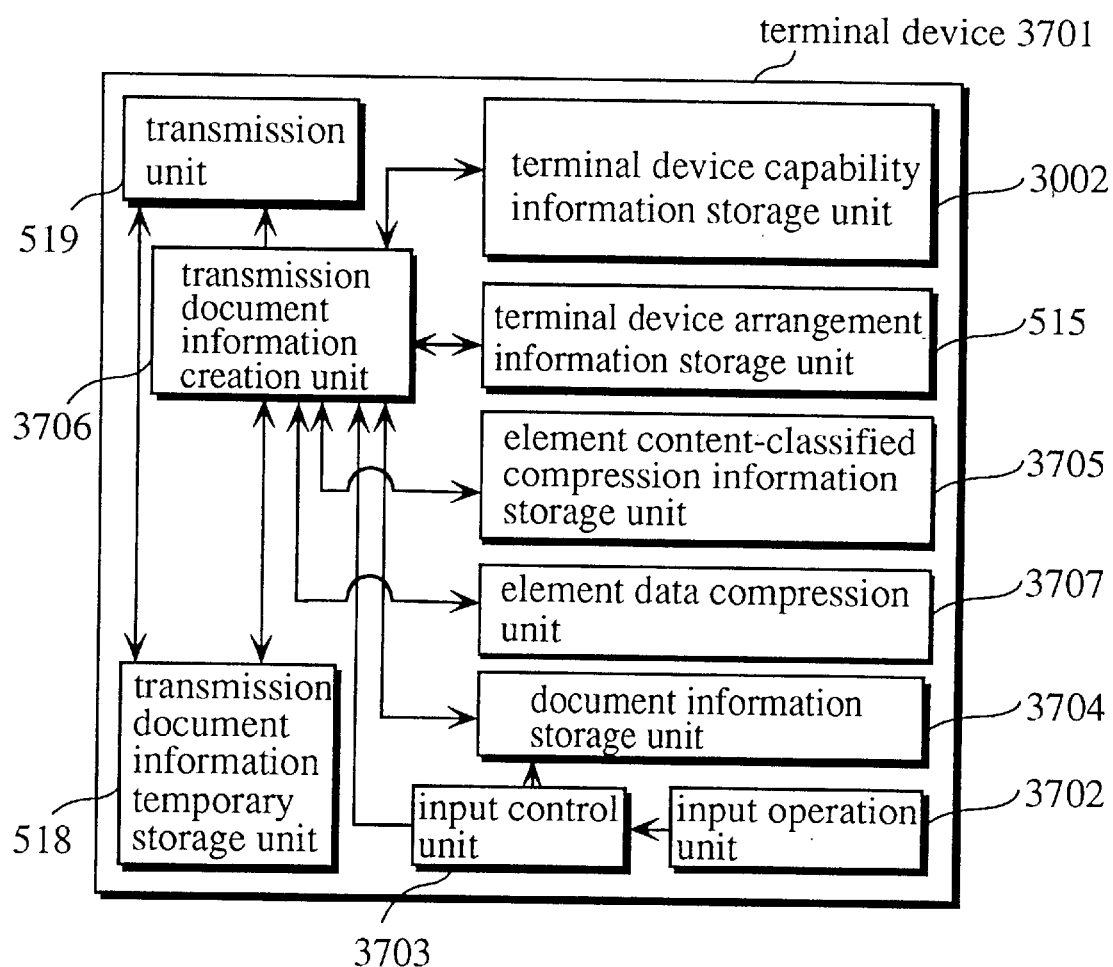
FIG. 37 shows the construction of the terminal device in a document information communication information system to which the seventh embodiment of the present invention relates.

FIG. 37 shows the construction of the terminal device in the document information communication system of the seventh embodiment of the present invention. Terminal device 3701 comprises input operation unit 3702, input control unit 3703, document information storage unit 3704, terminal device arrangement information storage unit 515, terminal device capability information storage unit 3002, element content-classified compression information storage unit 3705, transmission document information creation unit 3706, element data compression unit 3707, transmission document information temporary storage unit 518 and transmission unit 519.

The construction elements that are the same as terminal devices 501 and 3001 of the first and the sixth embodiment have been given the same reference numbers and no explanation is given. The following explanation will only focus on the differences.

In addition to the functions of the first embodiment, input operation unit 3702 receives the content of each document element 602, 603, . . . , 607 on receiving document 601 from the user. For example, it is possible to click on a title displayed in a form of a menu on the screen, which has been prepared beforehand for the document to be inputted. It is also possible to input the title with the keyboard.

In addition to the functions of input control unit 513 of the first embodiment, input control unit 3703 writes the inputted title in the content column 3802 in document information control table 3801 as shown in FIG. 38 when the content of each document element is inputted.

Document information storage unit 3704 stores document information control table 3801 created by input control unit 3703. Document information control table 3801 differs from document information table 701 of the first embodiment in that it includes content column 3802 in which title of each document element is written.

For example, the first row of the document element shows that media attribute is "character", the content is "title", the size is "19", and element data is "Notice of a Meeting".

Terminal device arrangement information storage unit 515 stores terminal device arrangement information 3101, and terminal device capability information storage unit 3002 stores terminal device capability information 3201 like the case of the sixth embodiment.

Element content-classified compression information storage unit 3705 consists of memory and stores element content-classified compression information 3901 shown in FIG. 39. Element content-classified compression information 3901 shows the compression algorithm for the element data depending on the content of the document element, comprising media attribute column 3902, document element content column 3903, compression rate column 3904 and compression algorithm column 3905.

According to FIG. 39, the first element data has "character" as its media attribute, "time" as its title, "any rate" as its compression rate, "convert the time display method and discard from the end" as its compression algorithm. For example, if the element data is "3:30", the element data may be "3.30" with compression rate being "0.8" or it may be "3" with compression rate "0.2".

The second element data has "character" as its media attribute and "place" as its title, "any rate" as its compression rate, and "discard from the end except for proper nouns" as its compression algorithm.

Element content-classified compression information storage unit 3705 stores proper noun dictionary 4001 shown in FIG. 40. Proper noun dictionary 4001 stores proper nouns for selecting proper nouns used compressing the above title "Place".

Transmission document information creation unit 3706 refers to element content-classified compression information 3901 stored in element content-classified compression information storage unit 3705, instead of referring to media attribute-classified compression information 3301 when transmission document information creation unit 3004 exceeds the receivable element data size in the sixth embodiment.

Under the same situation as the example of the sixth embodiment, transmission document information creation unit 3706 transfers the following to element data compression unit 3707: the title "place", the media attribute "character" and the element data of the content column 3802 of the element data so that the size of the element data "Place: 田 Building 乙 Room" is compressed into "11".

On receiving the element data from transmission document information creation unit 3706, element data compression unit 3707 reads the compression algorithm of the corresponding title in element content-classified compression information 3901 stored in element content compression information storage unit 3705, compresses the element data into the transferred size according to the algorithm, and transfers the compressed size to transmission document information creation unit 3705.

For example, if the title is "Place", the compression algorithm is "discard characters one by one from the end except for proper nouns". Therefore, the proper nouns "田" and "乙" are detected by referring to proper noun dictionary 4001. Characters are discarded one by one from the end except for "田" and "乙". If the element data size is "11", the element data becomes "Place: 田 B 乙".

As mentioned above, document information control table 3801 stored in document information storage unit 3704 is divided into transmission document control tables 4101 and 4201 in transmission document information temporary storage unit 518.

Figure 36:
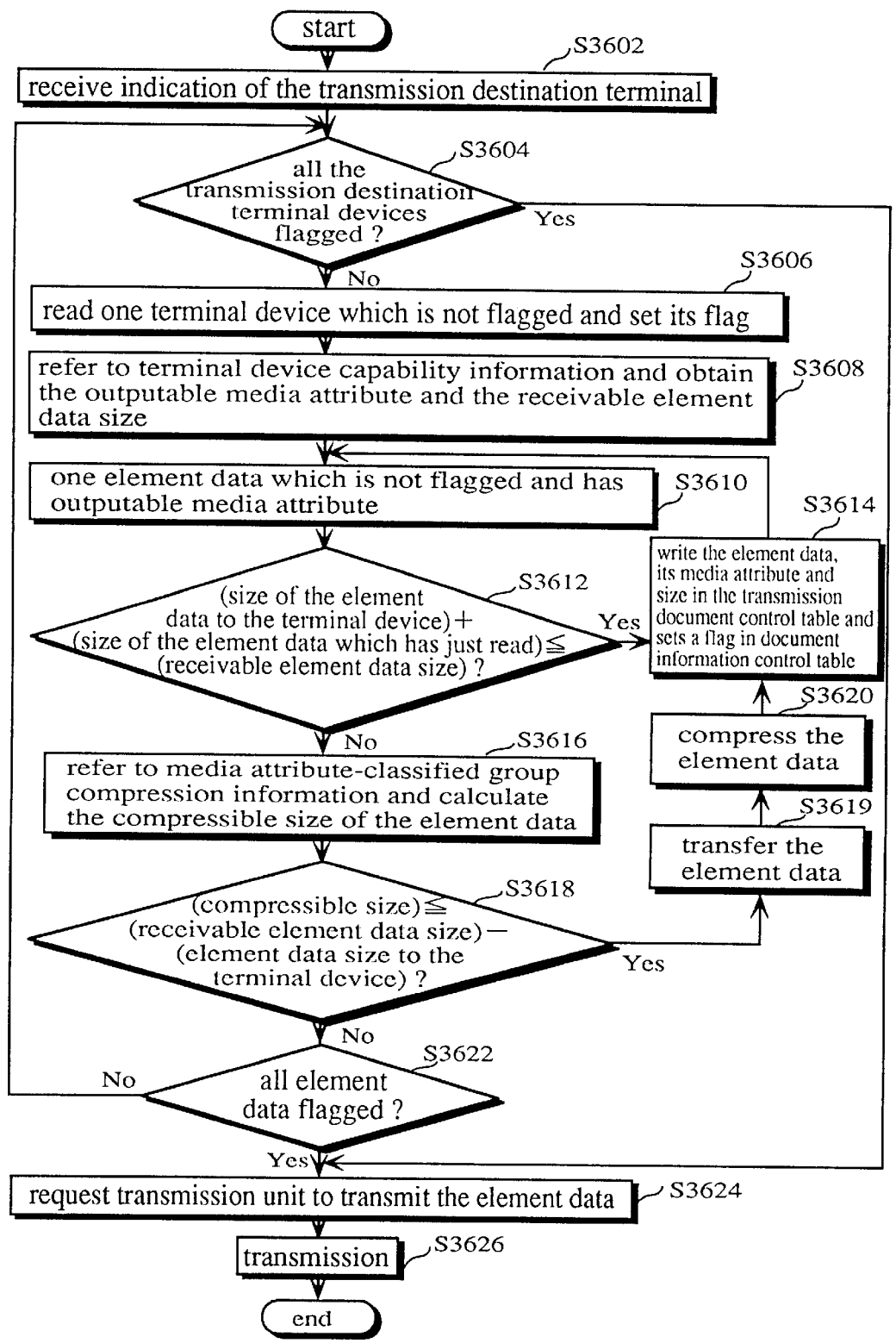
FIG. 36 is a flowchart showing the operation of the sixth embodiment.

The operations of the present embodiment are almost the same as the sixth embodiment except for Steps 3616, 3619 and 3620 in the flowchart in FIG. 36, The following explanation will focus on only the differences.

Transmission document information creation unit 3706 refers to element content-classified compression information 3901 and calculates the compressible size of the element data (Step 3616).

Transmission document information creation unit 3706 transfers the value obtained by the subtraction in Step 3618, the element data, its media attribute and its title to element data compression unit 3703 (Step 3619).

Element data compression unit 3707 reads the compression algorithm of the title transferred from transmission document information creation unit 3706 in element content-classified compression information 3901, converts it to the element data whose size is compressed to the notified value and transfers the converted element data to transmission document information creation unit 3706 (Step 3620).

As mentioned above, according to the present invention, element data can be compressed with unimportant data being deleted. Therefore, maximum information can be transmitted within the receivable data size of the transmission destination terminal device.

(Eighth Embodiment)

Figure 43:
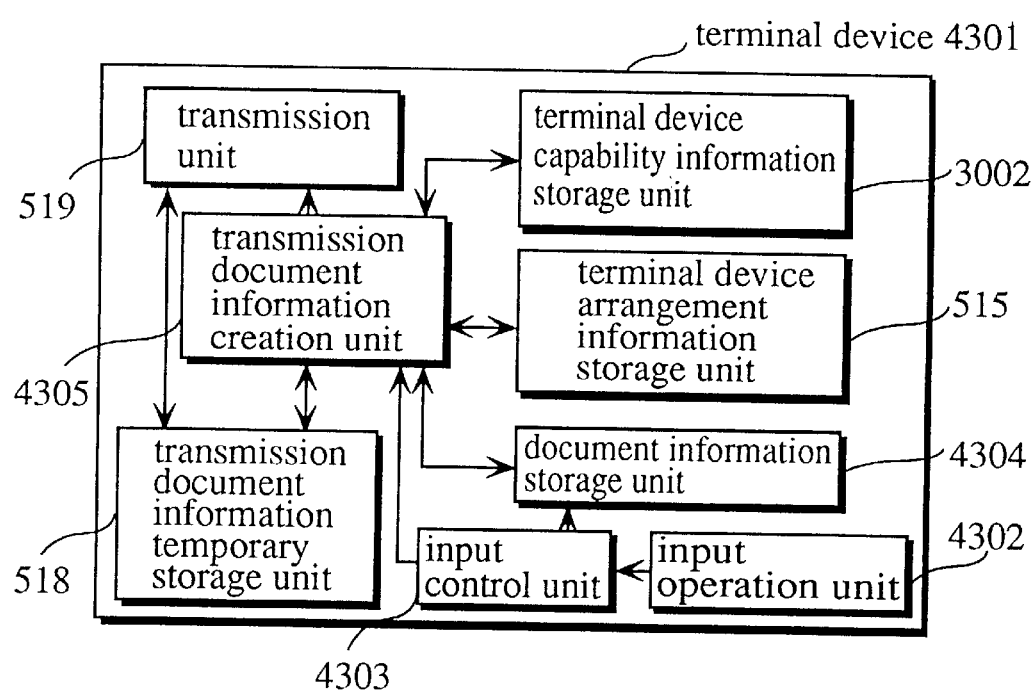
FIG. 43 shows the construction of the terminal device in a document information communication information system to which the eighth embodiment of the present invention relates.

FIG. 43 shows the construction of the terminal device in the document information communication system of the eighth embodiment of the present invention. Terminal device 4301 comprises input operation unit 4302, input control unit 4303, document information storage unit 4304, terminal device arrangement information storage unit 515, terminal device capability information storage unit 3002, transmission document information creation unit 4305, transmission document information temporary storage unit 518 and transmission unit 519.

Here, terminal device arrangement information storage unit 515, transmission document information temporary storage unit 513 and transmission unit 519 are the same as the first embodiment, and terminal device capability information storage unit 3002 is the same as the sixth embodiment. Therefore they have just been given the same reference numbers without explanation. The following explanation will focus on the differences.

In addition to the functions of the input operation unit 512 of the first embodiment, input operation unit 4302 receives input of document elements 602, 603, . . . , 607, each of them having priority. The priority shows importance and order of the document element to be outputted by the transmission destination terminal device, "1" representing the highest priority followed by "2", "3" and "4" representing decreasing priorities.

In addition to the functions of input operation unit 513 of the first embodiment, input control unit 4303 receives the priority from input operation unit 512 and writes it in priority column 4408 for each document element 4402, 4403, . . . , 4407 shown in FIG. 44 stored in document information storage unit 4304.

Document information storage unit 4304 stores document information control table 4401. According to document information control table 4401, the transmission destination group is "B", priority of the element data "Notice of a Meeting", "Start: 3:30 p.m." and "Place: ⊞ Building Z Room" is "1", and priority of the element data "End: 5:00 p.m." is "2". The same thing can be said about other element data.

Figure 45:
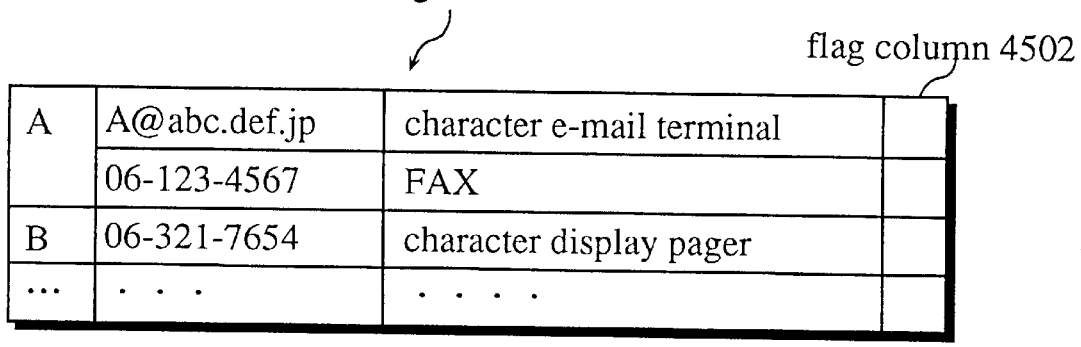
FIG. 45 shows the terminal device arrangement information stored by the terminal device arrangement information storage unit of the terminal device.

Terminal device arrangement information storage unit 515 has stored terminal device arrangement information 4501 shown in FIG. 45 beforehand. In "B", "character display pager" has been set.

Figure 46:
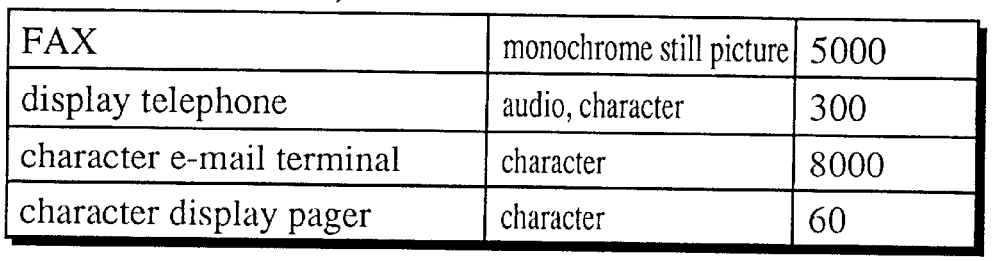
FIG. 46 shows the terminal device capability information stored by the terminal device capability information of the terminal device.

Terminal device capability information storage unit 3002 has stored terminal capability information 4601 shown in FIG. 46 beforehand. According to terminal device capability information 4601, "character pager" has "character" as its outputable media attribute and "60" as its receivable size.

On being activated by input control unit 4303, transmission document information creation unit 4305 reads group name column 4409 in document information control table 4401 stored in document information storage unit 4303.

Transmission document information creation unit 4305 sets "1" in priority counter I of the document element, checks if all flags are set in flag column 4502 of the terminal device. which corresponds to the group name previously read in terminal device arrangement information .4501 stored in terminal device arrangement information unit 515. If flags are set for all the terminal devices, transmission document information creation unit 4305 instructs transmission unit 519 to transmit the element data in the transmission document control table stored in transmission document information temporary storage unit 518. If flags are not set for all the terminal devices, transmission document information creation unit 4305 reads the address and type of one terminal device which is not flagged, sets its flag and creates transmission control table 4701 shown in FIG. 47 in transmission document information temporary storage unit 518.

Transmission document information creation unit 4305 reads the media attribute and size of the type of the terminal device which was previously read in terminal device capability information 4601 stored in terminal device capability information storage unit 3002.

Transmission document information creation unit 4305 determines whether there is a document element having priority "I" in document information control table 4401 stored in document information storage unit 4303, the document element corresponding to the media attribute. If there is no such document elements, transmission document information creation unit 4305 increments priority counter I by "1" and determines whether the value of counter I is equal to or below the greatest value of the priority stored in document information control table 4401. If this is the case, transmission document information creation unit 4305 determines whether there is a document element having priority "1" in document information control table 4401, the document element corresponding to media attribute. When it exceeds the greatest value of the priority, transmission document information creation unit 4305 instructs transmission unit 519 to transmit the document data.

When there is a document element having priority "I", transmission document information creation unit 4305 reads its size and determines whether the total of the size of the element data already written in the transmission document control table and the size of the element data is equal to or below the value of the seize previously read in terminal device capability information 4601.

If this is the case, transmission document information creation unit 4305 writes the element data, media attribute and size in transmission document control table 4701, sets a flag in flag column 4410 in document information control table 4401 and determines whether there is a document element having priority "I" whose media attribute corresponding to the outputable media attribute of the transmission destination terminal device.

If this is not the case, transmission document information creation unit 4305 refers to terminal device arrangement information 4501 and determines whether flags are sets for all transmission destination terminal devices.

When document information control table 4401 in FIG. 44 is stored in document information storage unit 4304, group name column 4409 shows that the transmission destination group is "B", terminal device arrangement information 4501 shows that the type of terminal device is "document display pager" whose address is "06-321-7654". Terminal device capability information 4601 shows that this "character pager" has "character" as its outputable media attribute and "60" as its receivable data size.

Therefore, it can be concluded that document elements 4402–4406 having "character" media attribute in document information control table 4401 can be outputted by the transmission destination terminal device. When the element data size of each document element having priority "I" is added, "19+16+25" becomes "60". When the size "14" of the element data "End: 5:00 p.m." having priority "2" is added "60" changes to "74". It exceeds "60" which is the receivable size of the "character display pager".

Figure 48:
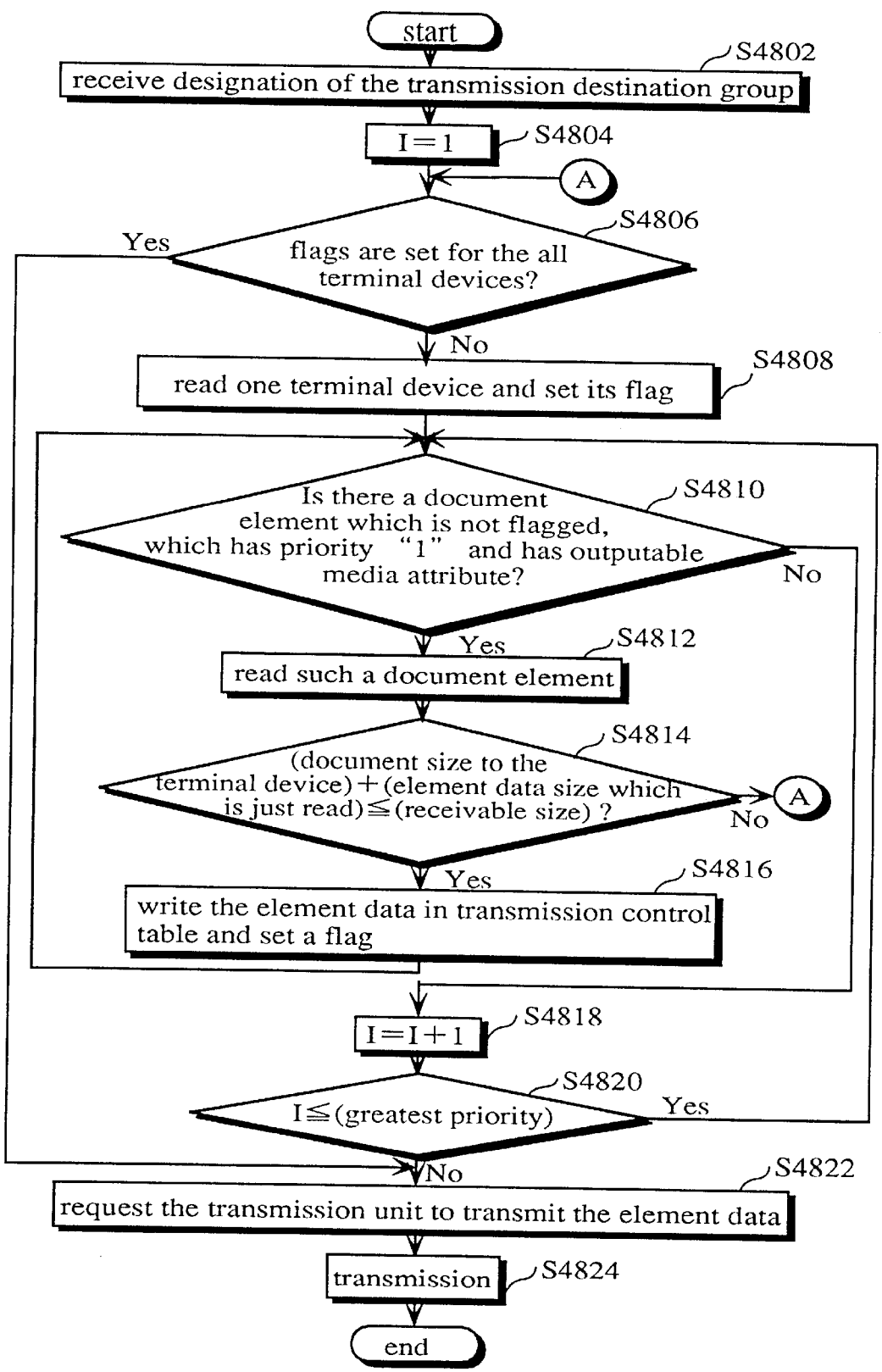
FIG. 48 is a flowchart showing the operation of the eighth embodiment.

The operations of the present embodiment can be explained as follows by means of the flowchart in FIG. 48.

First, transmission document information creation unit 4305 reads the group name of the document information control table and receives designation of the transmission destination group (Step 4802), sets "1" in priority counter I of the document element (Step 4804), determines if flags are set for the all terminal devices in the transmission destination group by checking terminal device arrangement information 4501 (Step 4806), returning to Step 4822 if this is the case, or otherwise reading one terminal device and setting its flag (Step 4808). After getting the outputable media attribute of the terminal device and receivable element data size in terminal device capability information 4601, transmission document information creation unit 4305 determines whether there is a document element which corresponds to the media attribute having priority "1" (Step 4810), reading one document element if this is the case (Step 4812), or otherwise going to Step 4818. Transmission document information creation unit 4305 determines the total of the seize of the element data and the size of the element data already written in transmission document control table 4701 is equal to or below the receivable size, going to Step 4806 if this is not the case, or otherwise writing the element data in transmission control table 4701 and setting a flag for the corresponding element data in document information control table 4401 (Step 4816).

In Step 4818, transmission document information creation unit 4305 increments priority counter I of the document element by one, determines whether that value is equal to or below the greatest value of the priority written in document information control table 4401 (Step 4820), returning to Step 4310 if this is the case, or otherwise instructing transmission unit 519 to transmit the element data (Step 4822).

Transmission unit 519 transmits the element data to the transmission destination terminal device according to transmission document control table 4701 stored in transmission document information temporary storage unit 518 (Step 4824) and completes the processing.

As mentioned above, according to the present embodiment, priorities are given to document elements; document elements which can be outputted by the transmission destination terminal device is selected; and document elements are transmitted according to their order of priority.

(Ninth Embodiment)

Figure 49:
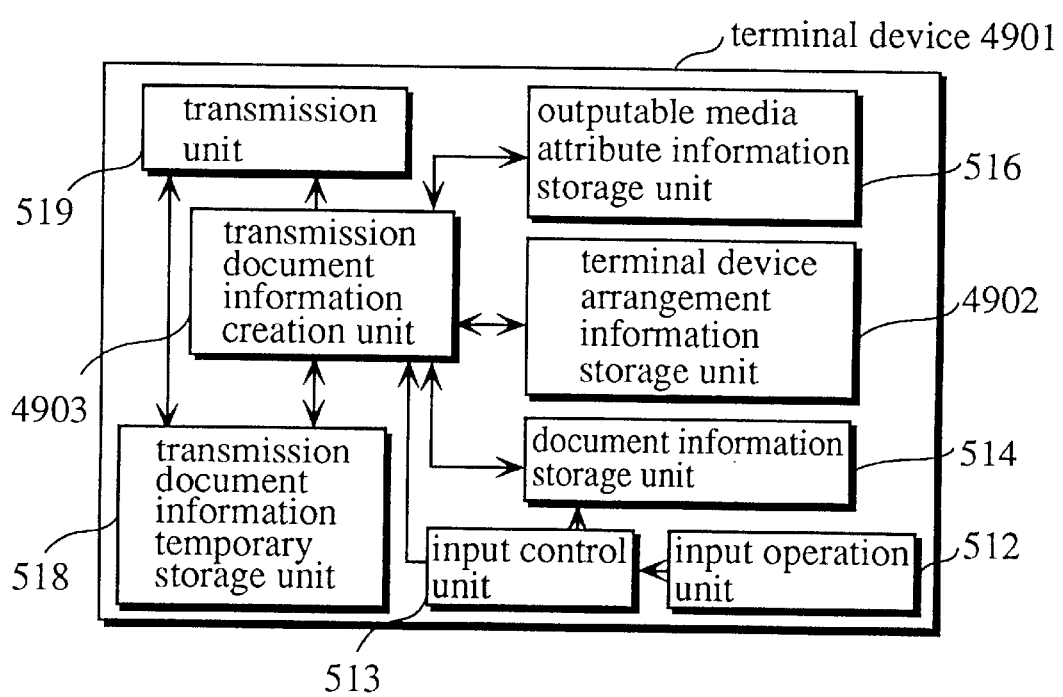
FIG. 49 shows the construction of the terminal device in a document information communication information system to which the ninth embodiment of the present invention relates.

FIG. 49 shows the construction of the ninth embodiment of the terminal device in the document information communication system of the present invention.

Terminal device 4901 comprises input operation unit 512, input control unit 513, document information storage unit 514, terminal device arrangement information storage unit 490, outputable media attribute information storage unit 516, transmission document information creation unit 4903, transmission document information temporary storage unit 518 and transmission unit 519.

The same construction elements with the first embodiment have been given the same reference numbers without explanation. The following explanation will focus on the differences.

Terminal device arrangement information storage unit 4902 has stored terminal device arrangement information 5001 shown in FIG. 50 beforehand. Terminal device arrangement information 5001 includes group name column 5002, address column 5003, terminal device type column 5004, terminal device priority column 5005 and flag column 5006.

Priorities "1" and "2" stored in priority column 5005 show priorities of the terminal devices. In the case of "A", priority "1" shows that the "character e-mail terminal" receives the document earlier than a "FAX". When the "character e-mail terminal" cannot receive the document, the "FAX" receives the document.

Transmission document information creation unit 4903 has the following functions in addition to the functions of transmission document information creation unit 517 in the first embodiment. Transmission document information creation unit 4903 has priority counter J of the terminal device, sets "1" in the priority counter on receiving the indication of the transmission destination group.

Transmission document information creation unit 4903 determines if there are any terminal devices which are not flagged in terminal device arrangement information when flags are not set for all transmission destination terminal devices. If this is the case, transmission document information creation unit 4903 reads the terminal device, sets its flag, and writes the element data of the outputable media attribute of the terminal device in the transmission document control table like the case of the first embodiment.

If this in not the case, transmission document information creation unit 4903 increments priority counter J of the terminal device by "1" and determines if the value is equal to or below the greatest value of the priority of the group in terminal device arrangement information 5001. If this is the case, transmission document information creation unit 4903 reads the terminal device, sets its flag and writes the element data of the outputable media attribute of the terminal device in the transmission document control table like the case of the first embodiment.

If this is not the case, transmission document information creation unit 4903 increments priority counter J of the terminal device by one and determines whether the value is equal to or below the greatest value of the priority of the group in terminal device arrangement information 5001. If this is not the case, transmission document information creation unit 4903 instructs transmission unit 519 to transmit the element data. If this is the case, transmission document information creation unit 4903 determines again whether flags are set for all the transmission destination terminal devices.

For example, if document information control table 701 in FIG. 7 is stored in document information storage unit 514, transmission document control table 1001 shown in FIG. 10 is created firstly, followed by transmission document control table 1101 in FIG. 11.

Figure 51:
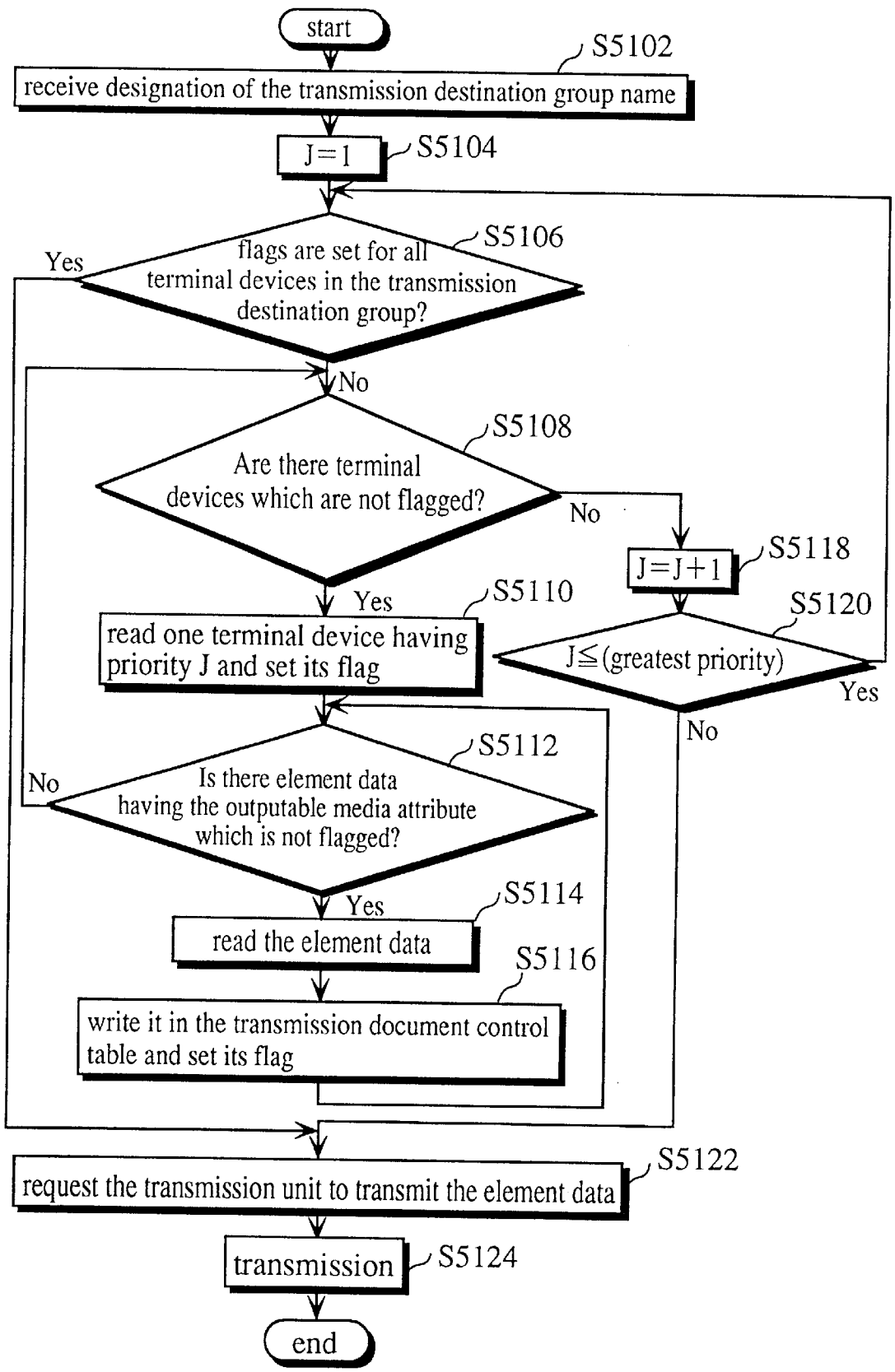
FIG. 51 is a flowchart showing the operation of the ninth embodiment.

The operations of the present embodiment can be explained as follows by means of the flowchart in FIG. 51.

Transmission document information creation unit 4903 reads the transmission destination group name (Step 5102), determines if flags are set for all terminal devices in the transmission destination group by referring to terminal device arrangement information 5001 (Step 5106), going to Step 5122 if this is the case, or otherwise determining whether there are terminal devices which are not flagged (Step 5108).

If there are any such terminal devices, transmission document information creation unit 4903 reads one terminal device having priority J and sets its flag (Step 5110).

Transmission document information creation unit 4903 obtains the outputable media attribute of the terminal device in the outputable media attribute information and determines whether there is element data having the same media attribute which is not flagged in the document information control table (Step 5112), returning to Step 5108 if this is the case, or otherwise reading the element data (Step 5114), writing it in the transmission document control table and setting its flag (Step 5116), and returning to Step 5112.

In Step 5108, transmission document information creation unit 4903 increments priority counter J by one (Step 5118), and determines if the value is equal to or below the greatest value of the priority of the terminal device of the group (Step 5120), returning to Step 5106 if this is the case, or otherwise returning to Step 5122. In Step 5122, transmission document information creation unit 4903 instructs transmission unit 519 to transmit the element data.

On receiving the indication of the transmission, transmission unit 519 transmits the element data written in the transmission document control table to the transmission destination terminal device (Step 5124) and completes the processing.

As mentioned above, according to the present embodiment, priorities have been given to the terminal devices belonging to the same group beforehand. And the transmission document is created according to the order of the priority.

(Tenth Embodiment)

Figure 52:
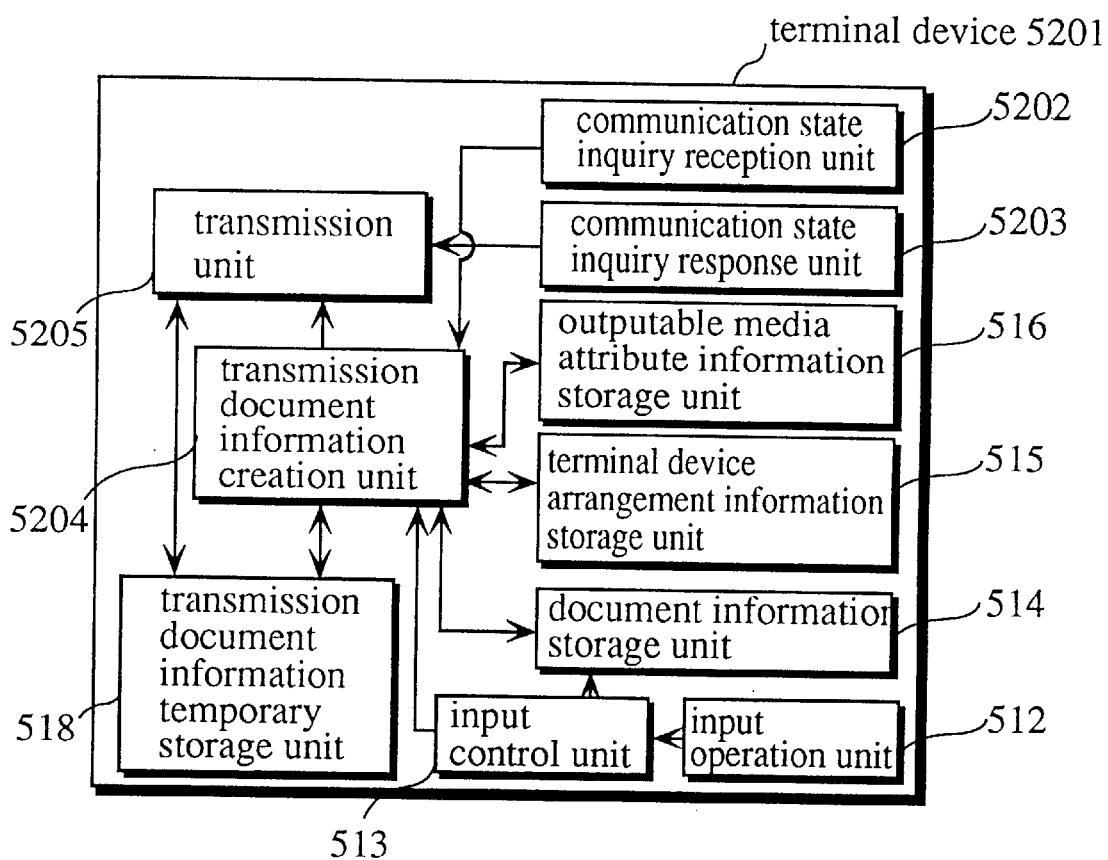
FIG. 52 shows the construction of the terminal device in a document information communication information system to which the tenth embodiment of the present invention relates.

FIG. 52 shows the construction of the terminal device in the document information communication system of the present embodiment.

Terminal device 5201 comprises input operation unit 512, input control unit 513, document information storage unit 514, terminal device arrangement information storage unit 515, outputable media attribute information storage unit 516, communication state inquiry reception unit 5202, communication state inquiry response unit 5203, transmission document information creation unit 5204, transmission document information temporary storage unit 518 and transmission unit 505.

The same construction elements with terminal device 501 of the first embodiment have been given the same reference numbers without explanation. The following explanation will focus on the differences.

Communication state inquiry reception unit 5202 receives an inquiry from another terminal device asking whether communication is possible. On receiving the inquiry, communication state inquiry reception unit 5202 notifies communication state inquiry response unit 5203 that it received the inquiry.

On receiving the notification from transmission unit 5205 that the communication is possible, communication state inquiry unit 5202 transfers the notification to transmission document information creation unit 5204.

Communication state inquiry response unit 5203 receives the notification from communication state inquiry reception unit 5202 that it received the inquiry of the communication state. And communication state inquiry response unit 5203 instructs transmission unit 5205 to transmit the response that it can communicate with an another terminal device.

Figure 53:
FIG. 53 shows the terminal device arrangement information stored by the terminal device arrangement information storage unit of the terminal device.

Terminal device arrangement information storage unit 515 has stored terminal device arrangement information 5301 shown in FIG. 53 beforehand. According to terminal device arrangement information storage unit 515, in group "A", "portable information terminal", "character e-mail terminal" and "FAX" are set.

Figure 54:
FIG. 54 shows the outputable media attribute information stored by the outputable media attribute information storage unit of the terminal device.

Outputable media attribute information storage unit 516 has stored outputable media attribute information 5401 shown in FIG. 54 beforehand.

Transmission document information creation unit 5204 has the following functions in addition to the functions of transmission document information creation unit 517 of the first embodiment. Transmission document information creation unit 5204 reads one transmission destination terminal device in terminal device arrangement information 5301 stored in terminal device arrangement information storage unit 515, sets its flag, transfers the address of the terminal device to transmission unit 5205, and instructs transmission unit 5205 to ask whether it is capable of communication with another terminal device. On receiving the notification that communication is possible from communication state inquiry reception unit 5202, transmission document information creation unit 520 carries out the same processing as transmission document information creation unit 517 of the first embodiment.

After that, if no notification is obtained from communication state inquiry reception unit 5202 after a given time period, transmission document information creation unit 5204 determines that the communication is impossible with the termination device being outside of the communication area, power of the termination device being OFF or the terminal device being in communication with another terminal device. In this case, the transmission document control table for the terminal device is not created.

For example, in the case of document information control table 701 in FIG. 7 being stored in document information storage unit 514, transmission document information creation unit 5204 asks whether it is possible to communicate with "portable information terminal" whose address is "06-705-4321" via transmission unit 5205. If there is no notification from communication state inquiry reception unit 5202 after a given time period, transmission document information creation unit 5204 determines that communication is impossible and asks "character e-mail terminal" whose address is "A@abc.def.jp" whether communication is possible. On receiving the notification that communication is possible from communication state inquiry reception unit 5202, transmission document information creation unit 5204 creates transmission document control table 1001 shown in FIG. 10. Transmission document information creation unit 5204 asks "FAX" whose address is "06-123-4567" whether it is capable of communication. On receiving the notification that communication is possible, transmission document information creation unit 5204 creates transmission document control table 1101 shown in FIG. 11.

Figure 55:
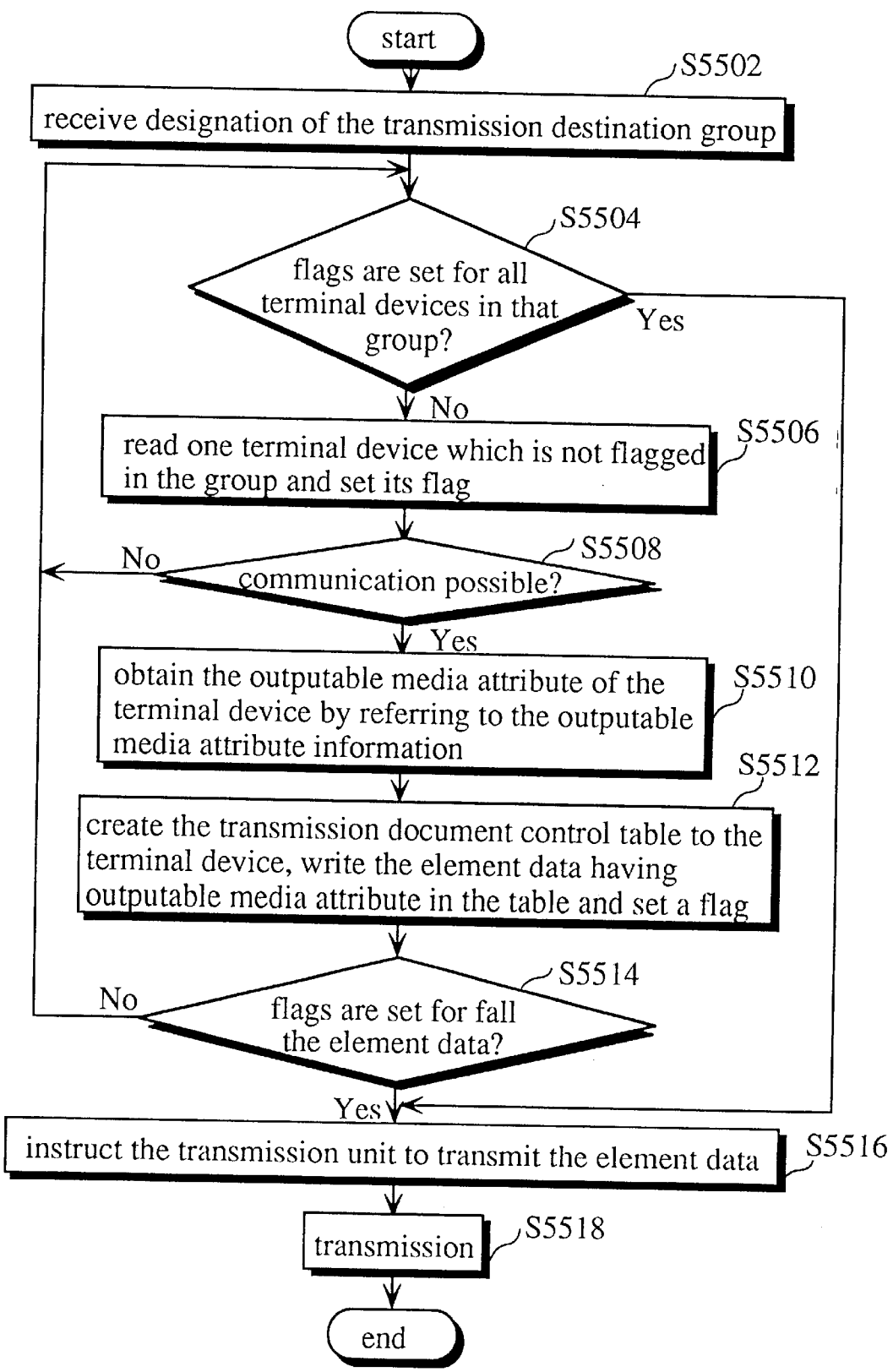
FIG. 55 is a flowchart showing the operation of the tenth embodiment.

The operations of the present embodiment can be explained as follows by means of the flowchart in FIG. 55.

First, transmission document information creation unit 5204 reads the transmission destination group from the document information control table (Step 5502), determines whether flags are set for all the terminal devices in the group in terminal device arrangement information (Step 5504), goes to Step 5516 if this is the case, or otherwise reads one terminal device which is not flagged in the group and sets its flag (Step 5506), asks the terminal device whether it is capable of communication with transmission unit 5205 via network 511 (Step 5508), returns to Step 5504 if this is the case, or otherwise obtains the outputable media attribute of the terminal device by referring to the outputable media attribute information (Step 5510).

Next, transmission document information creation unit 5204 creates the transmission document control table to be transmitted to the terminal device, writes the element data having outputable media attribute in the document information control table in the transmission document control table, sets its flag (Step 5512), and determines if flags are set for all of the element data (Step 5514), going to Step 5504 if this is not the case, or otherwise instructing transmission unit 5205 to transmit the element data (Step 5516).

Transmission unit 5205 transmits the content of the transmission document control table stored in transmission document information temporary storage unit 518 to the transmission destination terminal device via network 511 (Step 5518) and completes the processing.

As mentioned above, according to the present embodiment, as communication state of the transmission destination terminal device is checked, creation of the document to be transmitted to the terminal device incapable of communication can be avoided and only the document which can be communicated with another terminal device is created.

According to the present embodiment, each terminal device has its outputable media information. Instead of storing the outputable media attributes of all the terminal devices, each terminal device may store its own outputable media attribute and receivable element data size and transmit them in response to another terminal device.

(Eleventh Embodiment)

Figure 56:
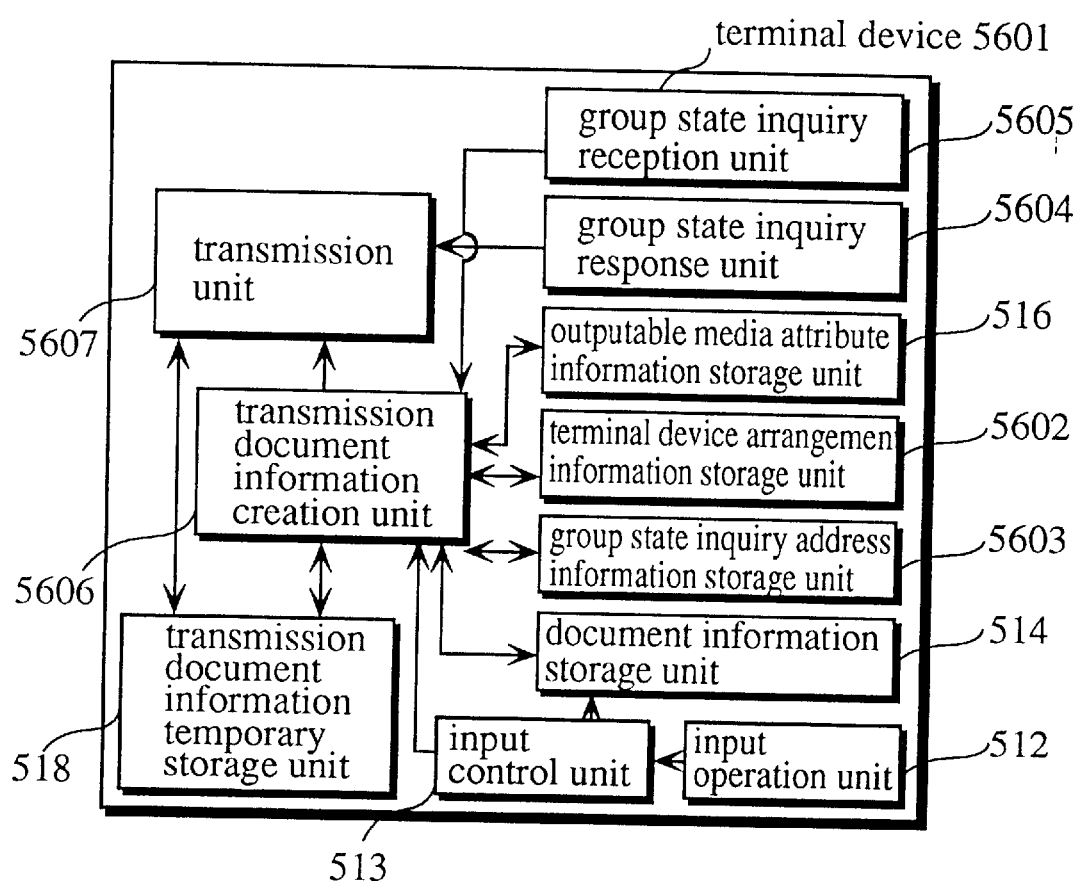
FIG. 56 shows the construction of the terminal device in a document information communication information system to which the eleventh embodiment of the present invention relates.

FIG. 56 shows the construction of the terminal device in the document information communication system of the eleventh embodiment of the present embodiment.

Terminal device 5601 comprises input operation unit 512, input control unit 513, document information storage unit 514, input control unit 513, document information storage unit 514, terminal device arrangement information storage unit 5602, group state inquiry address information storage unit 5603, outputable media attribute information storage unit 516, group state inquiry response unit 5604, group state inquiry reception unit 5605, transmission document information creation unit 5606, transmission document information temporary storage unit 513 and transmission unit 5607. The same construction elements as terminal device 501 of the first embodiment have been given the same reference numbers without any explanations. The following explanation will only focus on the differences.

Terminal device arrangement information storage unit 5602 stores terminal device arrangement information 5701 shown in FIG. 57. Terminal device arrangement information 5701 has stored the following beforehand: group name column 5702, type column 5703 showing type of terminal device belonging to that group, address column 5704 and flag column 5705, all of which are the same ones in terminal device arrangement information 801 of the first embodiment, and priority column 5706 showing priority of the terminal device depending on the state of the group.

Here, the state of the group means circumstances of the user. For example, when the transmission destination group is an office, the user may be present in the office, on his or her way home, away from the office on business, at a meeting, etc. Depending on the circumstances of the user, each terminal device has different priorities. Accordingly, priorities have been determined for the terminal devices beforehand.

According to terminal device arrangement information 5701, in group "A", three terminal devices are set. When the state of the group is "meeting", "character e-mail terminal" and "character display pager" have priority "1". Accordingly, document information is transmitted to these terminal devices in the first place. When the entire document element cannot be transmitted to them, the rest of the document element is transmitted to "FAX" which has priority "2".

Here, priority "0" means that the terminal device cannot be used. When the group state is "meeting", document information is transmitted to "character e-mail terminal" having priority "1" firstly, and to "FAX" having priority "2" secondly. Nothing is transmitted to "character display pager" having priority "0".

Figure 58:
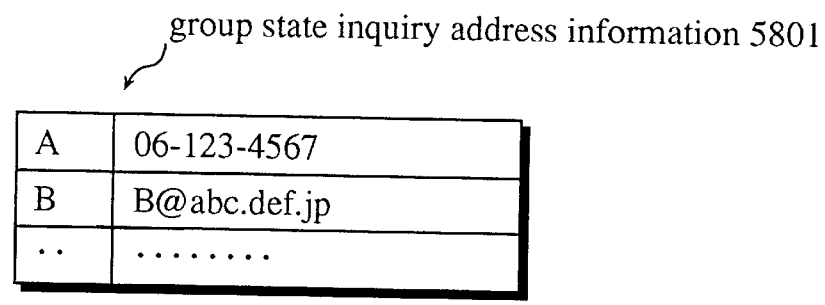
FIG. 58 shows the group state inquiry address information stored by the group state inquiry address information storage unit of the terminal device.

Group state inquiry address information storage unit 5603 stores group state inquiry address information 5801 as shown in FIG. 58. Group state inquiry address information 5801 stores one address for each group. The address is for asking the transmission destination group for its state. For example, in group "A", "FAX" whose address is "06-123-4567" are designated. Group state inquiry response unit 5604 is necessary when terminal device 5601 corresponds to the terminal device designated by group state inquiry address information 5801. It is not necessary in other cases. Group state inquiry response unit 5604 receives the user's input showing the circumstance of the user and stores it. For example, when the user comes back home from office, group state inquiry response unit 5604 receives input of "back home" and stores it as its group state. On receiving the notification that there was an inquiry of the group state from group state inquiry reception unit 5605, group state inquiry response unit 5604 instructs transmission unit 5607 to transmit the group state to the terminal device which made the inquiry.

On receiving the state of the group to which the terminal device belongs from another terminal device, group state inquiry reception unit 5605 transfers it to transmission document information creation unit 5606.

When terminal device 5601 has group state inquiry response unit 5604, group state inquiry reception unit 5605 receives the inquiry of the state of the group to which terminal device 5601 belongs. On receiving the inquiry, group state inquiry reception unit 5605 transfers it to group state inquiry response unit 5604.

In addition to the functions of transmission document information creation unit 4903 of the ninth embodiment, transmission document information creation unit 5606 has the following functions. Transmission document information creation unit 5606 reads the name of the group in the transmission document control table stored in document information storage unit 514, reads the address of the terminal device of the group in group state inquiry address information unit 5801, asks transmission unit 5607 for the state of the group, and transmits the address to transmission unit 5607. On receiving the state of the group from group state inquiry reception unit 5605, transmission document information creation unit 5606 creates the transmission document control table, using the priority corresponding to the state of the group in terminal device arrangement information 5701, which is the same processing as the ninth embodiment.

In addition to the functions of transmission unit 519 of the first embodiment, transmission unit 5607 receives the inquiry of the group state and address of the terminal from transmission document information creation unit 5606 and transfers them to the terminal device designated by that address via network 511.

The operations of the present embodiment are almost the same as the ninth embodiment. Only the following operations are added between Steps 5102 and 5104.

On receiving the name of the transmission destination group, transmission document information creation unit 5606 reads the address of the terminal device in group state inquiry address information 5801, transfers the address to transmission unit 5607 and instructs transmission unit 5607 to check the state of the group.

Transmission unit 5607 asks the terminal device designated by the address for its group state. When reception unit 5605 receives the state of the group from the terminal device, transmission unit 5607 transfers the state to transmission document information creation unit 5606.

Transmission document information creation unit 5606 uses the priority corresponding to the transferred state as the priority of each terminal device.

As mentioned above, according to the present embodiment, by arrangement priority of the terminal device depending on the sate of the transmission destination group, terminal devices can be used efficiently by the user.

(Twelfth Embodiment)

Figure 59:
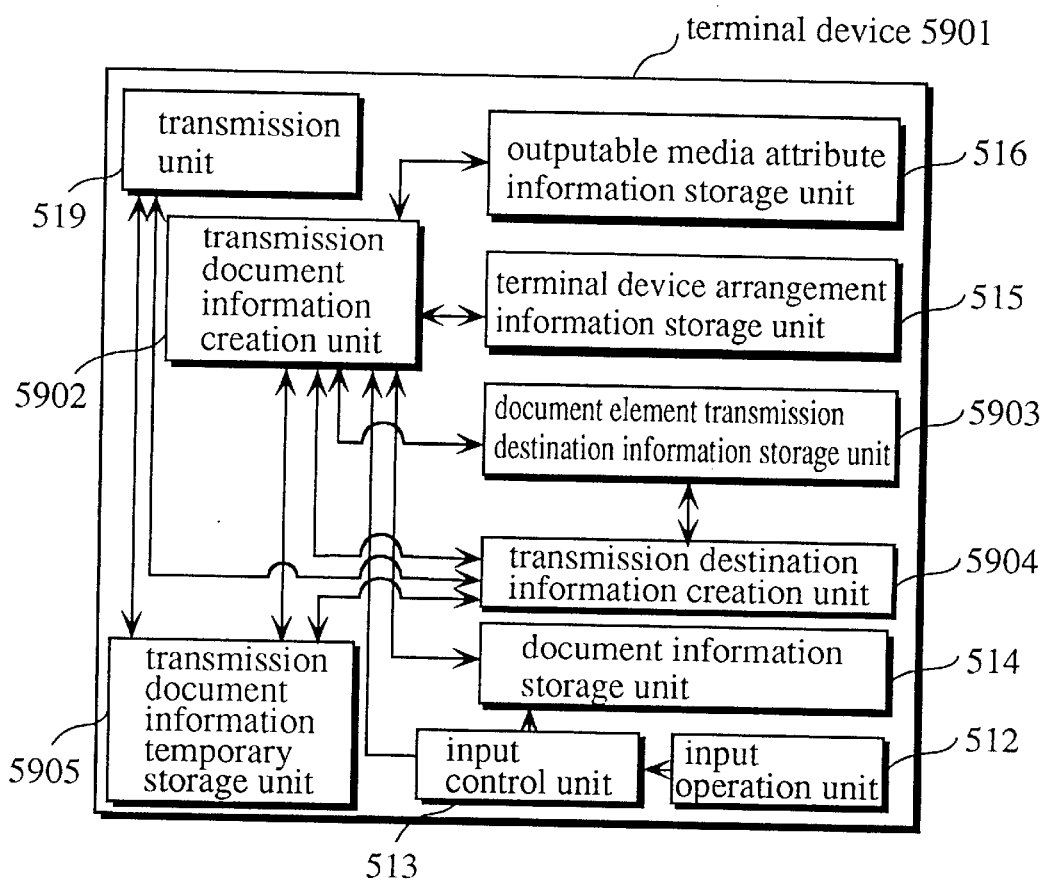
FIG. 59 shows the construction of the terminal device in a document information communication information system to which the twelfth embodiment of the present invention relates.

FIG. 59 shows the construction of the terminal device in the document information communication system of the twelfth embodiment of the present embodiment.

Terminal device 5901 comprises input operation unit 512, input control unit 513, document information storage unit 514, terminal device arrangement information storage unit 515, outputable media attribute information storage unit 516, transmission document information creation unit 5902, document element transmission destination information storage unit 5903, transmission destination information creation unit 5904, transmission document information temporary storage unit 5905 and transmission unit 519.

Transmission document information creation unit 5902 has the following functions in addition to the functions of transmission document information creation unit 516 of the first embodiment.

Transmission document information creation unit 5902 transcribes the element data and size of each document element read in the document information control table in the transmission document control table, sets a flag for each in the document information control table and writes the document element transmission destination information, which is a list of the document element, and the transmission destination terminal device in document element transmission destination information storage unit 5903. FIG. 60 shows document element transmission destination information 6001.

Here, terminal device arrangement information 801 in FIG. 8 is stored in terminal device arrangement information storage unit 515 and outputable media attribute information 901 in FIG. 9 is stored in outputable media attribute information storage unit 516. If document information control table 701 in FIG. 7 is stored in document information storage unit 514, transmission document control tables 1001 and 1101 are stored in transmission document information creation unit 5905. Therefore, information 6007 which corresponds to transmission document control table 1001 and information 6008 which corresponds to transmission document control table 1101 are stored in document element transmission destination information 6001. For example, element data 6004 "Notice of a Meeting" having "character" as its media attribute and "19" as its size will be transmitted to "character e-mail terminal" having address "A@abc.def.jp".

When flags are set for all the transmission destination terminal devices or when flags are set for all of the element data, transmission document information creation unit 518 instructs transmission unit 519 to transmit the element data in the first embodiment. Instead, transmission document information creation unit 518 activates transmission destination information creation unit 5904 in the present embodiment.

Document element transmission destination information storage unit 5903 consists of memory and stores document element transmission destination information 6001 in FIG. 60 created by transmission document information creation unit 5902.

On being activated by transmission document information creation unit 5902, transmission destination information creation unit 5904 successively reads the transmission document control tables stored in transmission document information temporary storage unit 5905, compares the transmission document control table with document element transmission destination information 6001 stored in document element transmission destination information storage unit 5903 and obtains the transmission destination address of the element data which is not included in the transmission document control table.

Transmission destination information creation unit 5904 stores a set phrase "part of the document has been sent to \*\*\*", inserts the obtained address in \*\*\* and handles it as appended data. Transmission destination information creation unit 5904 converts the appended element data into media attribute (which can be outputted by the transmission destination terminal device) which is the same media attribute with other element data in the transmission document control table and writes it in the transmission document control table. At this time, transmission destination information creation unit 5904 writes the media attribute and its size.

FIG. 61 shows transmission document control table 6101 created in the above mentioned way. Transmission document control unit 6101 comprises part 6102 created by transmission document information creation unit 5902 and part 6103 created by transmission destination information creation unit 5404. Part 6102 corresponds to transmission document control table 1001 of the first embodiment.

FIG. 62 shows transmission document control table 6202 having "FAX" whose address is "06-123-4567" as the transmission destination terminal device . Here, element data "YYYYY . . . " shows that appended data of "part of the document has been transmitted to A@abc.def.jp" is converted to "monochrome still picture" which can be outputted by the terminal device.

Transmission destination information creation unit 5904 instructs transmission unit 519 to transmit the content of the transmission document control table when creation of the additional element data is completed for all the transmission document control tables.

Transmission document information temporary storage unit 5905 stores transmission document control tables 6101 and 6201 created by transmission document information creation unit 5902 and transmission destination information creation unit 5904, respectively. FIGS. 61 and 62 show transmission document control tables 6102 and 6201.

Figure 63:
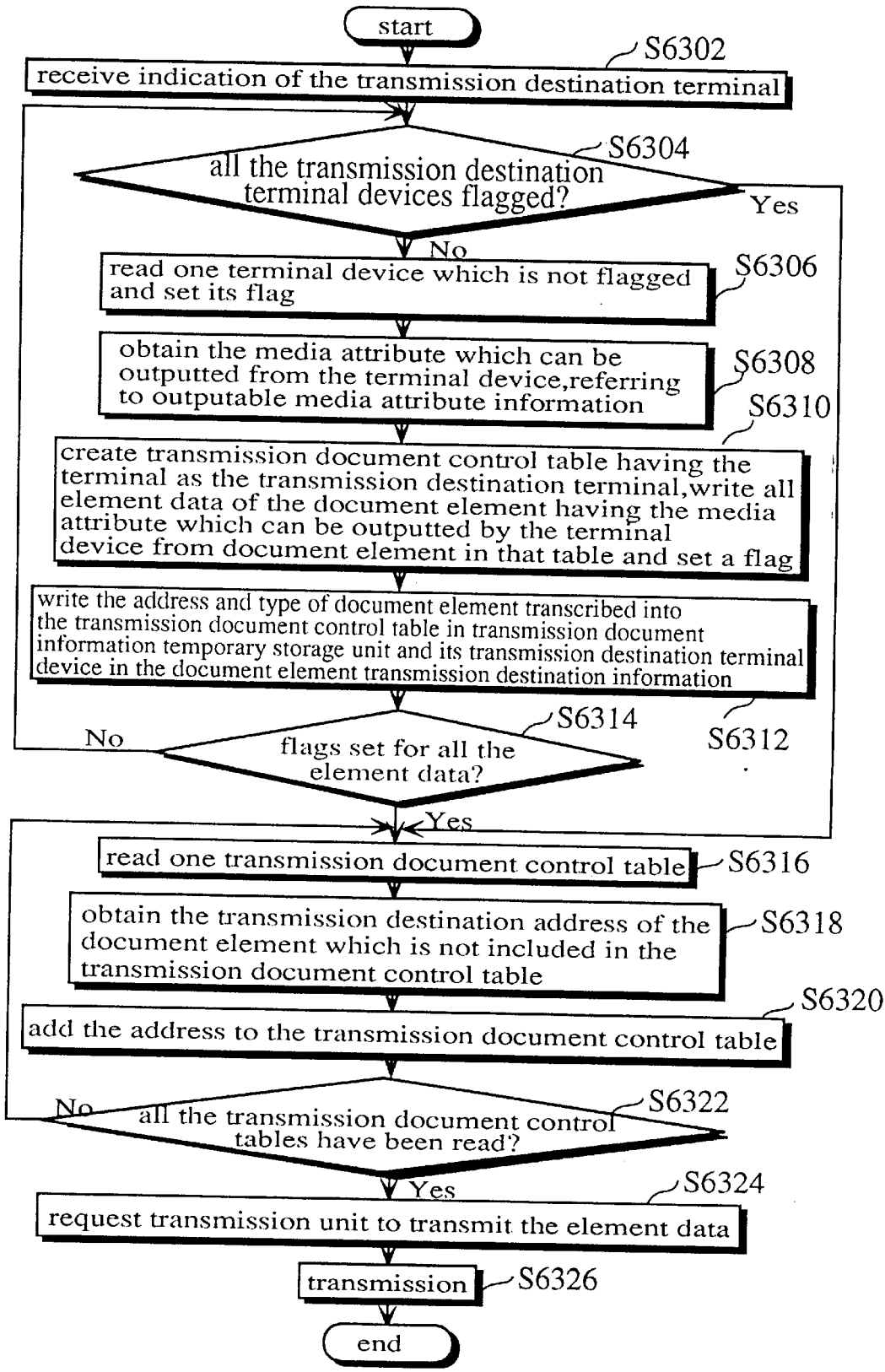
FIG. 63 is a flowchart showing the operation of the twelfth embodiment.

The operations of the present embodiment can be explained as follows by means of the flowchart in FIG. 63. As Steps 6302–6310 are the same as Steps 1402–1410 of the first embodiment, explanation for them are not given here.

Transmission document information creation unit 5902 writes the address and type of document element transcribed into the transmission document control table in transmission document information temporary storage unit 5905 and its transmission destination terminal device in the document element transmission destination information of test element transmission destination information storage unit 5903 (Step 6312) and determines if flags are set for all of the element data in the document information control table (Step 6314), returning to Step 6304 if this is not the case, or otherwise activating transmission destination information creation unit 5904.

Transmission destination information creation unit 5904 reads one transmission document control table (Step 6316), compares it with document element transmission destination information 6001 and obtains the transmission destination address of the document element which is not included in the transmission document control table (Step 6318). Transmission destination information creation unit 5904 inserts the obtained address into the set phrase which has been stored beforehand and writes the set phrase into the transmission document control table as appropriate additional element data (Step 6320), determines if all the transmission document control tables have been read (Step 6322), returning to Step 6316 if this is not the case, or otherwise instructing transmission, unit 519 to transmit the content of the transmission document control table (Step 6324).

Transmission unit 519 successively transmits the content of the transmission document control table stored in transmission document information temporary storage unit 5905 to the transmission destination terminal device via the network according to the indication by transmission information creation unit 5904 (Step 6326) and completes the processing.

According to the present embodiment, each type of terminal device has stored the outputable media attribute information of other terminal devices as well as its own media attribute information. However, it may also possible to ask the transmission destination terminal for the outputable media attribute information like the case of the second embodiment.

The present embodiment ensures that the document information is transmitted to the user for sure because the user can know the document element which was not transmitted to one terminal device by the first transmission was transmitted to which terminal device by the second transmission when the document element is divided and transmitted to a plurality of terminal devices.

(Thirteenth Embodiment)

Figure 64:
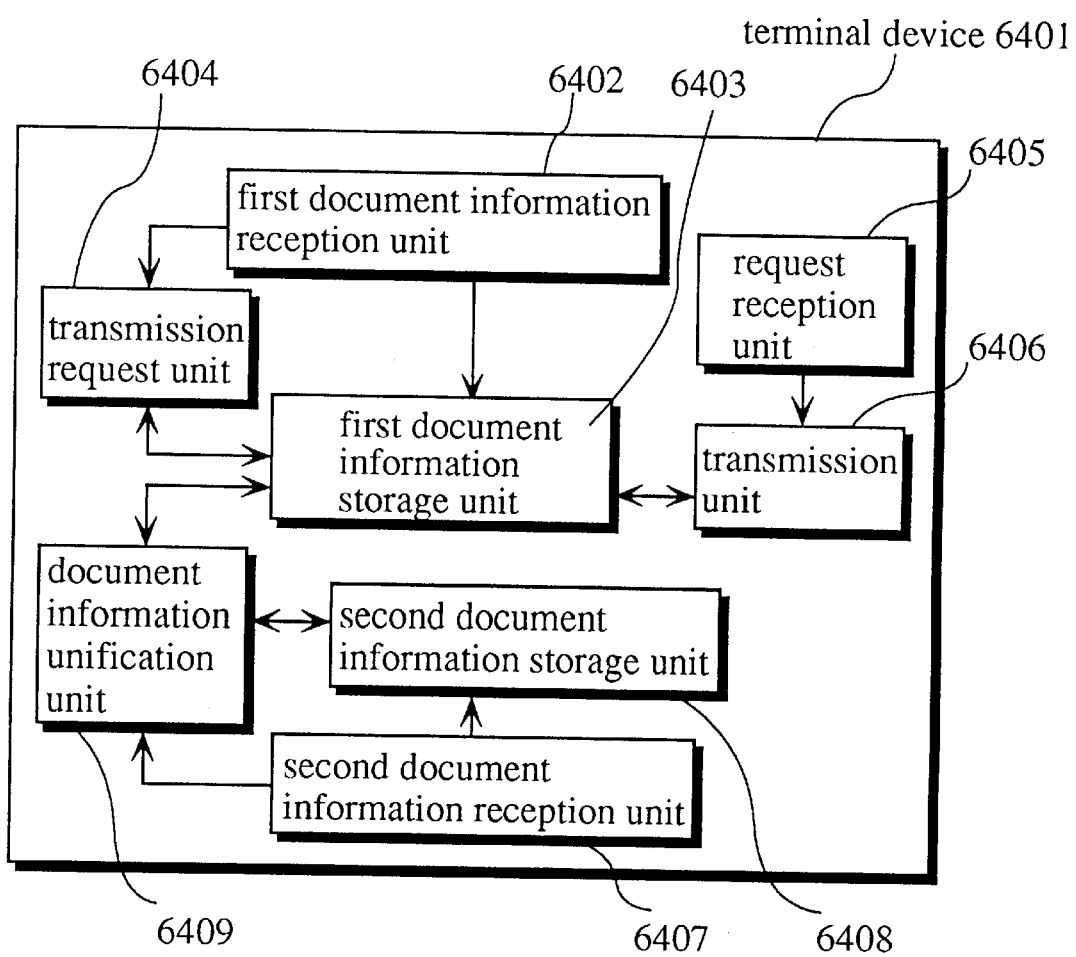
FIG. 64 shows the construction of the terminal device in a document information communication information system to which the thirteenth embodiment of the present invention relates.
Figure 65:
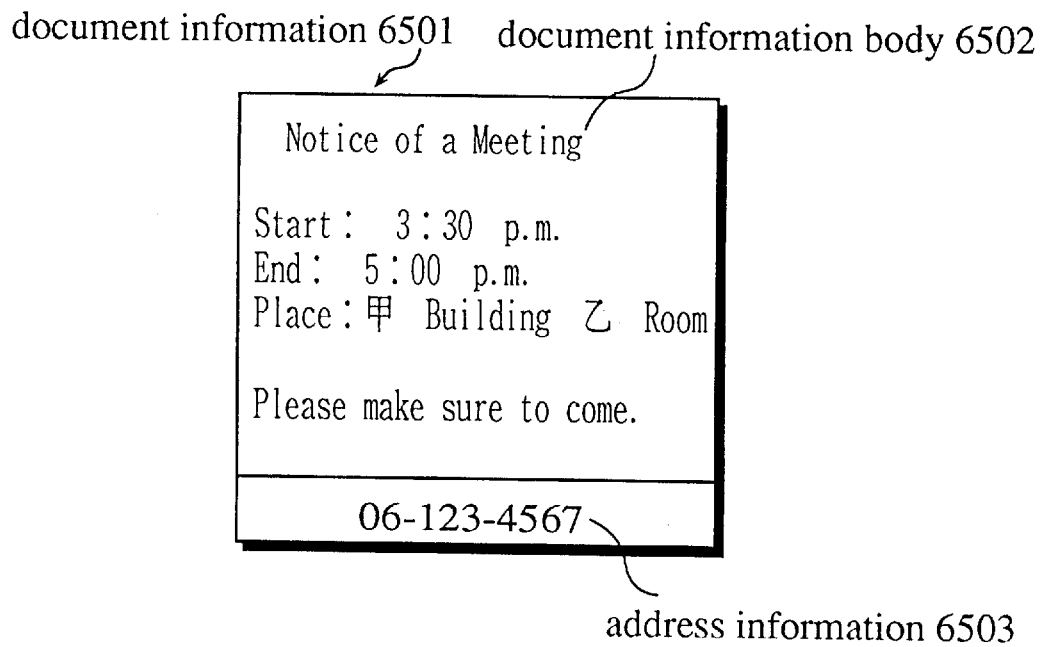
FIG. 65 is a figure showing the document information stored by the first document information storage unit of the terminal device.

FIG. 64 shows the construction of the terminal device of the document information communication system of the thirteenth embodiment of the present embodiment.

Terminal device 6401 comprises first document information reception unit 6402, first document information storage unit 6403, transmission request unit 6404, request reception unit 6405, transmission unit 6406, second document information reception unit 6407, second document information storage unit 6408 and document information unification unit 6409.

First document information reception unit 6402 receives the document information from transmission unit 519 of the first to twelfth embodiments. On receiving the document information, first document information reception unit 6402 makes first document information storage unit 6403 store it and activates transmission request unit 6404.

First document information storage unit 6403 stores document information 6501 in FIG. 6 which was received by first document information reception unit 6403. Document information 6501 stores document information body 6502 and address information 6503 of another terminal device belonging to the same group as terminal device 6401.

On being activated by first document information reception unit 6402, transmission request unit 6404 reads address information 6503 of document information 6501 stored in first document information storage unit 6403 and requests the terminal device designated by the address to transmit the document information.

On receiving the transmission request of the document information from another terminal device in the same group, request reception unit 6405 instructs transmission unit 6406 to transmit the document information stored in first document information storage unit 6403 to the another terminal device.

Transmission unit 6406 transmits the document information stored in first document information storage unit 6403 to the terminal device which requested the transmission.

On receiving the document information transmitted from another terminal device, second document information reception unit 6407 makes secant document information storage unit 6408 to store it and activates document information unification unit 6409.

Figure 66:
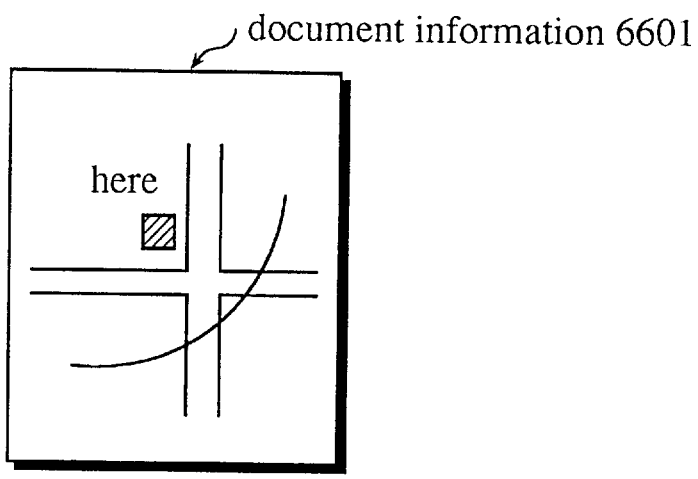
FIG. 66 is a figure showing the document information stored by the second document information storage unit of the terminal device.

Second document information storage unit 6408 stores document information 6601 shown in FIG. 66.

Figure 67:
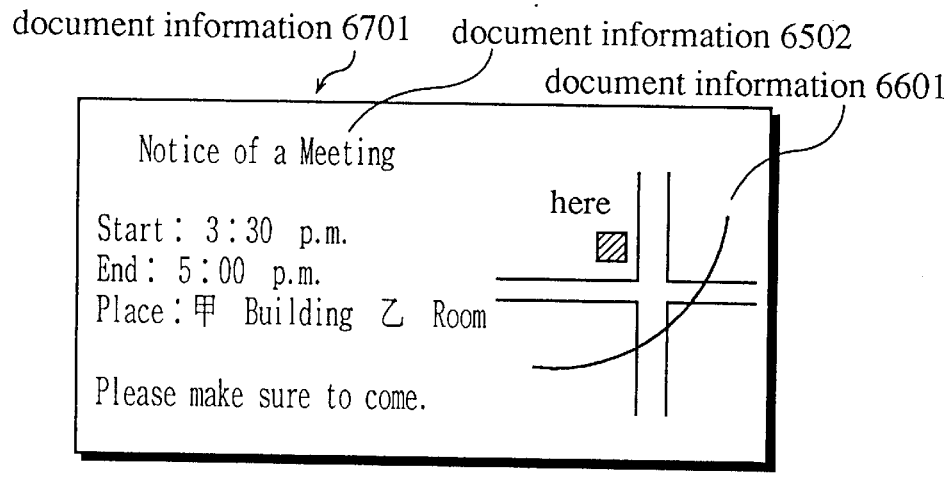
FIG. 67 shows the document information unified by the document information unification unit of the terminal device.

On being activated by second document information reception unit 6407, document information unification unit 6409 reads document information body 6502 having "character" media attribute stored in first document information storage unit 6403 and document information 6601 having "monochrome still picture" media attribute stored in second document information storage unit 6407. Document information unification unit 6409 creates document information 6701 shown in FIG. 67, having document information body 6502 and document information 6601.

Document information unification unit 6409 has a function of converting different media attributes in order to unify them in document information or a function to unify the different media attributes as they are.

Figure 68:
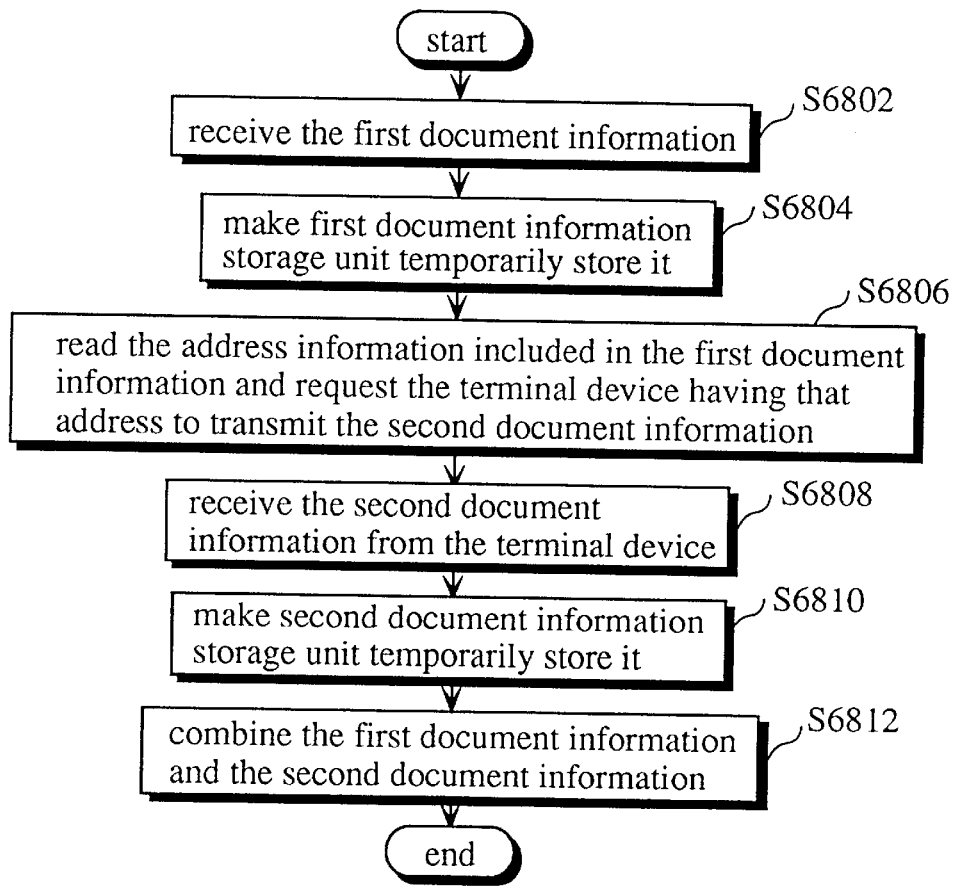
FIG. 68 is a flowchart showing the operation of the twelfth embodiment.

The operations of the present embodiment can be explained as follows by means of the flowchart in FIG. 68.

When first document information reception unit 6402 in terminal device 6401 receives the first document information (Step 6802), it makes first document information storage unit 6403 temporarily store it (Step 6804).

Transmission request unit 6404 reads the address information included in the first document information and requests the terminal device having that address to transmit the second document information (Step 6806).

When second document information reception unit 6407 receives the second document information from the terminal device (Step 6808), it makes second document information storage unit 6408 temporarily store it (Step 6810).

Document information unification unit 6409 unifies the first document information stored in first document information storage unit 6403 and the second document information stored in the second document information storage unit 6408 (Step 6812), and completes the processing.

As mentioned above, according to the present embodiment, when the transmission document is divided into document elements so as to be transmitted to a plurality of terminal devices, the original document can be reproduced at the receiver's end, because each terminal devices may ask another terminal device for their document elements by using the address added to the document information that the terminal device received, and may unit them with the document elements each terminal device received in the first place. This is very useful when the whole document information cannot be transmitted to one terminal device due to its limited reception capacity.

In the present embodiment, the case where the original document was reproduced from two sets of document information was explained, although it is also possible to use three or more sets of document information. In such cases, address information of other terminal devices is added to document information 6501. Also, in the present embodiment, document information unification unit 6409 just unifies the two sets of document information using the address information. However, it may also possible that either or both document information is added information on how to unify them. For example, coordinates may have been added to both document information 6501 and document information 6601.

(Fourteenth Embodiment)

Figure 69:
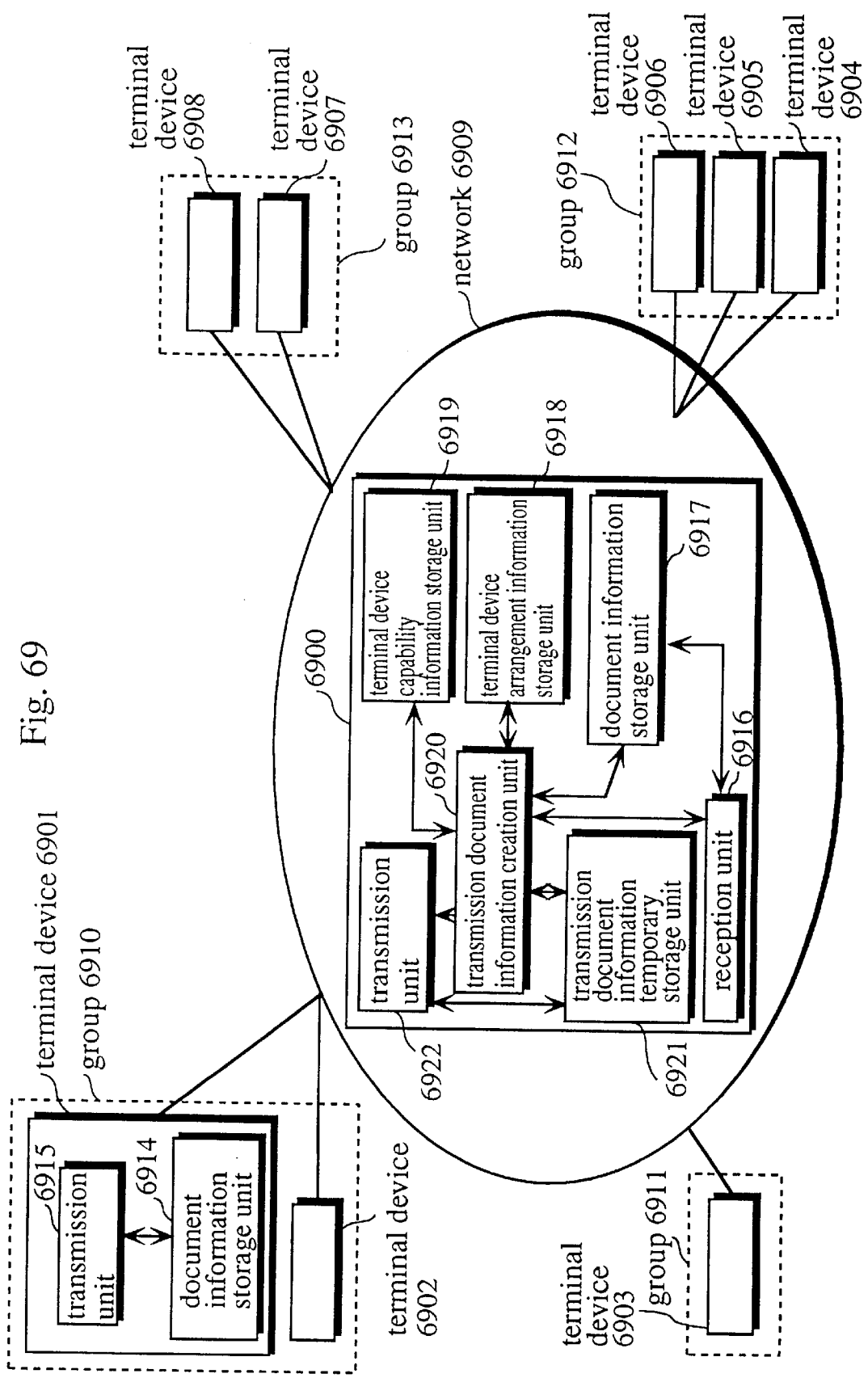
FIG. 69 is a figure showing the document information stored by the first document information storage unit of the terminal device.

FIG. 69 shows the construction of the document information communication system of the fourteenth embodiment of the present invention. In this document information communication system, a plurality of terminal devices 6901, 6902, . . . , 6908 are connected via network 6909. Each of the terminal devices belongs to groups 6910, . . . , 6913, respectively.

Terminal device 6901 comprises document information storage unit 6014 and transmission unit 6915. The same thing can be said to other terminal devices.

Relay device 6900 is set in network 6909, relay device comprising reception unit 6916, document information storage unit 6917, terminal device arrangement information storage unit 6918, terminal device capability information storage unit 6919, transmission document information creation unit 6920, and transmission document information temporary storage unit 6921.

Document information storage unit 6914 stores the document information control table like the cases of the first to twelfth embodiments. Transmission unit 6915 transmits the document information control table stored in document information storage unit 6914 as it is to reception unit 6916 in relay device 6900.

Explanation of each of the construction elements of relay device 6900 in network 6909 is not given here as it is almost the same as terminal device 501 of the first embodiment except that it comprises reception unit 6916 instead of input operation unit 512 and input control unit 513.

Reception unit 6916 makes document information storage unit 6917 stored the document information control table it received and activates transmission document information creation unit 6920.

Eventually, instead of transmission unit 519 of the first embodiment, transmission unit 6922 in relay device 6900 in this network transmits the document information to the transmission destination terminal device.

As mentioned above, according to the present embodiment, relay device 6900 in network 6909 can carry out the creation of the transmission document control tables created by each transmission destination terminal device. Therefore, construction of each terminal device can be simplified and futile communication does not occur between relay device 6900 and the transmission destination terminal device.

Relay device 6900 can include each construction elements of the first to the twelfth embodiment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted, including a media attribute storage unit for storing, for each document element, a media attribute of a set of element data which is a content of a document element; and an element data size storage unit for storing, for each document element, a size of the set of element data which is the content of the document element, wherein the terminal device capability information control means includes:

an outputable media attribute storage unit for storing each media attribute which can be outputted by each type of terminal device; and a terminal device capacity storage unit for storing a receivable capacity of element data for each type of terminal device, terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, including a transmission destination terminal device selection unit for selecting a terminal device whose group name in the terminal device arrangement information coincides with the group name to be transmitted to as a transmission destination terminal device, wherein the transmission destination group name is included in the document information as a transmission address;

an element data determination unit for determining, if element data of a media attribute which corresponds to a media attribute which is outputable for the transmission destination terminal device determined by the transmission destination terminal device selection unit were written in a present set of transmission document information, whether a size of a present set of transmission document information would be within the receivable capacity of the corresponding terminal device; and an element data write unit for writing, when the element data determination unit has determined that the size is within the receivable capacity, the set of element data into the present set of transmission document information;

element data size calculation unit for calculating a writable amount of element data when the element data determination unit has determined that the size of the transmission document information is not within the receivable capacity, wherein the writable amount of element data is calculated as the receivable capacity of the corresponding terminal device which is written in the terminal device capacity storage unit minus a total amount of element data which has already been written in the set of transmission document information;

compression information storage unit for storing compression information which is made up of a compression method for element data and a compression rate for compressing the element data;

compression possible determination means for determining whether element data which has been compressed in accordance with the compression rate in the compression information would be within the writable amount calculated by the element data size calculation unit;

element data compression means for compressing, when the compression possible determination means has determined that the element data would be within the rewritable amount, the element data to a size equal to the writable amount calculated by the element data size calculation unit using the compression method in the compression information; and compressed element data write means for writing the element data compressed by the element data compression means into the present set of transmission document information.

2. The terminal device of claim 1, wherein the compression information storage means includes a media attribute-classified compression information storage unit for storing a compression method and a compression rate for each media attribute in element data, and wherein the element data compression unit includes a media attribute compression unit for compressing element data in accordance with the compression method stored in the media attribute-classified compression information storage unit which corresponds to the media attribute.

3. The terminal device of claim 2, wherein the transmission document information creation means creates a set of transmission document information for each transmission destination terminal device.

4. The terminal device of claim 1, wherein the document information storage means further includes an element data content storage unit for storing a title for each document element which expresses a content of a corresponding document element, wherein the compression information storage means includes a content-classified compression information storage unit for storing compression information made up of a compression method and a compression rate for each title in element data, and wherein the element data compression means includes a content compression unit for compressing element data using a compression method which corresponds to a title of the element data stored in the content-classified compression information storage unit.

5. The terminal device of claim 4, wherein the transmission document information creation means creates a set of transmission document information for each transmission destination terminal device.

6. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted includes a media attribute storage unit for storing, for each document element, a media attribute of a set of element data which is a content of a document element;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device includes an outputable media attribute obtaining unit for obtaining an outputable media attribute for a transmission destination terminal device selected by the transmission destination terminal device selection unit from the transmission destination terminal device includes:

a media attribute inquiry unit for sending an inquiry to the transmission destination terminal device asking for an outputable media attribute;

a media attribute reception unit for receiving a response containing a media attribute from the transmission destination terminal device;

an own media attribute storage unit for storing a media attribute of element data which is outputable for a present terminal device; and a media attribute response unit for transmitting, on receiving an inquiry for an outputable media attribute from a terminal device, the media attribute stored by the own media attribute storage unit to the terminal device which sent the inquiry;

transmission document information creation means for selecting terminal devices based on the group name of a group to be transmitted to and the terminal device arrangement information and for creating sets of the transmission document information from the document information to be transmitted in accordance with the terminal device capability information, including a transmission destination terminal device selection unit for selecting a terminal device whose group name in the terminal device arrangement information coincides with the group name to be transmitted to as a transmission destination terminal device, wherein the transmission destination group name is included in the document information as a transmission address, and an element data write unit for writing element data which has a media attribute which matches an outputable media attribute for a terminal device which is obtained from the outputable media attribute storage unit into the present set of transmission document information; and transmission means for transmitting the created sets of transmission document information to the selected terminal devices.

7. The terminal device of claim 6, wherein the transmission document information creation means creates a set of transmission document information for each transmission destination terminal device.

8. The terminal device of claim 7, further comprising:

media attribute conversion information storage means for storing media attribute conversion information which shows how element data is convertible between different media attributes, wherein the transmission document information creation means further includes:

conversion determination unit for determining whether there is any element data which cannot be written into a present set of transmission document information by the element data write unit; and conversion indication unit for indicating, when the conversion determination unit has determined that element data which cannot be written is present, a conversion of a media attribute of the unwritable element data to a media attribute which matches the media attribute of the selected transmission destination terminal device, in accordance with the media attribute conversion information, wherein the terminal device further comprises:

media attribute conversion means for converting element data of a media attribute into element data of another media attribute in accordance with an indication received from the conversion indication unit, wherein the element data write unit writes the converted element data into the present set of transmission document information.

9. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted includes a media attribute storage unit for storing, for each document element, a media attribute of a set of element data which is a content of a document element;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device includes an outputable media attribute storage unit for storing each media attribute which can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, includes a transmission destination terminal device selection unit for selecting a terminal device whose group name in the terminal device arrangement information coincides with the group name to be transmitted to as a transmission destination terminal device, wherein the transmission destination group name is included in the document information as a transmission address, and an element data write unit for writing element data which has a media attribute which matches an outputable media attribute for the transmission destination terminal device selected by the transmission destination terminal device selection unit into the present set of transmission document information, wherein the transmission document information creation means creates a set of transmission document information for each transmission destination terminal device; and transmission means for transmitting the created sets of transmission document information to the selected terminal devices.

10. The terminal device of claim 9, further comprising:

media attribute conversion information storage means for storing media attribute conversion information which shows how element data is convertible between different media attributes, wherein the transmission -document information creation means further includes:

conversion determination unit for determining whether there is any element data which cannot be written into a present set of transmission document information by the element data write unit; and conversion indication unit for indicating, when the conversion determination unit has determined that element data which cannot be written is present, a conversion of a media attribute of the unwritable element data to a media attribute which matches the media attribute of the selected transmission destination terminal device, in accordance with the media attribute conversion information, wherein the terminal device further comprises:

media attribute conversion means for converting element data of a media attribute into element data of another media attribute in accordance with an indication received from the conversion indication unit, wherein the element data write unit writes the converted element data into the present set of transmission document information.

11. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted includes an element data size storage unit for storing a size of each set of element data in each document element;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, includes a transmission destination terminal device selection unit for selecting a terminal device whose group name in the terminal device arrangement information coincides with the group name to be transmitted to as a transmission destination terminal device, wherein the transmission destination group name is included in the document information as a transmission address; and transmission means for transmitting the created sets of transmission document information to the selected terminal devices, wherein the terminal device capability information control means includes a terminal device receivable amount obtaining unit for obtaining a receivable amount of element data for a transmission destination terminal device selected by the transmission destination terminal device selection unit from the corresponding transmission destination terminal device, wherein the transmission document information creation means further includes an element data write unit for writing an amount of element data which is within the receivable amount of the transmission destination terminal device which is received from the terminal device receivable amount obtaining unit into the present set of transmission document information, and wherein the terminal device receivable amount obtaining unit includes:

an amount inquiry unit for sending an inquiry to the transmission destination terminal device asking for an receivable amount of element data;

a reception amount reception unit for receiving a response containing the reception amount from the transmission destination terminal device;

an own capacity storage unit for storing a receivable capacity of element data for a present terminal device; and a reception amount response unit for transmitting, on receiving an inquiry for a receivable amount from a terminal device, the receivable amount which is calculated by subtracting a reception amount of currently in use from the receivable capacity stored by the own capacity storage unit to the terminal device which sent the inquiry.

12. The terminal device of claim 11, wherein the transmission document information creation means creates a set of transmission document information for each transmission destination terminal device.

13. The terminal device of claim 11, further comprising:

first document information reception means for receiving, when a second set of transmission document information is transmitted to another transmission terminal at a same group as a present transmission destination terminal device, a first set of transmission document information which is appended with an address of the other terminal device;

first document information storage means for storing the first set of transmission document information received by the first document information reception means;

transmission request means for sending a request to a transmission terminal whose address is appended to the first set of transmission document information asking for transmission of the received second set of transmission document information;

second transmission document information reception means for receiving the second set of transmission document information which is sent from the other terminal device in accordance with the request from the transmission request means; and document information unification means for unifying the first set of transmission document information and the second set of transmission document information into one set of transmission document information.

14. The terminal device of claim 13, further comprising:

request reception means for receiving the request for the transmission of the second set of transmission document information from the transmission request means; and second transmission document information transmission means for transmitting the received second set of transmission document information in accordance with the received request to the terminal device which issued the request.

15. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, includes a transmission destination terminal device selection unit for selecting a terminal device whose group name in the terminal device arrangement information coincides with the group name to be transmitted to as a transmission destination terminal device, wherein the transmission destination group name is included in the document information as a transmission address;

transmission means for transmitting the created sets of transmission document information to the selected terminal devices;

a document element transmission address information storage unit for storing document element transmission address information made up of each document element in sets of transmission document information created by the transmission document information creation means and a list of addresses of terminal devices which are transmission addresses for each document element; and transmission destination terminal device address extraction means for extracting an address of a terminal device which is a transmission address of a document element which is included in document element transmission address information but not included in a present set of transmission document information, wherein the transmission document information creation means includes an appending unit for appending the present set of transmission document information with the address extracted by the transmission destination terminal device address extraction means.

16. The terminal device of claim 15, wherein the document information storage means includes a media attribute storage unit for storing, for each document element, a media attribute of a set of element data which is a content of a document element, wherein the terminal device capability information control means includes an outputable media attribute storage unit for storing each media attribute which can be outputted by each type of terminal device, and wherein the transmission document information creation means further includes an element data write unit for writing element data which has a media attribute which matches an outputable media attribute for the transmission destination terminal device selected by the transmission destination terminal device selection unit into the present set of transmission document information.

17. The terminal device of claim 15, wherein the appending unit converts the extracted address to a same media attribute as written in the present set of transmission document information by the element data write unit before appending.

18. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, includes a transmission destination terminal device selection unit for selecting a terminal device whose group name in the terminal device arrangement information coincides with the group name to be transmitted to as a transmission destination terminal device, wherein the transmission destination group name is included in the document information as a transmission address;

transmission means for transmitting the created sets of transmission document information to the selected terminal devices; and group state inquiry address information storage means for storing an address of one terminal device in each group which receives an inquiry about whether to transmit a set of transmission document information to any prioritized terminal device provided in a group, wherein the transmission document information creation means further includes a group state inquiry unit for sending an inquiry to a terminal device having an address which is in a group name to be transmitted to and which is stored by the group state inquiry address information storage means, wherein the group name is included in document information as a transmission address, wherein the terminal device further comprises first group state inquiry reception means for receiving a group state from a terminal device to which an inquiry was sent, in reply to the inquiry from the group state inquiry unit, wherein the terminal device arrangement information storage means includes a group state corresponding priority level storage unit for storing a priority level of each terminal device in accordance with a group state, wherein the document information storage means includes a media attribute storage unit for storing, for each document element, a media attribute of a set of element data which is a content of a document element, wherein the terminal device capability information control means includes an outputable media attribute storage unit for storing each media attribute which can be outputted by each type of terminal device, and wherein the transmission document information creation means further includes an element data write unit for writing element data which has a media attribute which matches a media attribute for a terminal device whose priority level is high in accordance with the group state received by the first group state inquiry reception means into the present set of transmission document information.

19. The terminal device of claim 18, wherein a terminal device specified by the address stored by the group state inquiry address information storage means further comprises:

second group state inquiry reception means for receiving an inquiry about group state from another terminal device; and group state inquiry response means for sending a response to the other terminal device about a group state set in accordance with the inquiry received by the group state inquiry response means.

20. A relaying device provided in a system where sets of transmission document information are transferred via a network between terminal devices provided in a plurality of different groups, the relaying device comprising:

reception means for receiving a transmission of document information made of a plurality of document elements from any of the terminal devices, wherein the document information includes a group name as a transmission address;

document information storage means for storing document information which is received by the reception means;

terminal device arrangement information storage means for storing terminal information arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices provided in a group whose group name in the terminal device arrangement information matches the group name in the document information as transmission destination terminal devices and for creating sets of the transmission document information from document information to be transmitted in accordance with the terminal device capability information, including an element data determination unit for determining whether a size of a present set of transmission document information would be within the receivable capacity of the corresponding terminal device;

an element data write unit for writing, when the element data determination unit has determined that the size is within the receivable capacity, a set of element data into the present set of transmission document information; and element data size calculation unit for calculating a writable amount of element data when the element data determination unit has determined that the size of the transmission document information is not within the receivable capacity, wherein the writable amount of element data is calculated as the receivable capacity of the corresponding terminal device which is written in the terminal device capacity storage unit minus a total amount of element data which has already been written in the set of transmission document information; and transmission means for transmitting the created sets of transmission document information to the selected terminal devices, wherein each terminal device further comprises:

a compression information storage unit for storing compression information which is made up of a compression method for element data and a compression rate for compressing the element data;

compression possible determination means for determining whether element data which has been compressed in accordance with the compression rate in the compression information would be within the writable amount calculated by the element data size calculation unit;

element data compression means for compressing, when the compression possible determination means has determined that the element data would be within the rewritable amount, the element data to a size equal to the writable amount calculated by the element data size calculation unit using the compression method in the compression information; and compressed element data write means for writing the element data compressed by the element data compression means into the present set of transmission document information.

21. A terminal device to be used in a system where sets of transmission document information are transferred via a network between terminal devices which are grouped together in a plurality of different groups, the terminal device comprising:

document information storage means for storing document information which is made up of a plurality of document elements which are to be transmitted;

terminal device arrangement information storage means for storing terminal device arrangement information made up of each group name, a type of each terminal device provided at each group and an address of each terminal device;

terminal device capability information control means for controlling terminal device capability information which shows what kinds of document information can be outputted by each type of terminal device;

transmission document information creation means for selecting terminal devices based on the group name of a group to be transmitted to and the terminal device arrangement information and for creating sets of the transmission document information from the document information to be transmitted in accordance with the terminal device capability information, includes a transmission destination terminal device selection unit for selecting a terminal device whose group name in the terminal device arrangement information coincides with the group name to be transmitted to as a transmission destination terminal device, wherein the transmission destination group name is included in the document information as a transmission address; and transmission means for transmitting the created sets of transmission document information to the selected terminal devices;

communication state obtaining means for obtaining a communication state of the terminal device selected by the transmission destination terminal device selection unit, wherein the document information storage means includes a media attribute storage unit for storing, for each document element, a media attribute of a set of element data which is a content of a document element, wherein the terminal device capability information control means includes outputable media attribute storage unit for storing each media attribute which can be outputted by each type of terminal device, wherein the transmission document information creation means further includes an element data write unit for writing element data which has a media attribute which matches an outputable media attribute for a terminal device whose communication state obtained by the communication state obtaining means is that communication is possible, and wherein the communication state obtaining means includes:

a communication state inquiry unit for sending an inquiry to the terminal device selected by the transmission destination terminal device selection unit asking whether communication is possible;

a communication state inquiry reception unit for receiving a response from another terminal device sent in accordance with the in inquiry from the communication state inquiry unit;

a communication state inquiry response unit for sending a response showing that communication is possible after receiving an inquiry about communication state from another terminal device; and a communication state determination unit for determining that a communication state of a terminal device is that communication is possible after the communication state inquiry reception unit has received a response from the terminal device and for determining that a communication state of a terminal device is that communication is not possible when there has been no response to the inquiry sent by communication state inquiry unit within a predetermined period.

* * * * *